US005779931A

United States Patent [19]
Klug et al.

[11] Patent Number: 5,779,931
[45] Date of Patent: Jul. 14, 1998

[54] AZEOTROPE (LIKE) COMPOSITIONS WITH DIFLUOROMETHOXYTETRAFLUOROPROPANE AND PENTAFLUOROPROPANE, AND METHODS OF USE

[75] Inventors: Diana Lynn Klug, Wilmington, Del.; Barbara Haviland Minor, Elkton, Md.; Donna Marie Patron, Newark; Tuneen E. C. Chisolm, New Castle, both of Del.; Allen Capron Sievert, Elkton, Md.

[73] Assignee: E. I. du Pont de Nemours and Company, Wilmington, Del.

[21] Appl. No.: 871,312

[22] Filed: Jun. 9, 1997

Related U.S. Application Data

[62] Division of Ser. No. 476,821, Jun. 7, 1995, Pat. No. 5,648,016, which is a division of Ser. No. 26,714, Mar. 5, 1993, Pat. No. 5,605,882, which is a continuation-in-part of Ser. No. 954,999, Oct. 1, 1992, abandoned, which is a continuation-in-part of Ser. No. 890,508, May 28, 1992, abandoned.

[51] Int. Cl.$^6$ .............................. C09K 5/04; C11D 7/26; C11D 7/30
[52] U.S. Cl. .............................. 252/67; 510/411; 62/324.1; 62/114
[58] Field of Search .............................. 252/67; 510/411; 62/324.1, 114

[56] References Cited

U.S. PATENT DOCUMENTS

| | | | |
|---|---|---|---|
| 3,362,180 | 1/1968 | Eiseman | 62/112 |
| 3,394,878 | 7/1968 | Eiseman | 252/67 |
| 3,409,555 | 11/1968 | Eiseman | 252/67 |
| 3,922,228 | 11/1975 | Hutchinson | 252/69 |
| 4,041,148 | 8/1977 | Simons et al. | 424/45 |
| 4,541,943 | 9/1985 | Powell | 252/67 |
| 4,559,154 | 12/1985 | Powell | 252/69 |
| 4,810,403 | 3/1989 | Bivens et al. | 252/67 |
| 4,948,526 | 8/1990 | Fellows et al. | 252/67 |
| 4,961,321 | 10/1990 | O'Neill et al. | 252/67 |
| 4,978,467 | 12/1990 | Shankland et al. | 252/69 |
| 5,023,009 | 6/1991 | Merchant | 252/171 |
| 5,023,010 | 6/1991 | Merchant | 252/171 |
| 5,026,498 | 6/1991 | Merchant | 252/171 |
| 5,087,383 | 2/1992 | Robeck et al. | 252/171 |
| 5,091,104 | 2/1992 | Van Der Puy | 252/171 |
| 5,137,932 | 8/1992 | Behme et al. | 521/131 |
| 5,166,182 | 11/1992 | Blanpied | 521/50 |
| 5,169,873 | 12/1992 | Behme et al. | 521/114 |
| 5,264,462 | 11/1993 | Hodson et al. | 521/88 |
| 5,433,880 | 7/1995 | Minor et al. | 252/67 |
| 5,444,101 | 8/1995 | De Vos et al. | 521/131 |
| 5,480,572 | 1/1996 | Minor | 252/67 |
| 5,484,546 | 1/1996 | Minor et al. | 252/67 |
| 5,605,882 | 2/1997 | Klug et al. | 510/411 |
| 5,648,016 | 7/1997 | Klug et al. | 252/67 |

FOREIGN PATENT DOCUMENTS

| | | |
|---|---|---|
| 2009169 | 8/1990 | Canada. |
| 416777 | 3/1991 | European Pat. Off. |
| 450855 | 10/1991 | European Pat. Off. |
| 0510295 | 1/1992 | European Pat. Off. |
| 3-93883 | 4/1991 | Japan. |
| 3093882 | 4/1991 | Japan. |
| 3093889 | 4/1991 | Japan. |
| 3093890 | 11/1991 | Japan. |
| 04110386 | 4/1992 | Japan. |
| 06041589-A | 2/1994 | Japan. |
| 06041591-A | 2/1994 | Japan. |
| 2274462 | 7/1994 | United Kingdom. |
| 9311201 | 6/1992 | WIPO. |
| 93/14173 | 7/1993 | WIPO. |
| 93/14174 | 7/1993 | WIPO. |
| 93/14175 | 7/1993 | WIPO. |

OTHER PUBLICATIONS

Research Disclosure vol. 146, disclosure No. 14623 Jun. 1976.

Defibaugh et al. Fluid Phase Equilibria vol. 81 pp. 285–305 dated 1992, actually published Jan. or Feb. 1993.

Mathur et al., "Fluorinated Ethers, A New Series of CFC Substitutes." Dept. of Chemistry, University of Tennessee, Jan. 28–Feb. 2, 1991, 10th Winter Fluorine Conference.

Kopko, "Beyond CFCs: Extending the Search for New Refrigerants." Ashrae CFC Technlogy Conf., Sep. 27–28, 1989.

International Search Report, PCT/US93/04614, International Filing Date May 20, 1993.

Proceedings of the XVIII International Congress of Refrigeration, Montreal, Quebec, Canada, Aug. 10–17, 1991, pp. 626–629.

1992 International Refrigeration Conference—Energy Efficiency and New Refrigerants, vol. II, Jul. 14–17, 1992, Purdue University, pp. 595–605, 611–619.

*Primary Examiner*—Douglas J. McGinty

[57] ABSTRACT

This invention relates to compositions that include at least one fluoroether and at least one hydrofluorocarbon. Included in this invention are compositions of a cyclic or acyclic hydrofluoroether of the formula $C_aF_bH_{2a+2-b}O_c$ wherein a=2 or 3 and $3 \leq b \leq 8$ and c=1 or 2 and a hydrofluorocarbon of the formula $C_nF_mH_{2n+2-m}$ wherein $1 \leq n \leq 4$ and $1 \leq m \leq 8$. Such compositions may be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

9 Claims, No Drawings

5,779,931

1

AZEOTROPE (LIKE) COMPOSITIONS WITH DIFLUOROMETHOXYTETRAFLUORO-PROPANE AND PENTAFLUOROPROPANE, AND METHODS OF USE

CROSS REFERENCE TO RELATED APPLICATIONS

This is a division of application Ser. No. 08/476,821, filed Jun. 7, 1995 now U.S. Pat. No. 5,648,016, which is a divisional of 08/026,714 filed Mar. 5, 1993, and granted Feb. 25, 1997, as U.S. Pat. No. 5,605,882, which is a continuation-in-part of U.S. patent application No.07/954, 999, filed Oct. 1, 1992, which is a continuation-in-part of U.S. patent application No. 07/890,508, filed May 28, 1992, now abandoned.

FIELD OF THE INVENTION

This invention relates to compositions that include at least one fluoroether and at least one hydrofluorocarbon. Such compositions may be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, displacement drying agents and as carriers for sterilant gases.

Included in this invention are compositions which include a fluoroether and a hydrofluorocarbon in which the halocarbon global warming potential (HGWP) of the hydrofluorocarbon is lowered by adding the fluoroether to the hydrofluorocarbon. Also included in this invention are compositions a fluoroether and a hydrofluorocarbon that are azeotropic or azeotrope-like.

BACKGROUND OF THE INVENTION

Fluorinated hydrocarbons have many uses, one of which is as a refrigerant. Such refrigerants include dichlorodifluorometane (CFC-12) and chlorodifluoromethane (HCFC-22).

In recent years it has been suggested that certain chlorofluorocarbon (CFC) and hydrochlorofluorocarbon (HCFC) refrigerants released into the atmosphere may adversely affect the ozone layer. Although this proposition has not yet been completely established, there is a movement toward the control of the use and the production of certain CFCs and HCFCs under an international agreement.

In order to address the potential problem of ozone depletion, it has been suggested that chlorofluorocarbon refrigerants and hydrochlorofluorocarbon refrigerants be replaced with hydrofluorocarbon refrigerants. Since the hydrofluorocarbon (HFC) refrigerants contain no chlorine, they have zero ozone depletion potential.

Another environmental concern is the role of CFCs in the "greenhouse effect". The greenhouse effect refers to the warming of the Earth's climate that takes place when atmospheric gases, which are relatively transparent to visible light and allow sunshine to reach the Earth, trap heat by absorbing infrared radiation released by the Earth.

There is presently no universally accepted methodology for combining all relevant factors into a singe global warming potential for emissions of gases such as CFCs. One approach is to define the greenhouse effect of a compound in terms of a potential to enhance global warming relative to a known standard. One such definition is known as a halocarbon global warming potential (HGWP), which is the ratio of incremental radiative warming resulting from an emission of a gas, over the lifetime of the gas in the atmosphere, to the calculated warming that would result from a release of the same mass of reference gas CFC-11.

While HFCs may have a zero ozone depletion potential, some HFCs may have an HGWP that may be undesirable and subject to governmental regulation. Accordingly, there is also a demand for the development of refrigerants that have a low ozone depletion potential while at the same time having a low HGWP.

It is preferred that refrigerants that include more than one component be azeotropic or azeotrope-like so that the composition of the refrigerant does not change when leaked or discharged to the atmosphere from refrigeration equipment. A change in composition of a refrigerant may affect its properties, such as performance or flammability.

It is also desirable to use compositions that have a low ozone depletion potential and/or a low HGWP and/or that are azeotropic or azeotrope-like as cleaning agents, blowing agents in the manufacture of closed-cell polyurethane, phenolic and thermoplastic foams, as propellants in aerosols, as heat transfer media, gaseous dielectrics, fire extinguishing agents, power cycle working fluids, such as for heat pumps, inert media for polymerization reactions, fluids for removing particulates from metal surfaces, as carrier fluids that may be used, for example, to place a fine film of lubricant on metal parts, or as buffing abrasive agents to remove buffing abrasive compounds from surfaces such as metal, as displacement drying agents for removing water, such as from jewelry or metal parts, as resist developers in conventional circuit manufacturing techniques including chlorine-type developing agents, and as strippers for photoresists when used with, for example, a chlorohydrocarbon, such as 1,1,1-trichloroethane or trichloroethylene.

SUMMARY OF THE INVENTION

This invention relates to compositions that include a fluoroether and a hydrofluorocarbon. Included in this invention are compositions of a cyclic or acyclic hydrofluoroether of the formula $C_aF_bH_{2a+2-b}O_c$ wherein a=2 or 3 and $3 \leq b \leq 8$ and c=1 or 2 and a hydrofluorocarbon of the formula $C_nF_mH_{2n+2-m}$ wherein $1 \leq n \leq 4$ and $1 \leq m \leq 8$. Such compositions may be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

Another aspect of this invention relates to the discovery that the HGWP of a hydrofluorocarbon can be lowered by adding to the hydrofluorocarbon a fluoroether having a lower HGWP than the HGWP of the hydrofluorocarbon. Accordingly, the present invention relates to a composition of a first component that includes a hydrofluorocarbon and a second component that includes a fluoroether that has an HGWP less than the HGWP of the first component, such that the HGWP of the composition is less than the HGWP of the first component.

Also included in this invention are compositions which include a fluoroether and a hydrofluorocarbon that are azeotropic or azeotrope-like.

DETAILED DESCRIPTION

The present invention relates to compositions that include a fluoroether and a hydrofluorocarbon (HFC). Included in this invention are compositions of a cyclic or acyclic hydrofluoroether of the formula $C_aF_bH_{2a+2-b}O_C$ wherein a=2 or 3 and 3≦b≦8 and c=1 or 2 and a hydrofluorocarbon of the formula $C_nF_mH_{2n+2-m}$ wherein 1≦n≦4 and 1≦m≦8. These compositions may be used as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

The fluoroethers that are included in this invention have two or three carbon atoms. Examples of such fluoroethers include the following.

1. Hexafluorodimethyl ether (116E, or $CF_3OCF_3$, boiling point= −59.0° C.),
2. Pentafluorodimethyl ether (125E, or $CHF_2OCF_3$, boiling point= −36.2° C.),
3. Bis(difluoromethyl) ether (134E, or $CHF_2OCHF_2$, boiling point= 5° C.),
4. Fluoromethyl trifluoromethyl ether (134aE, or $CH_2FOCF_3$, boiling point= −20.0° C.),
5. Trifluoromethyl methyl ether (143aE, or $CH_3OCF_3$, boiling point= −24.2° C.),
6. Perfluorooxetane (C-216E or

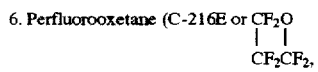

boiling point = −29.2° C.), 7. 2,2,4,4,5,5,-hexafluoro-1,3-dioxolane (C-216E2 or $C_3F_6O_2$, having a structure of

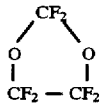

boiling point = −22.1° C.),

8. Perfluoromethyl ethyl ether (218E, or $CF_3OCF_2CF_3$, boiling point= −23.3° C.),
9. Perfluorodimethoxymethane (218E2, or $CF_3OCF_2CF_3$, boiling point=−10.2° C.), 10. 2,2,3,4,4-pentafluorooxetane (C-225eEαβ, or $C_3HF_5O$, having a structure of

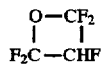

boiling point = 3.4° C.), 11. 1-trifluoromethoxy-1,1,2,2-tetrafluoroethane (227caEαβ, or $CF_3OCF_2CHF_2$, boiling point= about −3° C.),
12. Difluoromethoxy pentafluoroethane (227caEβγ, or $CHF_2OCF_2CF_3$, boiling point= −8.0° C.),
13. 1-trifluoromethoxy-1,2,2,2-tetrafluoroethane (227eaE, or $CF_3OCHFCF_3$, boiling point= −9.4° C.), 14. 2,2,4,4-tetrafluorooxetane (C-234fEαβ, or $C_3H_2F_4O$, having a structure of

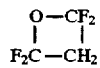

boiling point = 21.2° C.), 15. 2,2,3,3-tetrafluorooxetane (C-234fEβγ, or $C_3H_2F_4O$, having a structure of

boiling point = 28° C.), 16. 1-difluoromethoxy-1,1,2,2-tetrafluoroethane (236caE, or $CHF_2OCF_2CHF_2$, boiling point= 28.5° C.),
17. 1-difluoromethoxy-1,2,2,2-tetrafluoroethane (236eaEβγ, or CHF2OCHFCF3, boiling point= 23.20C),
18. 1-trifluoromethoxy-2,2,2-trifluoroethane (236faE, or $CF_3OCH_2CF_3$, boiling point= 5.6° C.),
19. 1-difluoromethoxy-2,2,2-trifluoroethane (245faEβγ, or $CHF_2OCH_2CF_3$, boiling point= 29° C.).

116E (CAS Reg. No. 1479-49-8) has been prepared by electrochemical fluorination of dimethyl ether as disclosed by Simons in U.S. Pat. No. 2,519,983.

125E (CAS Reg. No. 3822-68-2) has been prepared by electrochemical fluorination of dimethyl ether ($CH_3OCH_3$) as disclosed by Fox, et. al. in U.S. Pat. No. 3,511,760 and by Hutchinson in U.S. Pat. No. 3,887,439.

134E (CAS Reg. No. 1691-17-4) can be prepared by reaction of antimony trifluoride with $CHF_2OCHCl_2$ as disclosed by O'Neill in GB 2,248,617.

134aE (CAS Reg. No. 226101-0) has been made by the electrochemical fluorination of methyl 2-methoxypropionate as reported by Berenblit, et. al. Zh. Org. Khim., Vol. 12, pp. 767-770 (1976).

143aE (CAS Reg. No. 421-14-7) has been made by the reaction of methyl fluoroformate with sulfur tetrafluoride as reported by Aldrich and Sheppard, J. Am. Chem. Soc., Vol. 29, 11–15 (1964).

C-216E (CAS Reg. No. 425-82-1) can be made by electrochemical fluorination of trimethylene oxide (oxetane) in anhydrous hydrogen fluoride as disclosed by Kauck and Simons in U.S. Pat. No. 2,594,272.

C-216E2 (CAS Reg. No. 21297-65-4) has been prepared by UV irradiation of perfluoro-b-oxa-d-valerolactone in the vapor or liquid phase as reported by Throckinorton in J. Org. Chem. Vol. 34, pp. 3438–3440 (1969). The lactone was prepared by the reaction of KF with perfluorooxydiacetyl chloride.

218E (CAS Reg. No. 665-16-7) has been made by direct fluorination of $CF_3OCH_2CF_3$ (prepared by reaction of $CF_3OF$ with vinylidene fluoride) as reported by Sekiya and Ueda in Chemistry Letters, pp. 609–612 (1990).

218E2 (CAS Reg. No. 53772-78-4) was made in the electrochemical fluorination of methyl 2-methoxypropionate as reported by Berenbilt, et. al. Zh. Org. Khim., Vol. 12, pp. 767–770 (1976).

C-225eEαβ (CAS Reg. No. 144109-03-5) may be prepared by direct fluorination of trimethylene oxide (cyclo-$CH_2CH_2CH_2O$—) using techniques described by Lagow and Margrave in Progress in Inorganic Chemistry, Vol. 26, pp. 161–210 (1979) or by Adcock and Cherry in Ind. Eng. Chem. Res., Vol. 26, pp. 208–215 (1987). The direct fluorination is carried out to the desired level of fluorine incorporation into the starting material, and products receovered by fractional distillation.

227caEβγ (CAS Reg. No. 2356-61-8) has been prepared by reacting difluoroacetyl fluoride with cesium fluoride and carbonyl fluoride followed by treatment with sulfur tetrafluoride as disclosed by Eisemann in U.S. Pat. No. 3,362, 190.

227caβγ (CAS Reg. No. 53997-64-1) has been made by electrochemical fluorination of $CHCl_2OCF_2CHClF$ as reported by Okazaki, et. al. J. Fluorine Chem., Vol. 4, pp. 387–397 (1974).

227eaE (CAS Reg. No. 2356-62-9) was prepared by reacting 2-trifluoromethoxy-tetrafluoropropionyl fluoride (CF$_3$CF(OCF$_3$)COF) with aqueous potassium hydroxide at 230° C. as disclosed by Eisemann in U.S. Pat. No. 3,362, 190.

C-234fEαβ may be prepared by direct fluorination of trimethylene oxide (cl-CH$_2$CH$_2$CH$_2$O—) using techniques described by Lagow and Margrave in *Progress in Inorganic Chemistry*, Vol. 26, pp. 161–210 (1979) or by Adcock and Cherry in *Ind. Eng. Chem. Res.*, Vol. 26, pp. 208–215 (1987). The direct fluorination is carried out to the desired level of fluorine incorporation into the starting material, and products receovered by fractional distillation.

C-234fEβγ (CAS Reg. No. 765-63-9) has been prepared by Weinmayr (*J. Org. Chem.*, Vol. 28, pp. 492–494 (1963)) as a by-product from the reaction of TFE with formaldehyde in HF.

236caE (CAS Reg. No. 32778-11-3) has been prepared by fluorination of CHCl$_2$OCF$_2$CHF$_2$ (prepared in turn by chlorination of CH$_3$OCF$_2$CHF$_2$) using anhydrous hydrogen fluoride with antimony pentachloride catalyst as reported by Terrell, et. al. in J. Medicinal Chem., Vol. 15, pp. 604–606 (1972).

236eaβγ (CAS Reg. No. 57041-67-5) has been prepared by chlorination of methoxy acetyl chloride to give the intermediate, CHCl$_2$OCHClCOCl, which was isolated and reacted with sulfur tetrafluoride at 150° C. to give the product as disclosed by Halpern and Robin in U.S. Pat. No. 4,888,139.

236faE (CAS Reg. No. 20193-67-3) has been prepared by reaction of 2,2,2-trifluoroethanol with carbonyl fluoride to give the intermediate, CF$_3$CH$_2$OCOF, which was in turn reacted with sulfur tetrafluoride at 150°–200° C. to give the product as disclosed by Eisemann in U.S. Pat. No. 3,394, 878.

245faEβγ (CAS Reg. No. 1885-48-9) has been prepared by the reaction of chlorodifluoromethane with trifluoroethanol in the presence of potassium hydroxide as disclosed by Croix in U.S. Pat. No. 3,637,477.

The HFCs that may be combined with the fluoroethers include one or more of the following: difluoromethane (HFC-32), fluoromethane (HFC-41), pentafluoroethane (HFC-125), 1,1,2,2-tetrafluoroethane (HFC-134), 1,1,1,2-tetrafluoroethane (HFC-134a), 1,1,2-trifluoroethane (HFC-143), 1,1,1-trifluoroethane (HFC-143a), 1,1-difluoroethane (HFC-152a), fluoroethane (HFC-161), 1,1,1,2,2,3,3-heptafluoropropane (HFC-227ca), 1,1,1,2,3,3,3-heptafluoropropane (HFC-227ea), 1,1,1,3,3,3-hexafluoropropane (HFC-236fa), 1,1,2,2,3,3-hexafluoropropane (HFC-236ca), 1,1,1,2,2,3-hexafluoropropane (HFC-236cb), 1,1,2,2,3-pentafluoropropane (HFC-245ca), 1,1,1,2,2-pentafluoropropane (HFC-245cb), 1,1,2,3,3-pentafluoropropane (HFC-245ea), 1,1,1,3,3-pentafluoropropane (HFC-245fa), 1,2,2,3-tetrafluoropropane (HFC-254ca), 1,1,2,2-tetrafluoropropane (HFC-254cb), 1,1,1,2-tetrafluoropropane (HFC-254eb), 1,2,2-trifluoropropane (HFC-263ca), 1,1,1-trifluoropropane (HFC-263fb), 2,2-difluoropropane (HFC-272ca), 1,2-difluoropropane (HFC-272ea), 1,1-difluoropropane (HFC-272fb), 2-fluoropropane (HFC-281ea), 1-fluoropropane (HFC-281fa), 1,1,1,3,3,4,4,4-octafluorobutane (HFC-338mf), 1,1,1,4,4,4-hexafluorobutane (HFC-356mff), or (CF$_3$)$_2$CHCH$_3$, (HFC-356mmz).

The following can be used as refrigerants: compositions of a cyclic or acyclic hydrofluoroether of the formula $C_aF_bH_{2a+2-b}O_c$ wherein a=2 or 3 and $3 \leq b \leq 8$ and c=1 or 2 and a hydrofluorocarbon of the formula $C_nF_mH_{2n+2-m}$ wherein $1 \leq n \leq 4$ and $1 \leq m \leq 8$. Examples of such compositions include the following.

1–99 weight percent 116E and 1–99 weight percent HFC-32, HFC41, HFC-125, HFC-134, HFC-134a, HFC-143, HFC-143a HFC-152a, HFC-161, HFC-227ca, HFC-227ea, HFC-236ca, HFC-236cb, HFC-236ea, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent 125E and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent 134E and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236ea, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, HFC-281fa, HFC-338mf or 356mff.

1–99 weight percent 134aE and 1–99 weight percent HFC-32, HFC-125, HFC-134, HFC-134a, HFC-143, HFC-143a, HFC-152, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent 143aE and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa 1–99 weight percent C216E, and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-28 lea, or HFC-281fa 1–99 weight percent C-216E2 and 1–99 weight percent HFC-32, HFC-134, HFC-134a, HFC-143, HFC-152a, HFC-161, or HFC-245cb.

1–99 weight percent 218E and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa 1–99 weight percent 218E2 and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fa, HFC-263fb, HFC-272ca, HFC-272ea, HFC-272fb, HFC-281ea, or HFC-281fa.

1–99 weight percent C-225eEαβ and 1–99 weight percent HFC-143, HFC-236cb, HFC-236ea, or HFC-245cb.

1–99 weight percent 227caEαβ and 1–99 weight percent HFC-32, HFC-125, HFC-134, HFC-134a, HFC-143, HFC- 143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent 227caEβγ and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent 227eaE and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa.

1–99 weight percent C-234fEαβ and 1–99 weight percent HFC-245cb, HFC-245eb, HFC-356mff or HFC-356mmz.

1–99 weight percent C-234fE,-y and 1–99 weight percent HFC-245ca, HFC-245cb, HFC-245ea, HFC-254ca, HFC-356mff or HFC-356mmz.

1–99 weight percent 236caE and 1–99 weight percent HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-28 lea, or HFC-281fa.

1–99 weight percent 236eaEβγ and 1–99 weight percent HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, HFC-281fa, HFC-338mf, HFC-356mff or HFC-356mmz.

1–99 weight percent 236faE and 1–99 weight percent HFC-32, HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, or HFC-281fa 1–99 weight percent 245faEβγ and 1–99 weight percent HFC-125, HFC-134, HFC-134a, HFC-143, HFC-143a, HFC-152a, HFC-161, HFC-227ca, HFC-227ea, HFC-236ca, HFC-236cb, HFC-236fa, HFC-245ca, HFC-245cb, HFC-245ea, HFC-245fa, HFC-254ca, HFC-254cb, HFC-254eb, HFC-263ca, HFC-263fb, HFC-272ca, HFC-272ea, HFC-272fb, HFC-281ea, HFC-281fa, or HFC-356mff.

The present invention also relates to the discovery of azeotropic or azeotrope-like compositions of effective amounts of the following compounds to form an azeotropic or azeotrope-like composition at a specific temperature or pressure:

116E and HFC-32, HFC-41, HFC-125, HFC-134, HFC-134a, HFC-15 143, HFC-143a, HFC-152a or HFC-161; 125E and HFC-32, HFC-134, HFC-134a, HFC-143, HFC-152a or HFC-161; 134E and HFC-143, HFC-227ca, HFC-227ea, HFC-236ca, HFC-236cb, HFC-236ea, HFC-236fa, HFC-245cb, HFC-254cb, HFC-254eb, HFC-338mf, or HFC-356mff; 134aE and HFC-32, HFC-134, HFC-143, HFC-152a, HFC-227ca, HFC-227ea or HFC-245cb; 143aE and HFC-32, HFC-134, HFC-143a, HFC-152a, HFC-227ca, HFC-227ea or HFC-245cb; C216E and HFC-134, HFC-134a, HFC-143, HFC-152a, HFC-161 or HFC-245cb; C216E2 and HFC-32, HFC-134, HFC-134a, HFC-143, HFC-152a, HFC-161 or HFC-245cb; 218E and HFC-134, HFC-134a, HFC-143, HFC-152a, HFC-161 or HFC-263fb; 218E2 and HFC-134, HFC-134a, HFC-143, HFC-152a, HFC-161, HFC-236fa or HFC-263fb; C-225eEαβ and HFC-143, HFC-236cb, HFC-236ea or HFC-245cb; 227caEαβ and HFC-32, HFC-143, HFC-245cb, HFC-272ca, HFC-28lea or HFC-281fa; 227caEβγ and HFC-32, HFC-134, HFC-134a, HFC-143, HFC-152a, HFC-161, HFC-263fb, HFC-272ca, HFC-281ea or HFC-281fa; 227eaE and HFC-32, HFC-134, HFC-134a, HFC-143, HFC-152a, HFC-161, HFC-263fb, HFC-272ca, HFC-28lea or HFC-30 281fa; C-234fF-ao and HFC-245cb, HFC-245eb, HFC-356mff or HFC-356mmz; C-234fEβγ and HFC-245ca, HFC-245cb, HFC-245ea, HFC-254ca, HFC-356mff or HFC-356mmz; 236caE and HFC-143, HFC-245ca, or HFC-254ca; 236eaEβγ and HFC-143, HFC-245ca, HFC-263ca, HFC-338mf, HFC-356mff or HFC-356mmz; or 236faE and HFC-32, HFC-143, HFC-272ca, HFC-272fb or HFC-281fa; 245faEβγ 35 and HFC-356mff.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial compositional change.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and composition remaining after 50 weight percent of the original composition has been removed.

Therefore, included in this invention are compositions of effective amounts of a fluoroether and an HFC such that after 50 weight percent of an original composition is evaporated or boiled off to produce a reman remaining composition, the difference in the vapor pressure between the original composition and the remaining composition is about 10 percent or less. Examples of such compositions include the following:

116E and HFC-32, HFC4 1, HFC-125, HFC-134, HFC-134a, HFC-143, HFC-143a, HFC-152a or HFC-161; 125E and HFC-32, HFC-134, HFC-134a, HFC-143, HFC-152a or HFC-161; 134E and HFC-143, HFC-227ca, HFC-227ea, HFC-236ca, HFC-236cb, HFC-236ea, HFC-236fa, HFC-245cb, HFC-254cb, HFC-254eb, HFC-338mf or HFC-356rnff; 134aE and HFC-32, HFC-134, HFC-143, HFC-152a, HFC-227ca, HFC-227ea or HFC-245cb; 143aE and HFC-32, HFC-134, HFC-143a, HFC-152a, HFC-227ca, HFC-227ea or HFC-245cb; C216E and HFC-134, HFC-134a, HFC-143, HFC-152a, HFC-161 or HFC-245cb; C-216E2 and HFC-32, HFC-134, HFC-134a, HFC-143, HFC-152a, HFC-161 or HFC-245cb; 218E and HFC-134, HFC-134a, HFC-143, HFC-152a, HFC-161 or HFC-263fb; 218E2 and HFC-134, HFC-134a, HFC-143, HFC-152a, HFC-161, HFC-236fa or HFC-263fb; C-225eEαβ and HFC-143, HFC-236cb, HFC-236ea or HFC-245cb; 227caEαβ and HFC-32, HFC-143, HFC-245cb, HFC-272ca, HFC-28 1ea or HFC-281fa; 227caEβγ and HFC-32, HFC-134, HFC-134a, HFC-143, HFC-152a, HFC-161, HFC-263fb, HFC-272ca, HFC-281ea or HFC-281fa; 227eaE and HFC-32, HFC-134, HFC-134a, HFC-143, HFC-152a, HFC-161, HFC-263fb, HFC-272ca, HFC-281ea or HFC-281fa; C-234fEαβ and HFC-245cb, HFC-245eb, HFC-356mff or HFC-356mrmz; C-234fEβγ and HFC-245ca, HFC-245cb, HFC-245ea, HFC-254ca, HFC-356mff or HFC-356mmz; 236caE and HFC-143, HFC-245ca or HFC-254ca; 236eaEβγ and HFC-143, HFC-245ca, HFC-263ca, HFC-338mf, HFC-356mff or HFC-356mmz; 236faE and HFC-32, HFC-143, HFC-272ca, HFC-272fb or HFC-281fa; or 245faEβγ and HFC-356rnff.

Substantially constant boiling, azeotropic or azeotrope-like compositions of this invention comprise the following (all at 25° C.):

TABLE 1

| COMPONENTS | WEIGHT RANGES | PREFERRED |
|---|---|---|
| 116E/HFC-32 | 50.0–88.0/12.0–50.0 | 50.0–88.0/12.0–50.0 |
| 116E/HFC-41 | 5.0–84.0/16.0–95.0 | 40.0–84.0/16.0–60.0 |
| 116E/HFC-125 | 1.0–99.0/1.0–99.0 | 20.0–99.0/1.0–80.0 |
| 116E/HFC-134 | 52.0–99.0/1.0–48.0 | 70.0–99.0/1.0–30.0 |
| 116E/HFC-134a | 53.0–99.0/1.0–47.0 | 53.0–99.0/1.0–47.0 |
| 116E/HFC-143 | 60.0–99.0/1.0–40.0 | 60.0–99.0/1.0–40.0 |
| 116E/HFC-143a | 1.0–99.0/1.0–99.0 | 30.0–99.0/1.0–70.0 |
| 116E/HFC-152a | 60.0–99.0/1.0–40.0 | 60.0–99.0/1.0–40.0 |
| 116E/HFC-161 | 60.0–99.0/1.0–40.0 | 60.0–99.0/1.0–40.0 |
| 125E/HFC-32 | 25.0–73.0/27.0–75.0 | 30.0–70.0/30.0–70.0 |
| 125E/HFC-134 | 37.0–99.0/1.0–63.0 | 70.0–99.0/1.0–30.0 |
| 125E/HFC-134a | 1.0–99.0/1.0–99.0 | 1.0–50.0/50.0–99.0 |
| 125E/HFC-143 | 1.0–43.0/57.0–99.0 | 1.0–30.0/70.0–99.0 |
| 125E/HFC-152a | 1.0–61.0/39.0–99.0 | 1.0–40.0/60.0–99.0 |
| 125E/HFC-161 | 1.0–71.0/29.0–99.0 | 30.0–50.0/50.0–70.0 |
| 134E/HFC-143 | 1.0–99.0/1.0–99.0 | 1.0–50.0/50.0–99.0 |
| 134E/HFC-227ca | 1.0–51.0/49.0–99.0 | 1.0–40.0/60.0–99.0 |
| 134E/HFC-227ea | 1.0–49.0/51.0–99.0 | 1.0–40.0/60.0–99.0 |
| 134E/HFC-236ca | 1.0–99.0/1.0–99.0 | 30.0–99.0/1.0–70.0 |
| 134E/HFC-236cb | 1.0–99.0/1.0–99.0 | 1.0–70.0/30.0–99.0 |
| 134E/HFC-236ea | 1.0–99.0/1.0–99.0 | 30.0–70.0/30.0–70.0 |
| 134E/HFC-236fa | 1.0–99.0/1.0–99.0 | 1.0–80.0/20.0–99.0 |
| 134E/HFC-245cb | 1.0–62.0/38.0–99.0 | 1.0–50.0/50.0–99.0 |
| 134E/HFC-254cb | 1.0–99.0/1.0–99.0 | 1.0–70.0/30.0–99.0 |
| 134E/HFC-254eb | 1.0–99.0/1.0–99.0 | 1.0–99.0/1.0–99.0 |
| 134E/HFC-338mf | 27.0–99.0/1.0–73.0 | 40.0–80.0/20.0–60.0 |
| 134E/HFC-356mff | 40.0–99.0/1.0–60.0 | 40.0–99.0/1.0–60.0 |
| 134aE/HFC-32 | 1.0–55.0/45.0–99.0 | 1.0–55.0/45.0–99.0 |
| 134aE/HFC-134 | 1.0–99.0/1.0–99.0 | 20.0–60.0/40.0–80.0 |
| 134aE/HFC-143 | 52.0–99.0/1.0–48.0 | 52.0–99.0/1.0–48.0 |
| 134aE/HFC-152a | 1.0–99.0/1.0–99.0 | 1.0–99.0/1.0–99.0 |
| 134aE/HFC-227ca | 1.0–99.0/1.0–99.0 | 20.0–99.0/1.0–80.0 |
| 134aE/HFC-227ea | 1.0–99.0/1.0–99.0 | 20.0–99.0/1.0–80.0 |
| 134aE/HFC-245cb | 1.0–99.0/1.0–99.0 | 20.0–99.0/1.0–80.0 |
| 143aE/HFC-32 | 1.0–54.0/46.0–99.0 | 1.0–54.0/46.0–99.0 |
| 143aE/HFC-134 | 1.0–99.0/1.0–99.0 | 30.0–99.0/1.0–70.0 |
| 143aE/HFC-143a | 1.0–53.0/47.0–99.0 | 1.0–53.0/47.0–99.0 |
| 143aE/HFC-152a | 1.0–99.0/1.0–99.0 | 20.0–80.0/20.0–80.0 |

TABLE 1-continued

| COMPONENTS | WEIGHT RANGES | PREFERRED |
|---|---|---|
| 143aE/HFC-227ca | 1.0–99.0/1.0–99.0 | 1.0–80.0/20.0–99.0 |
| 143aE/HFC-227ea | 1.0–99.0/1.0–99.0 | 1.0–90.0/10.0–99.0 |
| 143aE/HFC-245cb | 20.0–99.0/1.0–80.0 | 20.0–80.0/20.0–80.0 |
| C216E/HFC-134 | 1.0–99.0/1.0–99.0 | 50.0–99.0/1.0–50.0 |
| C216E/HFC-134a | 1.0–99.0/1.0–99.0 | 20.0–80.0/20.0–80.0 |
| C216E/HFC-143 | 61.0–99.0/1.0–39.0 | 61.0–99.0/1.0–39.0 |
| C216E/HFC-152a | 1.0–99.0/1.0–99.0 | 20.0–99.0/1.0–80.0 |
| C216E/HFC-161 | 1.0–99.0/1.0–99.0 | 20.0–99.0/1.0–80.0 |
| C216E/HFC-245cb | 1.0–99.0/1.0–99.0 | 30.0–99.0/1.0–70.0 |
| C216E2/HFC-32 | 1.0–70.0/30.0–99.0 | 30.0–70.0/30.0–70.0 |
| C216E2/HFC-134 | 1.0–99.0/1.0–99.0 | 20.0–99.0/1.0–80.0 |
| G216E2/HFC-134a | 1.0–99.0/1.0–99.0 | 1.0–80.0/20.0–99.0 |
| C216E2/HFC-143 | 58.0/99.0/1.0–42.0 | 58.0–99.0/1.0–42.0 |
| C216E2/HFC-152a | 1.0–99.0/1.0–99.0 | 40.0–99.0/1.0–60.0 |
| C216E2/HFC-161 | 1.0–84.0/16.0–99.0 | 20.0–84.0/16.0–80.0 |
| C216E2/HFC-245cb | 1.0–99.0/1.0–99.0 | 20.0–99.0/1.0–80.0 |
| 218E/HFC-134 | 35.0–99.0/1.0–65.0 | 50.0–80.0/20.0–50.0 |
| 218E/HFC-134a | 1.0–99.0/1.0–99.0 | 20.0–80.0/20.0–80.0 |
| 218E/HFC-143 | 57.0–99.0/1.0–43.0 | 57.0–99.0/1.0–43.0 |
| 218E/HFC-152a | 41.0–99.0/1.0–59.0 | 41.0–99.0/1.0–59.0 |
| 218E/HFC-161 | 39.0–84.0/16.0–61.0 | 39.0–84.0/16.0–61.0 |
| 218E/HFC-263fb | 1.0–99.0/1.0–99.0 | 20.0–99.0/1.0–80.0 |
| 218E2/HFC-134 | 1.0–79.0/21.0–99.0 | 20.0–70.0/30.0–80.0 |
| 218E2/HFC-134a | 1.0–72.0/28.0–99.0 | 1.0–60.0/40.0–99.0 |
| 218E2/HFC-143 | 52.0–91.0/9.0–48.0 | 52.0–91.0/9.0–48.0 |
| 218E2/HFC-152a | 1.0–81.0/19.0–99.0 | 20.0–70.0/30.0–80.0 |
| 218E2/HFC-161 | 1.0–77.0/23.0–99.0 | 20.0–77.0/23.0–80.0 |
| 218E2/HFC-236fa | 1.0–99.0/1.0–99.0 | 30.0–99.0/1.0–70.0 |
| 218E2/HFC-263fb | 1.0–99.0/1.0–99.0 | 20.0–90.0/10.0–80.0 |
| C225eEαβ/HFC-143 | 1.0–99.0/1.0–99.0 | 20.0–99.0/1.0–80.0 |
| C225eEαβ/HFC-236cb | 1.0–99.0/1.0–99.0 | 1.0–80.0/20.0–99.0 |
| C225eEαβ/HFC-236ea | 1.0–99.0/1.0–99.0 | 30.0–99.0/1.0–70.0 |
| C225eEαβ/HFC-245cb | 1.0–65.0/35.0–99.0 | 1.0–65.0/35.0–99.0 |
| 227caEαβ/HFC-32 | 1.0–61.0/39.0–99.0 | 1.0–61.0/39.0–99.0 |
| 227caEαβ/HFC-143 | 42.0–99.0/1.0–58.0 | 42.0–95.0/5.0–58.0 |
| 227caEαβ/HFC-245cb | 1.0–82.0/18.0–99.0 | 1.0–80.0/20.0–99.0 |
| 227caEαβ/HFC-272ca | 1.0–99.0/1.0–99.0 | 30.0–99.0/1.0–70.0 |
| 227caEαβ/HFC-281ea | 1.0–99.0/1.0–99.0 | 40.0–99.0/1.0–60.0 |
| 227caEαβ/HFC-281fa | 1.0–99.0/1.0–99.0 | 40.0–99.0/1.0–60.0 |
| 227caEβγ/HFC-32 | 1.0–67.0/33.0–99.0 | 1.0–67.0/33.0–99.0 |
| 227caEβγ/HFC-134 | 1.0–76.0/24.0–99.0 | 10.0–50.0/50.0–90.0 |
| 227caEβγ/HFC-134a | 1.0–67.0/33.0–99.0 | 1.0–67.0/33.0–99.0 |
| 227caEβγ/HFC-143 | 46.0–91.0/9.0–54.0 | 46–91.0/9.0–54.0 |
| 227caEβγ/HFC-152a | 1.0–78.0/22.0–99.0 | 10.0–78.0/22.0–90.0 |
| 227caEβγ/HFC-161 | 1.0–72.0/28.0–99.0 | 10.0–72.0/28.0–90.0 |
| 227caEβγ/HFC-263fb | 1.0–99.0/1.0–99.0 | 20.0–99.0/1.0–80.0 |
| 227caEβγ/HFC-272ca | 1.0–99.0/1.0–99.0 | 30.0–99.0/1.0–70.9 |
| 227caEβγ/HFC-281ea | 1.0–99.0/1.0–99.0 | 40.0–99.0/1.0–60.0 |
| 227caEβγ/HFC-281fa | 1.0–99.0/1.0–99.0 | 40.0–99.0/1.0–60.0 |
| 227eaE/HFC-32 | 1.0–68.0/32.0–99.0 | 10.0–68.0/32.0–90.0 |
| 227eaE/HFC-134 | 1.0–78.0/22.0–99.0 | 10.0–60.0/40.0–90.0 |
| 227eaE/HFC-134a | 1.–70.0/30.0–99.0 | 1.0–69.0/40.0–99.0 |
| 227eaE/HFC-143 | 47.0–92.0/8.0–53.0 | 47.0–92.0/8.0–53.0 |
| 227eaE/HFC-152a | 1.0–80.0/20.0–99.0 | 10.0–80.0/20.0–90.0 |
| 227eaE/HFC-161 | 1.0–73.0/27.0–99.0 | 20.0–73.0/27.0–80.0 |
| 227eaE/HFC-263fb | 1.0–99.0/1.0–99.0 | 30.0–99.0/1.0–70.0 |
| 227eaE/HFC-272ca | 30.0–99.0/1.0–70.0 | 30.0–99.0/1.0–70.0 |
| 227eaE/HFC-281ea | 1.0–99.0/1.0–99.0 | 40.0–99.0/1.0–60.0 |
| 227eaE/HFC-281fa | 1.0–99.0/1.0–99.0 | 40.0–99.0/1.0–60.0 |
| C234fEαβ/HFC-245cb | 1.0–58.0/42.0–99.0 | 1.0–58.0/42.0–99.0 |
| C234fEαβ/HFC-245eb | 1.0–99.0/1.0–99.0 | 20.0–99.0/1.0–80.0 |
| C234fEαβ/HFC-356mff | 1.0–99.0/1.0–99.0 | 20.0–80.0/20.0–80.0 |
| C234fEαβ/HFC-356mmz | 1.0–99.0/1.0–99.0 | 20.0–80.0/20.0–80.0 |
| C234fEβγ/HFC-245ca | 1.0–99.0/1.0–99.0 | 10.0–80.0/20.0–90.0 |
| C234fEβγ/HFC-245cb | 1.0–56.0/46.0–99.0 | 1.0–40.0/60.0–99.0 |
| C234fEβγ/HFC-245ea | 1.0–99.0/1.0–99.0 | 10.0–89.0/21.0–90.0 |
| C234fEβγ/HFC-254ca | 1.0–99.0/1.0–99.0 | 10.0–99.0/1.0–90.0 |
| C234fEβγ/HFC-356mff | 1.0–99.0/1.–99.0 | 20.0–80.0/20.0–80.0 |
| C234fEβγ/HFC-356mmz | 1.0–82.0/18.0–99.0 | 1.0–60.0/40.0–99.0 |
| 236caE/HFC-143 | 1.0–60.0/40.0–99.0 | 10.0–60.0/40.0–90.0 |
| 236caE/HFC-254ca | 1.0–99.0/1.0–99.0 | 1.0–80.0/20.0–99.0 |
| 236caE/HFC-245ca | 1.0–99.0/1.0–99.0 | 1.0–80.0/20.0–99.0 |
| 236caEβγ/HFC-143 | 1.0–66.0/34.0–99.0 | 10.0–66.0/34.0–90.0 |
| 236caEβγ/HFC-245ca | 1.0–99.0/1.0–99.0 | 20.0–99.0/1.0–80.0 |
| 236caEβγ/HFC-263ca | 1.0–99.0/1.0–99.0 | 1.0–99.0/1.0–99.0 |
| 236caEβγ/HFC-338mf | 1.0–99.0/1.0–99.0 | 20.0–99.0/1.0–80.0 |
| 236caEβγ/HFC-356mff | 1.0–99.0/1.0–99.0 | 20.0–99.0/1.0–80.0 |

TABLE 1-continued

| COMPONENTS | WEIGHT RANGES | PREFERRED |
| --- | --- | --- |
| 236caEβγ/HFC-356mmz | 1.0–99.0/1.0–99.0 | 1.0–80.0/20.0–99.0 |
| 236faE/HFC-32 | 1.0–55.0/45.0–99.0 | 1.0–55.0/45.0–99.0 |
| 236faE/HFC-143 | 28.0–84.0/16.0–72.0 | 30.0–84.0/16.0–70.0 |
| 236faE/HFC-272ca | 1.0–99.0/1.0–99.0 | 10.0–99.0/1.0–90.0 |
| 236faE/HFC-272fb | 1.0–99.0/1.0–99.0 | 40.0–99.0/1.0–60.0 |
| 236faE/HFC-281fa | 1.0–99.0/1.0–99.0 | 1.0–99.0/1.0–99.0 |
| 245faEβγ/HFC-356mff | 1.0–99.0/1.0–99.0 | 1.0–70.0/30.0–99.0 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

There is no universally accepted methodology for combining all relevant factors into a single global warming potential for greenhouse gas emissions. One way to define the greenhouse effect of a compound is to determine its potential to enhance global warming relative to a known standard. In the present invention, the halocarbon global warming potential (HGWP) of several fluoroethers and HFCs were determined using known estimating techniques.

HGWP is defined as the ratio of incremental radiative warming resulting from an emission of a gas, over the lifetime of the gas in the atmosphere, to the calculated warming that would result from a release of the same mass of reference gas CFC-11, which has an HGWP of 1.0. The calculation of HGWP is discussed in Fisher et. al., *Model Calculations on the Relative Effects of CFCs and their Replacements on Global Warming*, Nature, Volume 344, pp. 513–516 (1990), the text of which is incorporated herein by reference.

It has been discovered that the HGWP of an HFC can be lowered by adding to the HFC a fluoroether having a lower HGWP than the HGWP of the HFC such that the combination of the HFC and the fluoroether has an HGWP lower than the HGWP of the HFC. Therefore, the present invention relates to a composition of a first component that includes a hydrofluorocarbon and a second component that includes a fluoroether that has an HGWP less than the HGWP of the first component, such that the HGWP of the composition is less than the HGWP of the first component.

The scope of this invention includes a single fluoroether compound added to a single HFC, as well as a single fluoroether added to mixtures of two or more HFCs. Further, the invention includes mixtures of one or more fluoroethers added to a single HFC, as well as mixtures of one or more fluoroethers added to mixtures of two or more HFCs.

The HGWP of a composition of components A and B is equal to |fractional composition of A|×|HGWP of A|+ |fractional composition of B|×|HGWP of B|. The HGWP of a composition of more than two components is determined in the same way, that is, by multiplying the fractional composition of a component by its HGWP, and then adding together the fractional HGWPs of all the components.

Specific examples illustrating the invention are given below. Unless otherwise stated therein, all percentages are by weight. It is to be understood that these examples are merely illustrative and in no way are to be interpreted as limiting the scope of the invention. All values given in the Examples are +/−5 percent.

EXAMPLE 1

Phase Study

A phase study on the following compositions, wherein the composition is varied and the vapor pressures are measured, at a constant temperature of 25° C., shows that the following compositions are azeotropic.

TABLE 2

| Weight % Fluoroether | Weight % HFC | Vapor Press. psia (kPa) |
|---|---|---|
| 75.2 wt. % 116E | 24.8 wt. % HFC-32 | 490.5 (3382) |
| 58.6 wt. % 116E | 41.4 wt. % HFC-32 | 575.6 (3969) |
| 86.0 wt. % 116E | 14.0 wt. % HFC-125 | 295.6 (2038) |
| 90.2 wt. % 116E | 9.8 wt. % HFC-134 | 302.7 (2087) |
| 90.0 wt. % 116E | 10.0 wt. % HFC-134a | 299.5 (2065) |
| 94.9 wt. % 116E | 5.1 wt. % HFC-143 | 305.9 (2109) |
| 94.8 wt. % 116E | 5.2 wt. % HFC-143a | 293.1 (2021) |
| 92.1 wt. % 116E | 7.9 wt. % HFC-152a | 305.4 (2106) |
| 87.3 wt. % 116E | 12.7 wt. % HFC-161 | 344.3 (2374) |
| 86.5 wt. % 125E | 13.5 wt. % HFC-134 | 130.7 (901) |
| 92.0 wt. % 125E | 8.0 wt % HFC-143 | 132.0 (910) |
| 84.4 wt. % 125E | 15.6 wt % HFC-152a | 134.1 (925) |
| 66.5 wt. % 125E | 33.5 wt. % HFC-161 | 171.1 (1179) |
| 37.9 wt. % 134E | 62.1 wt. % HFC-143 | 34.0 (235) |
| 13.6 wt. % 134E | 86.4 wt. % HFC-227ca | 65.9 (454) |
| 7.3 wt. % 134E | 92.7 wt. % HFC-227ea | 67.2 (463) |
| 78.0 wt. % 134E | 22.0 wt. % HFC-236ca | 63.8 (440) |
| 36.3 wt. % 134E | 63.7 wt. % HFC-236cb | 36.3 (250) |
| 52.8 wt. % 134E | 47.2 wt. % HFC-236ea | 33.3 (229) |
| 14.2 wt. % 134E | 85.8 wt. % HFC-236fa | 39.8 (274) |
| 28.5 wt % 134E | 71.5 wt. % HFC-245cb | 80.0 (551) |
| 29.7 wt. % 134E | 70.3 wt. % HFC-25Acb | 34.9 (241) |
| 28.6 wt. % 134E | 71.4 wt. % HFC-254cb | 35.5 (245) |
| 97.1 wt. % 134E | 2.9 wt. % HFC-356mff | 30.4 (210) |
| 65.5 wt % 134E | 34.5 wt % HFC-338mf | 33.2 (229) |
| 11.5 wt. % 134aE | 88.5 wt. % HFC-32 | 249.2 (1718) |
| 42.6 wt. % 134aE | 57.4 wt. % HFC-134 | 78.3 (540) |
| 98.1 wt. % 134aE | 1.9 wt. % HFC-143 | 73.9 (510) |
| 19.1 wt. % 134aE | 80.9 wt. % HFC-152a | 86.0 (593) |
| 65.5 wt % 134aE | 34.5 wt % HFC-227ca | 76.3 (526) |
| 65.4 wt. % 134aE | 34.6 wt. % HFC-227ea | 75.4 (520) |
| 57.7 wt. % 134aE | 42.3 wt. % HFC-245cb | 91.7 (632) |
| 6.2 wt. % 143aE | 93.8 wt. % HFC-32 | 247.4 (1706) |
| 92.4 wt. % 143aE | 7.6 wt. % HFC-134 | 127.6 (880) |
| 8.7 wt. % 143aE | 91.3 wt. % HFC-143a | 182.2 (1256) |
| 48.6 wt. % 143aE | 51.4 wt. % HFC-152a | 87.3 (602) |
| 71.5 wt % 143aE | 28.5 wt % HFC-227ca | 85.9 (592) |
| 75.6 wt. % 143aE | 24.4 wt. % HFC-227ea | 84.8 (585) |
| 59.6 wt. % 143aE | 40.4 wt. % HFC-245cb | 102.8 (709) |
| 79.8 wt. % C216E | 20.2 wt. % HFC-134 | 104.4 (720) |
| 61.7 wt. % C216E | 38.3 wt. % HFC-134a | 108.0 (744) |
| 91.9 wt. % C216E | 8.1 wt. % HFC-143 | 103.5 (714) |
| 77.6 wt. % C216E | 22.4 wt. % HFC-152a | 109.1 (752) |
| 58.8 wt. % C216E | 41.2 wt. % HFC-161 | 148.3 (1022) |
| 95.1 wt. % C216E | 4.9 wt. % HFC-245cb | 100.6 (693) |
| 36.0 wt. % C216E2 | 64.0 wt. % HFC-32 | 272.4 (1878) |
| 60.5 wt. % C216E2 | 39.5 wt. % HFC-134 | 88.6 (611) |
| 20.6 wt. % C216E2 | 79.4 wt. % HFC-134a | 99.0 (683) |
| 87.1 wt. % C216E2 | 12.9 wt. % HFC-143 | 82.9 (572) |
| 60.5 wt. % C216E2 | 39.5 wt. % HFC-152a | 95.6 (659) |
| 45.7 wt. % C216E2 | 54.3 wt. % HFC-161 | 138.3 (954) |
| 74.7 wt. % C216E2 | 25.3 wt. % HFC-245cb | 81.3 (561) |
| 63.3 wt. % 218E | 36.7 wt. % HFC-134 | 116.6 (804) |
| 53.0 wt. % 218E | 47.0 wt. % HFC-134a | 122.3 (843) |
| 85.3 wt. % 218E | 14.7 wt. % HFC-143 | 103.7 (715) |
| 68.2 wt. % 218E | 31.8 wt. % HFC-152a | 124.0 (855) |
| 62.6 wt. % 218E | 37.4 wt. % HFC-161 | 170.9 (1178) |
| 96.3 wt. % 218E | 3.7 wt. % HFC-263fb | 84.0 (579) |
| 46.1 wt. % 218E2 | 53.9 wt. % HFC-134 | 89.6 (617) |
| 24.7 wt. % 218E2 | 75.3 wt. % HFC-134a | 101.1 (697) |
| 78.3 wt. % 218E2 | 21.7 wt. % HFC-143 | 72.6 (501) |
| 51.0 wt. % 218E2 | 49.0 wt. % HFC-152a | 98.1 (676) |
| 46.4 wt. % 218E2 | 53.6 wt. % HFC-161 | 145.1 (1000) |
| 89.8 wt. % 218E2 | 10.2 wt. % HFC-236fa | 52.6 (363) |
| 60.5 wt. % 218E2 | 39.5 wt. % HFC-263fb | 57.9 (399) |
| 55.9 wt. % C225eEαβ | 44.1 wt. % HFC-143 | 38.0 (2626) |
| 16.7 wt. % C225eEαβ | 83.3 wt. % HFC-236cb | 33.7 (232) |
| 91.5 wt. % C225eEαβ | 8.5 wt. % HFC-236ea | 31.1 (214) |
| 22.4 wt. % C225eEαβ | 77.6 wt. % HFC-245cb | 70.1 (483) |
| 17.9 wt. % 227caEαβ | 82.1 wt. % HFC-32 | 253.4 (1747) |
| 70.9 wt. % 227caEαβ | 29.1 wt. % HFC-143 | 53.7 (370) |
| 8.1 wt. % 227caEαβ | 91.9 wt. % HFC-245cb | 67.4 (465) |
| 94.3 wt. % 227caEαβ | 5.7 wt. % HFC-272ca | 41.5 (286) |
| 31.5 wt. % 227caEαβ | 68.5 wt. % HFC-281ea | 47.3 (326) |
| 84.3 wt. % 227caEαβ | 15.7 wt. % HFC-281fa | 42.5 (293) |
| 28.4 wt. % 227caEαγ | 71.6 wt. % HFC-32 | 269.7 (1859) |
| 34.8 wt. % 227caEαγ | 65.2 wt. % HFC-134 | 82.7 (570) |
| 1.9 wt. % 227caEαγ | 98.1 wt. % HFC-134a | 98.3 (678) |
| 73.8 wt. % 227caEαγ | 26.2 wt. % HFC-143 | 66.2 (456) |
| 38.3 wt. % 227caEαγ | 61.7 wt. % HFC-152a | 91.4 (630) |
| 34.4 wt. % 227caEαγ | 65.6 wt. % HFC-161 | 137.5 (948) |
| 32.9 wt. % 227caEαγ | 67.1 wt. % HFC-263fb | 54.6 (376) |
| 89.0 wt. % 227caEαγ | 11.0 wt. % HFC-272ca | 49.6 (342) |
| 73.1 wt. % 227caEαγ | 26.9 wt. % HFC-281ea | 54.0 (372) |
| 85.9 wt. % 227caEαγ | 14.1 wt. % HFC-281fa | 51.1 (352) |
| 30.0 wt. % 227eaE | 70.0 wt. % HFC-32 | 272.2 (1877) |
| 38.2 wt. % 227eaE | 61.8 wt. % HFC-134 | 84.7 (584) |
| 9.3 wt. % 227eaE | 90.7 wt. % HFC-134a | 98.6 (680) |
| 74.9 wt. % 227eaE | 25.1 wt. % HFC-143 | 68.9 (475) |
| 42.1 wt. % 227eaE | 57.9 wt. % HFC-152a | 93.3 (643) |
| 37.5 wt. % 227eaE | 62.5 wt. % HFC-161 | 139.5 (962) |
| 49.3 wt. % 227eaE | 50.7 wt. % HFC-263fb | 55.7 (384) |
| 90.7 wt. % 227eaE | 9.3 wt. % HFC-272ca | 52.1 (359) |
| 76.8 wt. % 227eaE | 23.2 wt. % HFC-281ea | 56.0 (386) |
| 87.6 wt. % 227eaE | 12.4 wt. % HFC-281fa | 53.4 (368) |
| 13.5 wt. % C-234fEαβ | 86.5 wt. % HFC-245cb | 69.9 (482) |
| 49.1 wt. % C-234fEαβ | 50.9 wt. % HFC-245eb | 17.6 (121) |
| 59.0 wt. % C-234fEαβ | 41.0 wt. % HFC-356mff | 18.8 (130) |
| 50.1 wt. % C-234fEαβ | 49.9 wt. % HFC-356mmz | 20.1 (139) |
| 33.6 wt. % C-234fEβγ | 66.4 wt. % HFC-245ca | 14.5 (100) |
| 10.2 wt. % C-234fEβγ | 89.8 wt. % HFC-245cb | 69.1 (476) |
| 36.0 wt. % C-234fEβγ | 64.0 wt. % HFC-245ea | 14.5 (100) |
| 36.0 wt. % C-234fEβγ | 64.0 wt. % HFC-254ca | 13.8 (95) |
| 43.1 wt. % C-234fEβγ | 56.9 wt. % HFC-356mff | 17.1 (118) |
| 35.8 wt. % C-234fEβγ | 64.2 wt. % HFC-356mmz | 18.6 (128) |
| 12.0 wt. % 236caE | 88.0 wt. % HFC-143 | 33.4 (230) |
| 17.6 wt. % 236caE | 82.4 wt. % HFC-254ca | 13.8 (95) |
| 25.9 wt. % 236eaEβγ | 74.1 wt. % HFC-143 | 34.7 (239) |
| 69.1 wt. % 236eaEβγ | 30.9 wt. % HFC-245ca | 16.1 (111) |
| 4.1 wt. % 236eaEβγ | 95.9 wt. % HFC-263ca | 18.3 (126) |
| 92.6 wt. % 236eaEβγ | 7.49 wt. % HFC-338mf | 18.9 (130) |
| 96.9 wt. % 236eaEβγ | 3.1 wt. % HFC-356mff | 15.7 (108) |
| 15.1 wt. % 236eaEβγ | 84.9 wt. % HFC-356mmz | 16.7 (115) |
| 8.5 wt. % 236faE | 91.5 wt. % HFC-32 | 248.6 (1714) |
| 56.9 wt. % 236faE | 43.1 wt. % HFC-143 | 45.1 (311) |
| 27.8 wt. % 236faE | 72.2 wt. % HFC-272ca | 34.8 (240) |
| 82.3 wt. % 236faE | 17.7 wt. % HFC-272fb | 30.2 (208) |
| 9.3 wt. % 236faE | 90.7 wt % HFC-281fa | 37.7 (260) |
| 4.4 wt. % 245faEβγ | 95.6 wt. % HFC-356mff | 14.9 (103) |

EXAMPLE 2

Impact of Vapor Leakage on Vapor Pressure at 25° C.

A vessel is charged with an initial composition at 25° C., and the vapor pressure of the composition is measured. The composition is allowed to leak from the vessel, while the temperature is held constant at 25° C., until 50 weight percent of the initial composition is removed, at which time the vapor pressure of the composition remaining in the vessel is measured. The results are summarized below.

TABLE 3

| Refrigerant Composition | 0 wt % evaporated psia (kPa) | 50 wt % evaporated psia (kPa) | % change in vapor pressure |
|---|---|---|---|
| 116E/HFC-32 | | | |
| 75.2/24.8 | 490.6 (3385) | 490.6 (3385) | 0.0 |
| 89/11 | 484.3 (3341) | 434.4 (2297) | 10.3 |
| 88/12 | 485.8 (3352) | 451.4 (3114) | 7.1 |
| 70/30 | 490.4 (3383) | 490.0 (3381) | 0.6 |
| 60/40 | 489.6 (3378) | 488.0 (3367) | 0.3 |
| 50/50 | 488.8 (3372) | 486.1 (3354) | 0.6 |

TABLE 3-continued

| Refrigerant Composition | 0 wt % evaporated psia (kPa) | 50 wt % evaporated psia (kPa) | % change in vapor pressure |
|---|---|---|---|
| 80/20 | 490.2 (3382) | 489.1 (3374) | 0.2 |
| 116E/HFC-41 | | | |
| 58.6/41.4 | 575.6 (3971) | 575.6 (3971) | 0.0 |
| 70/30 | 572.4 (3949) | 566.7 (3910) | 1.0 |
| 85/15 | 540.4 (3728) | 483.1 (3333) | 10.6 |
| 84/16 | 544.9 (3759) | 493.7 (3406) | 9.3 |
| 40/60 | 571.3 (3942) | 558.5 (3853) | 2.2 |
| 30/70 | 565.7 (3903) | 515.9 (3559) | 8.8 |
| 28/72 | 564.1 (3892) | 505.8 (3490) | 10.3 |
| 29/71 | 564.9 (3897) | 510.7 (3523) | 9.6 |
| 5/95 | 512.9 (3539) | 477.9 (3297) | 6.6 |
| 116E/HFC-125 | | | |
| 86.0/14.0 | 295.6 (2039) | 295.6 (2039) | 0.0 |
| 99/1 | 292.7 (2019) | 292.6 (2018) | 0.0 |
| 70/30 | 292.2 (2016) | 291.1 (2008) | 0.4 |
| 60/40 | 297.3 (2051) | 284.0 (1959) | 4.5 |
| 50/50 | 280.6 (1936) | 273.9 (1889) | 2.4 |
| 40/60 | 272.0 (1876) | 260.5 (1797) | 4.4 |
| 30/70 | 261.0 (1800) | 244.0 (1683) | 6.5 |
| 10/90 | 227.3 (1568) | 209.5 (1445) | 7.2 |
| 1/99 | 202.5 (1397) | 199.8 (1378) | 1.3 |
| 116E/HFC-134 | | | |
| 99.0/1.0 | 294.8 (2033) | 294.0 (2027) | 0.3 |
| 90.2/9.8 | 302.7 (2087) | 302.7 (2087) | 0.0 |
| 70.0/30.0 | 293.5 (2024) | 285.2 (1967) | 2.8 |
| 52.0/48.0 | 283.9 (1957) | 258.0 (1779) | 9.1 |
| 116E/HFC-134a | | | |
| 90.0/10.0 | 299.5 (2066) | 299.5 (2066) | 0.0 |
| 99/1 | 293.8 (2027) | 293.5 (2025) | 0.0 |
| 52/48 | 276.8 (1909) | 248.6 (1715) | 10.2 |
| 53/47 | 277.5 (1914) | 251.8 (1737) | 9.3 |
| 60/40 | 282.6 (1949) | 267.0 (1842) | 5.5 |
| 70/30 | 289.7 (1998) | 281.6 (1943) | 2.8 |
| 80/20 | 296.2 (2043) | 293.7 (2026) | 0.8 |
| 116E/HFC-143 | | | |
| 94.9/5.1 | 305.9 (2110) | 305.9 (2110) | 0.0 |
| 99/1 | 300.2 (2071) | 295.6 (2039) | 1.5 |
| 80/20 | 299.2 (2064) | 295.9 (2041) | 1.1 |
| 70/30 | 293.5 (2025) | 285.2 (1967) | 2.8 |
| 65/35 | 290.6 (2005) | 280.2 (1933) | 3.5 |
| 61/39 | 300.6 (2074) | 298.3 (2058) | 0.8 |
| 60/40 | 300.6 (2074) | 283.6 (1956) | 5.6 |
| 116E/HFC-143a | | | |
| 94.8/5.2 | 293.1 (2022) | 293.1 (2022) | 0.0 |
| 70/30 | 281.6 (1943) | 277.4 (1914) | 1.5 |
| 60/40 | 273.6 (1887) | 265.0 (1828) | 3.1 |
| 50/50 | 264.3 (1823) | 250.0 (1725) | 5.4 |
| 40/60 | 253.7 (1750) | 232.3 (1602) | 8.4 |
| 10/90 | 206.8 (1426) | 186.0 (1283) | 10.1 |
| 1/99 | 183.6 (1266) | 180.9 (1248) | 1.5 |
| 99/1 | 292.5 (2018) | 292.5 (2018) | 0.0 |
| 116E/HFC-152a | | | |
| 92.1/7.9 | 305.5 (2108) | 305.5 (2108) | 0.0 |
| 99/1 | 296.4 (2045) | 295.1 (2036) | 0.4 |
| 70/30 | 292.3 (2016) | 280.4 (1934) | 4.1 |
| 60/40 | 286.6 (1977) | 259.3 (1789) | 9.5 |
| 116E/HFC-161 | | | |
| 87.5/12.7 | 344.4 (2376) | 244.4 (2376) | 0.0 |
| 99/1 | 307.4 (2121) | 297.5 (2052) | 3.2 |
| 70/30 | 337.9 (2331) | 330.2 (2278) | 2.3 |
| 60/40 | 334.1 (2305) | 308.4 (2128) | 7.7 |
| 95/5 | 335.6 (2315) | 324.8 (2241) | 3.2 |
| 125E/HFC-32 | | | |
| 1.0/99.0 | 246.2 (1697) | 245.9 (1695) | 0.1 |
| 10.0/90.0 | 241.2 (1663) | 238.8 (1646) | 1.0 |
| 20.0/80.0 | 235.0 (1620) | 230.0 (1586) | 2.1 |
| 30.0/70.0 | 227.8 (1571) | 220.1 (1518) | 3.4 |
| 40.0/60.0 | 219.4 (1513) | 209.3 (1443) | 4.6 |
| 50.0/50.0 | 209.5 (1444) | 197.4 (1361) | 5.8 |
| 60.0/40.0 | 197.9 (1364) | 184.7 (1273) | 6.7 |
| 70.0/30.0 | 184.4 (1271) | 171.2 (1180) | 7.2 |
| 80.0/20.0 | 168.5 (1162) | 157.2 (1084) | 6.7 |
| 90.0/10.0 | 149.9 (1034) | 142.8 (985) | 4.7 |
| 99.0/1.0 | 130.8 (902) | 129.9 (896) | 0.7 |
| 125E/HFC-134 | | | |
| 37.0/63.0 | 116.3 (802) | 105.1 (725) | 9.6 |
| 70.0/30.0 | 128.6 (887) | 127.6 (880) | 0.8 |
| 86.5/13.5 | 130.7 (901) | 130.7 (901) | 0.0 |
| 99/1.0 | 128.9 (889) | 128.8 (888) | 0.1 |
| 125E/HFC-134a | | | |
| 1.0/99.0 | 98.5 (679) | 98.5 (679) | 0.0 |
| 10.0/90.0 | 100.9 (696) | 100.4 (692) | 0.5 |
| 20.0/80.0 | 103.5 (714) | 102.6 (707) | 0.9 |
| 30.0/70.0 | 106.2 (732) | 105.0 (724) | 1.1 |
| 40.0/60.0 | 108.9 (751) | 107.6 (742) | 1.2 |
| 50.0/50.0 | 111.8 (771) | 110.4 (761) | 1.3 |
| 60.0/40.0 | 114.8 (792) | 113.4 (782) | 1.2 |
| 70.0/30.0 | 117.9 (813) | 116.7 (805) | 1.0 |
| 80.0/20.0 | 121.3 (836) | 120.3 (829) | 0.8 |
| 90.0/10.0 | 124.8 (860) | 124.2 (856) | 0.5 |
| 99.0/1.0 | 128.1 (883) | 128.1 (883) | 0.0 |
| 125E/HFC-143 | | | |
| 57.0/43.0 | 123.5 (852) | 112.1 (773) | 9.2 |
| 60.0/40.0 | 124.2 (856) | 115.9 (799) | 6.7 |
| 70.0/30.0 | 126.9 (875) | 122.4 (844) | 3.6 |
| 92.0/8.0 | 132.0 (910) | 132.0 (190) | 0.0 |
| 99.0/1.0 | 129.5 (893) | 129.3 (892) | 0.2 |
| 125E/HFC-152a | | | |
| 39.0/61.0 | 120.3 (829) | 108.6 (747) | 9.7 |
| 50.0/50.0 | 125.3 (864) | 118.5 (817) | 5.4 |
| 60.0/40.0 | 129.0 (889) | 125.6 (866) | 2.7 |
| 84.4/15.6 | 134.1 (925) | 134.1 (925) | 0.0 |
| 99.0/1.0 | 129.4 (892) | 129.2 (891) | 0.2 |
| 125E/HFC-161 | | | |
| 29.0/71.0 | 161.6 (1114) | 145.8 (1006) | 9.8 |
| 50.0/50.0 | 169.0 (1165) | 166.3 (1146) | 1.6 |
| 66.5/33.5 | 171.1 (1179) | 171.1 (1179) | 0.0 |
| 70.0/30.0 | 170.9 (1179) | 170.8 (1177) | 0.1 |
| 99.0/1.0 | 133.2 (919) | 130.5 (900) | 2.1 |
| 134E/HFC-143 | | | |
| 1.0/99.0 | 33.1 (228) | 33.1 (228) | 0.0 |
| 37.9/62.1 | 34.0 (235) | 34.0 (235) | 0.0 |
| 50.0/50.0 | 33.9 (234) | 33.9 (234) | 0.0 |
| 70.0/30.0 | 33.2 (229) | 33.1 (228) | 0.4 |
| 99.0/1.0 | 30.6 (211) | 30.5 (210) | 0.1 |
| 134E/HFC-227ca | | | |
| 1.0/99.0 | 64.2 (443) | 64.1 (442) | 0.1 |
| 13.6/86.4 | 65.9 (454) | 65.9 (454) | 0.0 |
| 30.0/70.0 | 64.6 (445) | 63.5 (438) | 1.6 |
| 40.0/60.0 | 63.0 (434) | 60.4 (416) | 4.1 |
| 51.0/49.0 | 60.9 (420) | 55.0 (379) | 9.6 |
| 134E/HFC-227ea | | | |
| 7.3/92.7 | 672 (463) | 67.2 (463) | 0.0 |
| 1.0/99.0 | 66.8 (461) | 66.8 (461) | 0.0 |
| 40.0/60.0 | 62.6 (432) | 59.3 (409) | 5.3 |
| 50.0/50.0 | 60.3 (416) | 54.0 (372) | 10.4 |
| 49.0/51.0 | 60.6 (418) | 54.6 (376) | 9.9 |
| 134E/HFC-236ca | | | |
| 78.0/22.0 | 29.5 (203) | 29.5 (203) | 0.0 |
| 90/10 | 29.4 (202) | 29.4 (202) | 0.0 |
| 99/1 | 29.2 (201) | 292 (201) | 0.0 |
| 70/30 | 29.4 (202) | 29.4 (202) | 0.0 |

TABLE 3-continued

| Refrigerant Composition | 0 wt % evaporated psia (kPa) | 50 wt % evaporated psia (kPa) | % change in vapor pressure |
|---|---|---|---|
| 60/40 | 29.2 (202) | 29.2 (201) | 0.3 |
| 50/50 | 29.0 (200) | 29.0 (200) | 0.0 |
| 30/70 | 28.0 (193) | 27.7 (191) | 1.1 |
| 10/90 | 26.2 (180) | 26.0 (179) | 0.8 |
| 1/99 | 25.1 (173) | 25.0 (172) | 0.4 |
| 134E/HFC-236cb | | | |
| 1.0/99.0 | 33.8 (233) | 33.8 (233) | 0.0 |
| 36.3/63.7 | 36.3 (250) | 36.3 (250) | 0.0 |
| 40.0/60.0 | 36.3 (250) | 36.3 (250) | 0.0 |
| 70.0/30.0 | 34.8 (240) | 34.3 (236) | 1.6 |
| 99.0/1.0 | 30.6 (211) | 30.5 (210) | 0.3 |
| 134E/HFC-236ea | | | |
| 1.0/99.0 | 28.9 (199) | 28.9 (199) | 0.0 |
| 30.0/70.0 | 32.6 (225) | 32.4 (223) | 0.7 |
| 52.8/472 | 33.3 (229) | 33.3 (229) | 0.0 |
| 70.0/30.0 | 32.9 (227) | 32.8 (226) | 0.3 |
| 99.0/1.0 | 30.6 (211) | 30.5 (210) | 0.3 |
| 134E/HFC-236fa | | | |
| 142/85.8 | 39.8 (274) | 39.8 (274) | 0.0 |
| 1.0/99.0 | 39.4 (272) | 39.4 (272) | 0.0 |
| 40.0/60.0 | 38.8 (268) | 38.6 (266) | 0.5 |
| 60.0/40.0 | 37.1 (256) | 36.3 (250) | 2.2 |
| 80.0/20.0 | 34.4 (237) | 33.3 (230) | 3.2 |
| 99.0/1.0 | 30.7 (212) | 30.5 (210) | 0.7 |
| 134E/HFC-245cb | | | |
| 1.0/99.0 | 69.0 (476) | 67.8 (467) | 1.7 |
| 28.5/71.5 | 80.0 (551) | 80.0 (551) | 0.0 |
| 40.0/60.0 | 79.6 (549) | 79.0 (545) | 0.7 |
| 50.0/50.0 | 78.9 (544) | 77.4 (534) | 1.9 |
| 62.0/38.0 | 77.9 (537) | 71.4 (492) | 8.4 |
| 134E/HFC-254cb | | | |
| 1.0/99.0 | 342 (236) | 34.2 (236) | 0.0 |
| 29.7/70.3 | 34.9 (241) | 34.9 (241) | 0.0 |
| 40.0/60.0 | 34.8 (240) | 34.8 (240) | 0.0 |
| 70.0/30.0 | 33.6 (232) | 33.4 (230) | 0.7 |
| 99.0/1.0 | 30.6 (211) | 30.5 (210) | 0.1 |
| 134E/HFC-254eb | | | |
| 28.6/71.4 | 35.5 (245) | 35.5 (245) | 0.0 |
| 15.0/85.0 | 35.3 (243) | 35.3 (243) | 0.0 |
| 1.0/99.0 | 34.8 (240) | 34.8 (240) | 0.0 |
| 60.0/40.0 | 34.7 (239) | 34.5 (238) | 0.6 |
| 80.0/20.0 | 33.1 (228) | 32.7 (225) | 1.2 |
| 99.0/1.0 | 30.6 (211) | 30.5 (210) | 0.3 |
| 134E/HFC-338mf | | | |
| 27.0/73.0 | 30.5 (210) | 27.6 (190) | 9.4 |
| 40.0/60.0 | 32.2 (222) | 31.1 (214) | 3.4 |
| 65.5/34.5 | 33.2 (229) | 33.2 (229) | 0.0 |
| 80.0/20.0 | 32.9 (227) | 32.6 (225) | 0.8 |
| 99.0/1.0 | 30.6 (211) | 30.5 (210) | 0.4 |
| 134E/HFC-356mff | | | |
| 97.1/2.9 | 30.4 (210) | 30.4 (210) | 0.0 |
| 99.0/1.0 | 30.4 (210) | 30.4 (210) | 0.0 |
| 60.0/40.0 | 28.7 (198) | 27.8 (192) | 3.1 |
| 40.0/60.0 | 26.4 (182) | 23.9 (165) | 9.5 |
| 39.0/61.0 | 263 (181) | 23.6 (163) | 10.3 |
| 134aE/HFC-32 | | | |
| 11.5/88.5 | 249.1 (1718) | 249.1 (1718) | 0.0 |
| 1/99 | 247.2 (1705) | 247.1 (1705) | 0.0 |
| 20/80 | 248.3 (1713) | 247.7 (1709) | 0.2 |
| 30/70 | 245.8 (1695) | 243.0 (1676) | 1.1 |
| 56/44 | 231.1 (1594) | 207.6 (1432) | 10.2 |
| 55/45 | 232.0 (1600) | 210.0 (1449) | 9.5 |
| 40/60 | 241.9 (1669) | 234.5 (1618) | 3.0 |
| 134aE/HFC-134 | | | |
| 99.0/1.0 | 74.0 (510) | 74.0 (510) | 0 |

TABLE 3-continued

| Refrigerant Composition | 0 wt % evaporated psia (kPa) | 50 wt % evaporated psia (kPa) | % change in vapor pressure |
|---|---|---|---|
| 60.0/40.0 | 77.9 (537) | 77.9 (537) | 0 |
| 42.6/57.4. | 78.3 (540) | 78.3 (540) | 0 |
| 20.0/80.0 | 77.7 (536) | 77.7 (536) | 0 |
| 1.0/99.0 | 76.2 (525) | 76.2 (525) | 0 |
| 134aE/HFC-143 | | | |
| 99.0/1.0 | 73.8 (509) | 73.8 (509) | 0 |
| 98.1/1.9 | 73.9 (510) | 73.9 (510) | 0 |
| 52.0/48.0 | 65.0 (448) | 58.7 (405) | 9.7 |
| 134aE/HFC-152a | | | |
| 19.1/80.9 | 86.1 (594) | 86.1 (594) | 0.0 |
| 10/90 | 86.0 (593) | 86.0 (593) | 0.0 |
| 1/99 | 85.8 (592) | 85.8 (592) | 0.0 |
| 30/70 | 86.0 (593) | 86.0 (593) | 0.0 |
| 50/50 | 85.0 (586) | 84.9 (585) | 0.1 |
| 70/30 | 82.7 (570) | 82.2 (567) | 0.6 |
| 80/20 | 80.7 (556) | 80.0 (552) | 0.9 |
| 99/1 | 74.3 (512) | 74.2 (512) | 0.1 |
| 134aE/HFC-227ca | | | |
| 65.5/34.5 | 76.2 (525) | 76.2 (525) | 0.0 |
| 80/20 | 75.8 (523) | 75.8 (523) | 0.0 |
| 90/10 | 75.0 (517) | 74.9 (516) | 0.1 |
| 99/1 | 74.0 (510) | 73.9 (510) | 0.1 |
| 50/50 | 75.7 (522) | 75.6 (521) | 0.1 |
| 40/60 | 74.8 (516) | 74.4 (513) | 0.5 |
| 30/70 | 73.4 (506) | 72.7 (501) | 1.0 |
| 20/90 | 71.2 (491) | 70.2 (484) | 1.4 |
| 1/99 | 64.2 (443) | 64.1 (442) | 0.3 |
| 134aE/HFC-227ea | | | |
| 65.4/34.6 | 75.5 (521) | 75.5 (521) | 0.0 |
| 80/20 | 75.2 (518) | 75.1 (518) | 0.1 |
| 90/10 | 74.6 (514) | 74.6 (514) | 0.0 |
| 99/1 | 73.9 (509) | 73.9 (509) | 0.0 |
| 50/50 | 75.1 (518) | 75.0 (517) | 0.1 |
| 30/70 | 73.4 (506) | 73.0 (503) | 0.5 |
| 10/90 | 69.6 (480) | 69.2 (477) | 0.6 |
| 1/99 | 67.0 (462) | 67.0 (462) | 0.0 |
| 134aE/HFC-245cb | | | |
| 57.7/42.3 | 91.6 (632) | 91.6 (632) | 0.0 |
| 70/30 | 90.9 (627) | 90.1 (621) | 0.9 |
| 80/20 | 89.0 (614) | 85.9 (592) | 3.5 |
| 92/8 | 83.3 (574) | 77.4 (534) | 7.1 |
| 99/1 | 75.5 (521) | 74.1 (511) | 1.8 |
| 30/70 | 87.6 (604) | 84.3 (581) | 3.8 |
| 20/80 | 83.4 (575) | 78.4 (541) | 6 |
| 10.90 | 76.9 (530) | 72.3 (498) | 6 |
| 1/99 | 67.7 (467) | 67.8 (467) | 0.1 |
| 143aE/HFC-32 | | | |
| 62/98.8 | 247.4 (1707) | 247.4 (1707) | 0.0 |
| 1/99 | 246.9 (1703) | 246.9 (1703) | 0.0 |
| 20/80 | 245.1 (1691) | 243.9 (1682) | 0.5 |
| 30/70 | 241,4 (1665) | 237.3 (1637) | 1.7 |
| 40/60 | 236.1 (1629) | 226.9 (1565) | 3.9 |
| 50/50 | 228.8 (1578) | 210.9 (1455) | 7.8 |
| 55/45 | 224 (1545) | 200.1 (1380) | 10.6 |
| 54/46 | 225 (1552) | 202 (1393) | 10.0 |
| 143aE/HFC-134 | | | |
| 99.0/1.0 | 127.5 (879) | 127.5 (879) | 0 |
| 92.4/7.6 | 127.6 (880) | 127.6 (880) | 0 |
| 30.0/70.0 | 123.4 (851) | 123.1 (849) | 0.2 |
| 1.0/99.0 | 118.3 (815) | 118.2 (815) | 0 |
| 143aE/HFC-143a | | | |
| 8.7/91.3 | 182.1 (1256) | 182.1 (1256) | 0.0 |
| 1/99 | 181.0 (1248) | 181.0 (1248) | 0.0 |
| 20/80 | 180.5 (1245) | 179.7 (1239) | 0.4 |
| 40/50 | 172.4 (1189) | 165.0 (1138) | 4.3 |
| 55/45 | 161.8 (1116) | 144.7 (998) | 10.6 |
| 54/46 | 162.7 (1122) | 146.3 (1009) | 10.1 |

TABLE 3-continued

| Refrigerant Composition | 0 wt % evaporated psia (kPa) | 50 wt % evaporated psia (kPa) | % change in vapor pressure |
|---|---|---|---|
| 53/47 | 163.5 (1128) | 147.9 (1020) | 9.5 |
| 143aE/HFC-152a | | | |
| 48.6/51.4 | 87.4 (603) | 87.4 (603) | 0.0 |
| 40/60 | 87.3 (602) | 87.3 (602) | 0.0 |
| 30/70 | 87.2 (601) | 87.1 (601) | 0.1 |
| 10/90 | 86.3 (595) | 86.3 (595) | 0.0 |
| 1/99 | 85.8 (592) | 85.8 (592) | 0.0 |
| 60/40 | 87.2 (601) | 87.2 (601) | 0.0 |
| 70/30 | 86.9 (599) | 86.8 (598) | 0.1 |
| 90/10 | 85.2 (587) | 85.2 (587) | 0.0 |
| 99/1 | 84.0 (579) | 84.0 (579) | 0.0 |
| 143aE/HFC-227ca | | | |
| 71.5/28.5 | 85.9 (592) | 85.9 (592) | 0.0 |
| 80/20 | 85.7 (591) | 85.7 (591) | 0.0 |
| 99/1 | 84.0 (579) | 84.0 (579) | 0.0 |
| 60/40 | 85.6 (590) | 85.4 (589) | 0.2 |
| 40/60 | 83.2 (574) | 82.1 (566) | 1.3 |
| 30/70 | 80.8 (557) | 78.9 (544) | 2.3 |
| 20/80 | 77.2 (532) | 74.5 (514) | 3.5 |
| 1/99 | 64.7 (446) | 64.3 (443) | 0.6 |
| 143aE/HFC-227ea | | | |
| 75.6/24.4 | 84.9 (585) | 84.9 (585) | 0.0 |
| 90/10 | 84.5 (583) | 84.5 (583) | 0.0 |
| 99/1 | 83.9 (578) | 83.9 (578) | 0.0 |
| 70/30 | 84.8 (585) | 84.8 (585) | 0.0 |
| 60/40 | 84.4 (582) | 84.3 (581) | 0.1 |
| 50/50 | 83.6 (576) | 83.2 (574) | 0.5 |
| 30/70 | 80.1 (552) | 78.9 (544) | 1.5 |
| 10/90 | 72.8 (502) | 71.3 (492) | 2.1 |
| 1/99 | 67.3 (464) | 67.1 (463) | 0.3 |
| 143aE/HFC-245cb | | | |
| 59.6/40.4 | 102.8 (709) | 102.8 (709) | 0.0 |
| 70/30 | 102.2 (705) | 101.5 (700) | 0.7 |
| 80/20 | 100.5 (693) | 96.9 (668) | 3.6 |
| 99/1 | 85.8 (592) | 84.0 (579) | 2.1 |
| 40/60 | 100.7 (694) | 98.2 (677) | 2.5 |
| 30/70 | 97.4 (672) | 91.6 (632) | 6.0 |
| 20/80 | 91.8 (633) | 82.7 (570) | 9.9 |
| 19/81 | 91.0 (627) | 81.7 (563) | 10.2 |
| C-216E/HFC-134 | | | |
| 1.0/99.0 | 76.9 (530) | 76.3 (526) | 0.8 |
| 50.0/50.0 | 100.1 (690) | 98.0 (676) | 2.1 |
| 79.8/20.2 | 104.4 (720) | 104.4 (720) | 0 |
| 99.0/1.0 | 100.8 (695) | 100.7 (694) | 0.1 |
| C-216E/HFC-134a | | | |
| 61.7/383 | 108.0 (745) | 108.0 (745) | 0.0 |
| 80/20 | 106.6 (735) | 106.4 (734) | 0.2 |
| 90/10 | 104.4 (720) | 105.0 (724) | 0.6 |
| 99/1 | 100.8 (695) | 100.7 (694) | 0.1 |
| 50/50 | 107.6 (742) | 107.4 (741) | 0.1 |
| 30/70 | 105.2 (725) | 104.6 (721) | 0.2 |
| 10/90 | 101.0 (696) | 100.4 (692) | 0.5 |
| 1/99 | 98.6 (680) | 98.5 (679) | 0.1 |
| C-216E/HFC-143 | | | |
| 99.0/1.0 | 101.2 (698) | 101.0 (696) | 02 |
| 91.9/8.1 | 103.5 (714) | 103.5 (714) | 0 |
| 61.0/39.0 | 96.6 (666) | 87.3 (602) | 9.6 |
| C-216E/HFC-152a | | | |
| 77.6/22.4 | 109.1 (752) | 109.1 (752) | 0.0 |
| 90/10 | 107.2 (739) | 106.7 (736) | 0.5 |
| 99/1 | 101.4 (699) | 101.1 (697) | 0.3 |
| 70/30 | 108.7 (759) | 108.5 (748) | 0.2 |
| 60/40 | 107.2 (739) | 106.2 (732) | 0.9 |
| 30/70 | 99.2 (684) | 94.8 (654) | 4.4 |
| 20/80 | 95.4 (658) | 91.0 (627) | 4.6 |
| 10/90 | 91.0 (627) | 87.9 (606) | 3.4 |
| 1/99 | 86.3 (595) | 86.0 (593) | |

TABLE 3-continued

| Refrigerant Composition | 0 wt % evaporated psia (kPa) | 50 wt % evaporated psia (kPa) | % change in vapor pressure |
|---|---|---|---|
| C-216E/HFC-161 | | | |
| 58.8/412 | 148.3 (1023) | 148.3 (1023) | 0.0 |
| 70/30 | 147.2 (1015) | 146.3 (1009) | 0.6 |
| 80/20 | 143.3 (988) | 139.1 (959) | 2.9 |
| 99/1 | 105.4 (727) | 102.2 (705) | 3.0 |
| 50/50 | 147.8 (1019) | 147.4 (1017) | 0.3 |
| 40/60 | 146.4 (1010) | 144.7 (998) | 1.2 |
| 30/70 | 144.1 (994) | 140.6 (970) | 2.4 |
| 20/80 | 140.8 (971) | 136.3 (940) | 3.2 |
| 1/99 | 130.9 (903) | 130.4 (899) | 0.4 |
| C-216E/HFC-245cb | | | |
| 95.1/4.9 | 100.6 (694) | 100.6 (694) | 0.0 |
| 99/1 | 100.4 (692) | 100.4 (692) | 0.0 |
| 70/30 | 96.9 (668) | 95.6 (659) | 1.3 |
| 60/40 | 94.1 (694) | 91.8 (633) | 2.4 |
| 50/50 | 90.8 (626) | 87.4 (603) | 3.7 |
| 40/60 | 87.0 (600) | 87.9 (606) | 1.0 |
| 30/70 | 82.8 (571) | 78.3 (540) | 5.4 |
| 20/80 | 78.0 (538) | 74.1 (511) | 5.0 |
| 1/99 | 68.0 (469) | 68.0 (469) | 0.0 |
| C-216E2/HFC-32 | | | |
| 36.0/64.0 | 272.4 (1878) | 272.4 (1878) | 0.0 |
| 15.0/85.0 | 269.3 (1857) | 256.1 (1766) | 4.9 |
| 1.0/99.0 | 250.4 (1726) | 246.8 (1702) | 1.4 |
| 60.0/40.0 | 269.3 (1857) | 261.3 (1802) | 3.0 |
| 80.0/20.0 | 250.6 (1728) | 179.7 (1239) | 28.3 |
| 70.0/30.0 | 263.9 (1820) | 238.7 (1646) | 9.5 |
| 71.0/29.0 | 263.0 (1813) | 235.0 (1620) | 10.6 |
| C-216E2/HFC-134 | | | |
| 60.5/39.5 | 88.6 (611) | 88.6 (611) | 0.0 |
| 80.0/20.0 | 86.7 (598) | 85.9 (592) | 0.9 |
| 99.0/1.0 | 77.6 (535) | 77.3 (533) | 0.4 |
| 40.0/60.0 | 87.2 (601) | 86.4 (596) | 0.9 |
| 20.0/80.0 | 83.2 (574) | 81.4 (561) | 2.2 |
| 1.0/99.0 | 76.5 (527) | 76.3 (526) | 0.3 |
| C-216E2/HFC-134a | | | |
| 20.6/79.4 | 99.0 (683) | 99.0 (683) | 0.0 |
| 1.0/99.0 | 98.3 (678) | 98.3 (678) | 0.0 |
| 50.0/50.0 | 97.2 (670) | 96.8 (667) | 0.4 |
| 80.0/20.0 | 89.6 (618) | 87.6 (604) | 2.2 |
| 99.0/1.0 | 77.6 (535) | 77.3 (533) | 0.4 |
| C-216E2/HFC-143 | | | |
| 87.1/12.9 | 82.9 (572) | 82.9 (572) | 0.0 |
| 99.0/1.0 | 78.1 (538) | 77.5 (534) | 0.8 |
| 50.0/50.0 | 77.2 (532) | 55.6 (383) | 28.0 |
| 70.0/30.0 | 80.8 (557) | 78.5 (541) | 2.8 |
| 60.0/40.0 | 79.0 (545) | 73.1 (504) | 7.5 |
| 58.0/42.0 | 78.7 (543) | 71.2 (491) | 9.5 |
| 57.0/43.0 | 78.5 (541) | 70.1 (483) | 10.7 |
| C-216E2/HFC-152a | | | |
| 60.5/39.5 | 95.6 (659) | 95.6 (659) | 0.0 |
| 80.0/20.0 | 93.2 (643) | 92.1 (635) | 1.2 |
| 99.0/1.0 | 78.4 (541) | 77.7 (536) | 0.9 |
| 40.0/60.0 | 94.2 (649) | 93.5 (645) | 0.7 |
| 20.0/80.0 | 90.9 (627) | 89.5 (617) | 1.5 |
| 1.0/99.0 | 86.1 (594) | 85.9 (592) | 0.2 |
| C-216E2/HFC-161 | | | |
| 45.7/54.3 | 138.3 (954) | 138.3 (954) | 0.0 |
| 20.0/80.0 | 135.8 (936) | 134.6 (928) | 0.9 |
| 1.0/99.0 | 130.6 (900) | 130.4 (899) | 0.2 |
| 60.0/40.0 | 137.3 (947) | 136.4 (940) | 0.7 |
| 80.0/20.0 | 129.0 (889) | 120.3 (829) | 6.7 |
| 85.0/15.0 | 123.7 (853) | 111.0 (765) | 10.3 |
| 84.0/16.0 | 124.9 (861) | 113.1 (780) | 9.4 |
| C-216E2/HFC-245cb | | | |
| 74.7/25-3 | 81-3 (561) | 81.3 (561) | 0.0 |

TABLE 3-continued

| Refrigerant Composition | 0 wt % evaporated psia (kPa) | 50 wt % evaporated psia (kPa) | % change in vapor pressure |
|---|---|---|---|
| 99.0/1.0 | 77.2 (532) | 77.1 (532) | 0.1 |
| 50.0/50.0 | 79.3. (547) | 78.6 (542) | 0.9 |
| 20.0/80.0 | 73.1 (504) | 71.8 (495) | 1.8 |
| 1.0/99.0 | 67.7 (467) | 67.6 (466) | 0.1 |
| 218E/HFC-134 | | | |
| 99.0/1.0 | 87.3 (602) | 84.7 (584) | 3.0 |
| 80.0/20.0 | 113.8 (785) | 109.9 (758) | 3.4 |
| 63.3/36.7 | 116.6 (804) | 116.6 (804) | 0 |
| 50.0/50.0 | 115.8 (798) | 114.5 (789) | 1.1 |
| 35.0/65.0 | 113.5 (783) | 102.7 (708) | 9.5 |
| 218E/HFC-134a | | | |
| 53.0/47.0 | 122-3 (843) | 122.3 (843) | 0.0 |
| 70/30 | 120.2 (829) | 117.8 (812) | 2.0 |
| 80/20 | 115.6 (797) | 109.1 (752) | 5.6 |
| 99/1 | 86.8 (598) | 84.7 (584) | 2.4 |
| 40/60 | 121.5 (838) | 120.3 (830) | 1.0 |
| 30/70 | 119.6 (825) | 115.6 (797) | 3.3 |
| 20/80 | 116.3 (802) | 108.0 (745) | 7.1 |
| 1/99 | 99.9 (689) | 98.4 (679) | 1.5 |
| 218E/HFC-143 | | | |
| 99.0/1.0 | 90.6 (625) | 84.5 (583) | 6.7 |
| 85.3/14.7 | 103.7 (715) | 103.7 (715) | 0 |
| 57.0/43.0 | 102.4 (706) | 99.0 (683) | 3.3 |
| 218E/HFC-152a | | | |
| 68.2/31.8 | 124.0 (855) | 124.0 (855) | 0.0 |
| 80/20 | 112.4 (775) | 120.0 (828) | 6.8 |
| 99/1 | 89.5 (617) | 85.1 (587) | 4.9 |
| 60/40 | 123.6 (852) | 123.0 (848) | 0.5 |
| 50/50 | 122.6 (845) | 119.5 (824) | 2.5 |
| 40/60 | 121.0 (834) | 108.5 (748) | 10.3 |
| 41/59 | 121.2 (836) | 110.3 (761) | 9.0 |
| 218E/HFC-161 | | | |
| 62.6/37.4 | 170.9 (1179) | 170.9 (1179) | 0.0 |
| 80/20 | 167.8 (1157) | 160.2 (1105) | 4.5 |
| 85/15 | 163.8 (1130) | 146.4 (1010) | 10.6 |
| 84/16 | 164.9 (1137) | 149.9 (1034) | 9.1 |
| 60/40 | 170.9 (1179) | 170.8 (1178) | 0.5 |
| 38/62 | 169.4 (1168) | 152.3 (1050) | 10.1 |
| 39/61 | 169.5 (1169) | 156.5 (1079) | 7.7 |
| 218E/HFC-263fb | | | |
| 96.3/3.7 | 84.0 (579) | 84.0 (579) | 0.0 |
| 99/1 | 83.9 (578) | 83.9 (578) | 0.0 |
| 70/30 | 80.0 (552) | 78.5 (541) | 1.9 |
| 40/60 | 71.6 (494) | 66.1 (456) | 7.7 |
| 23/77 | 65.4 (451) | 59.1 (407) | 9.6 |
| 24/76 | 65.8 (454) | 59.4 (409) | 9.7 |
| 25/75 | 66.2 (456) | 60.2 (415) | 9.6 |
| 10/90 | 59.5 (410) | 55.5 (383) | 6.7 |
| 1/99 | 54.6 (376) | 54.1 (373) | 0.9 |
| 218E2/HFC-134 | | | |
| 1.0/99.0 | 77.1 (532) | 76.2 (525) | 1.2 |
| 20.0/80.0 | 86.9 (599) | 83.1 (573) | 4.4 |
| 36.1/53.9 | 89.6 (618) | 89.6 (618) | 0 |
| 70.0/30.0 | 86.8 (598) | 83.0 (572) | 4.4 |
| 79.0/21.0 | 83.0 (572) | 74.8 (516) | 9.9 |
| 218E2/HFC-134a | | | |
| 24.7/753 | 101.1 (697) | 101.1 (697) | 0.0 |
| 10/90 | 100.2 (691) | 99.9 (689) | 0.3 |
| 1/99 | 98.5 (679) | 98.4 (679) | 0.1 |
| 40/60 | 100.2 (691) | 99.6 (687) | 0.6 |
| 50/50 | 98.7 (681) | 96.8 (667) | 1.9 |
| 70/30 | 92.0 (634) | 84.1 (580) | 8.6 |
| 73/27 | 90.2 (622) | 81.1 (559) | 10.1 |
| 72/28 | 90.8 (626) | 82.1 (566) | 9.6 |
| 218E2-HFC-143 | | | |
| 91.0/9.0 | 70.7 (487) | 65.0 (448) | 8.1 |
| 78.3/21.7 | 72.6 (501) | 72.6 (501) | 0 |
| 52.0/48.0 | 71.8 (495) | 67.5 (465) | 6.0 |
| 218E2/HFC-152a | | | |
| 51.0/49.0 | 98.1 (676) | 98.1 (676) | 0.0 |
| 70/30 | 96.4 (665) | 93.9 (647) | 2.6 |
| 82/18 | 91.3 (630) | 82.0 (565) | 10.2 |
| 81/19 | 92.0 (634) | 83.5 (576) | 9.2 |
| 40/60 | 97.7 (674) | 97.1 (670) | 0.6 |
| 30/70 | 96.7 (667) | 94.5 (652) | 2.3 |
| 20/80 | 94.8 (654) | 90.5 (624) | 4.5 |
| 10/90 | 91.5 (631) | 87.3 (602) | 4.6 |
| 1/99 | 86.5 (596) | 85.9 (592) | 0.7 |
| 218E2/HFC-161 | | | |
| 46A/53.6 | 145.1 (1001) | 145.1 (1001) | 0.0 |
| 60/40 | 144.4 (996) | 143.2 (988) | 0.8 |
| 77/23 | 139.4 (961) | 126.7 (874) | 9.1 |
| 78/22 | 138.8 (957) | 124.5 (859) | 10.5 |
| 40/60 | 145.0 (1000) | 144.7 (998) | 02 |
| 30/70 | 144.3 (995) | 142.0 (979) | 1.6 |
| 20/80 | 142.7 (984) | 135.6 (935) | 5.0 |
| 10/90 | 139.1 (959) | 131.5 (906) | 5.6 |
| 1/99 | 131.5 (907) | 130.2 (898) | 1.0 |
| 218E2/HFC-236fa | | | |
| 89.8/10.2 | 52.6 (362) | 52.6 (362) | 0.0 |
| 99/1 | 52.3 (360) | 52.4 (361) | 0.2 |
| 70/30 | 51.8 (357) | 51.6 (356) | 0.4 |
| 60/40 | 50.8 (350) | 50.3 (347) | 1.0 |
| 50/50 | 49.7 (342) | 48.8 (336) | 1.8 |
| 30/70 | 46.6 (321) | 44.9 (309) | 3.6 |
| 20/80 | 44.6 (307) | 42.9 (296) | 3.8 |
| 10/90 | 42.2 (291) | 41.0 (282) | 2.8 |
| 1/99 | 39.7 (273) | 39.5 (272) | 0.5 |
| 218E2/HFC-263fb | | | |
| 60.5/39.5 | 57.9 (399) | 57.9 (399) | 0.0 |
| 70/30 | 57.7 (398) | 57.7 (398) | 0.0 |
| 90/10 | 55.4 (382) | 55.1 (380) | 0.5 |
| 99/1 | 52.7 (363) | 52.6 (362) | 0.2 |
| 50/50 | 57.7 (398) | 57.7 (398) | 0.0 |
| 30/70 | 56.7 (391) | 56.5 (389) | 0.4 |
| 20/80 | 56.0 (386) | 56.0 (386) | 0.0 |
| 10/90 | 55.0 (379) | 54.8 (378) | 0.4 |
| 1/99 | 54.1 (373) | 54.1 (373) | 0.0 |
| C-225eEαβ/HFC-143 | | | |
| 55.9/44.1 | 38.0 (262) | 38.0 (262) | 0.0 |
| 80.0/20.0 | 36.7 (253) | 36.1 (249) | 1.6 |
| 99.0/1.0 | 31.6 (218) | 31.4 (216) | 0.6 |
| 20.0/80.0 | 36.1 (249) | 35.4 (244) | 1.9 |
| 1.0/99.0 | 33.5 (230) | 33.2 (229) | 0.3 |
| C-225eEαβ/HFC-236cb | | | |
| 16.7/83.3 | 33.7 (232) | 33.7 (232) | 0.0 |
| 1.0/99.0 | 33.6 (232) | 33.6 (232) | 0.0 |
| 50.0/50.0 | 33.3 (230) | 33.3 (230) | 0.0 |
| 80.0/20.0 | 32.3 (223) | 32.2 (222) | 0.3 |
| 99.0/1.0 | 31.2 (215) | 31.2 (215) | 0.0 |
| C-225eEαβ/HFC-236ea | | | |
| 91.5/8.5 | 31.1 (214) | 31.1 (214) | 0.0 |
| 99.0/1.0 | 31.1 (214) | 31.1 (214) | 0.0 |
| 60.0/40.0 | 30.8 (212) | 30.8 (212) | 0.0 |
| 40.0/60.0 | 30.4 (210) | 30.3 (209) | 0.3 |
| 20.0/80.0 | 29.7 (205) | 29.6 (204) | 0.3 |
| 1.0/99.0 | 28.8 (199) | 28.8 (199) | 0.0 |
| C-225eEαβ/HFC-245cb | | | |
| 22.4/77.6 | 70.1 (483) | 70.1 (483) | 0.0 |
| 1.0/99.0 | 67.7 (467) | 67.6 (466) | 0.1 |
| 50.0/50.0 | 67.7 (467) | 65.7 (453) | 3.0 |
| 60.0/40.0 | 66.0 (455) | 61.7 (425) | 6.5 |
| 65.0/35.0 | 65.0 (448) | 58.5 (403) | 10.0 |

TABLE 3-continued

| Refrigerant Composition | 0 wt % evaporated psia (kPa) | 50 wt % evaporated psia (kPa) | % change in vapor pressure |
|---|---|---|---|
| 227caEαβ/HFC-32 | | | |
| 17.9/82.1 | 253.4 (1748) | 253.4 (1748) | 0.0 |
| 10/90 | 252.8 (1744) | 251.8 (1737) | 0.4 |
| 1/99 | 247.9 (1710) | 247.1 (1705) | 0.3 |
| 40/60 | 251.3 (1734) | 248.0 (1711) | 1.3 |
| 60/40 | 244.7 (1688) | 223.4 (1541) | 8.7 |
| 61/39 | 244.0 (1683) | 221.0 (1524) | 9.4 |
| 62/38 | 243.4 (1679) | 218.2 (1505) | 10.4 |
| 227caEαβ/HFC-143 | | | |
| 99.0/1.0 | 43.0 (296) | 41.8 (288) | 2.8 |
| 95.0/5.0 | 47.6 (328) | 44.4 (306) | 6.7 |
| 70.9/29.1 | 53.7 (370) | 53.7 (370) | 0 |
| 42.0/58.0 | 52.0 (359) | 46.9 (323) | 9.8 |
| 227caEαβ/HFC-245cb | | | |
| 8.1/91.9 | 67.5 (465) | 67.5 (465) | 0.0 |
| 1/99 | 67.4 (465) | 67.4 (465) | 0.0 |
| 30/70 | 66.7 (460) | 66.5 (458) | 0.3 |
| 50/50 | 64.5 (445) | 63.4 (437) | 1.7 |
| 70/30 | 60.2 (415) | 56.8 (391) | 5.6 |
| 77/23 | 57.9 (399) | 53.2 (367) | 8.1 |
| 80/20 | 56.6 (390) | 51.5 (355) | 9.0 |
| 82/18 | 55.8 (385) | 50.3 (347) | 9.8 |
| 83/17 | 55.3 (381) | 49.7 (342) | 10.1 |
| 227caEαβ/HFC-272ca | | | |
| 94.3/5.7 | 41.4 (285) | 41.4 (285) | 0.0 |
| 99/1 | 41.4 (285) | 41.4 (285) | 0.0 |
| 80/20 | 41.0 (282) | 41.0 (282) | 0.0 |
| 60/40 | 39.7 (273) | 39.4 (271) | 0.8 |
| 40/60 | 38.1 (262) | 37.6 (259) | 1.3 |
| 20/80 | 36.4 (251) | 35.9 (247) | 1.4 |
| 10/90 | 35.5 (245) | 35.2 (242) | 0.8 |
| 1/99 | 34.6 (238) | 34.6 (238) | 0.0 |
| 227caEαβ/HFC-281ea | | | |
| 31.5/68.5 | 47.4 (327) | 47.4 (327) | 0.0 |
| 20/80 | 47.3 (326) | 47.3 (326) | 0.0 |
| 10/90 | 47.2 (325) | 47.2 (325) | 0.0 |
| 1/99 | 47.1 (325) | 47.1 (325) | 0.0 |
| 50/50 | 47.2 (325) | 47.2 (325) | 0.0 |
| 70/30 | 46.5 (320) | 46.4 (320) | 0.2 |
| 90/10 | 44.2 (305) | 43.9 (302) | 0.7 |
| 99/1 | 41.7 (287) | 41.6 (287) | 0.2 |
| 227caEαβ/HFC-281fa | | | |
| 84.3/15.7 | 42.4 (292) | 42.4 (292) | 0.0 |
| 90/10 | 42.3 (291) | 42.3 (291) | 0.0 |
| 99/1 | 41.5 (286) | 41.5 (286) | 0.0 |
| 60/40 | 41.6 (287) | 41.4 (285) | 0.5 |
| 40/60 | 40.3 (278) | 40.0 (276) | 0.7 |
| 20/80 | 39.0 (269) | 38.7 (267) | 0.8 |
| 10/90 | 38.4 (265) | 38.2 (263) | 0.5 |
| 1/99 | 37.8 (260) | 37.8 (260) | 0.0 |
| 227caEβγ/HFC-32 | | | |
| 28.4/71.6 | 269.7 (1860) | 269.7 (1860) | 0.0 |
| 10/90 | 268.6 (1853) | 247.0 (1704) | 8.0 |
| 1/99 | 255.3 (1761) | 246.7 (1702) | 3.4 |
| 40/60 | 269.4 (1858) | 268.8 (1854) | 0.2 |
| 60/40 | 266.6 (1839) | 255.3 (1761) | 4.2 |
| 67/33 | 263.7 (1819) | 238.6 (1646) | 9.5 |
| 68/32 | 263.1 (1815) | 235.0 (1621) | 10.6 |
| 227caEβγ/HFC-134 | | | |
| 34.8/65.2 | 82.7 (571) | 82.7 (571) | 0.0 |
| 10/90 | 80.0 (552) | 78.7 (543) | 1.6 |
| 5/95 | 78.4 (541) | 77.3 (533) | 1.4 |
| 1/99 | 76.6 (529) | 76.3 (527) | 0.0 |
| 50/50 | 81.9 (565) | 81.1 (560) | 1.0 |
| 60/40 | 80.3 (554) | 77.8 (537) | 3.1 |
| 70/30 | 77.3 (533) | 72.2 (498) | 6.6 |
| 77/23 | 74.1 (511) | 66.7 (460) | 10.0 |
| 76/24 | 74.6 (515) | 67.6 (466) | 9.4 |
| 227caEβγ/HFC-134a | | | |
| 1.9/98.1 | 98.3 (678) | 98.3 (678) | 0.0 |
| 1/99 | 98.3 (678) | 98.3 (678) | 0.0 |
| 20/80 | 97.2 (670) | 96.9 (668) | 0.3 |
| 30/70 | 95.8 (661) | 94.8 (654) | 1.0 |
| 50/50 | 91.0 (627) | 87.1 (601) | 4.3 |
| 68/32 | 83.3 (574) | 74.8 (516) | 10.2 |
| 67/33 | 83.8 (578) | 75.6 (521) | 9.8 |
| 227caEβγ/HFC-143 | | | |
| 91.0/9.0 | 63.1 (435) | 57.4 (396) | 9.0 |
| 73.8/26.2 | 66.2 (456) | 66.2 (456) | 0 |
| 46.0/54.0 | 65.1 (449) | 59.1 (407) | 9.2 |
| 227caEβγ/HFC-152a | | | |
| 38.3/61.7 | 91.4 (630) | 91.4 (630) | 0.0 |
| 20/80 | 90.4 (623) | 89.6 (618) | 0.9 |
| 10/90 | 88.7 (612) | 87.6 (604) | 1.2 |
| 1/99 | 86.1 (594) | 85.9 (592) | 0.2 |
| 60/40 | 89.8 (619) | 88.0 (607) | 2.0 |
| 70/30 | 87.2 (601) | 82.7 (570) | 5.2 |
| 80/20 | 82.1 (566) | 73.1 (504) | 11 |
| 78/22 | 83.4 (575) | 75.4 (520) | 9.6 |
| 79/21 | 82.8 (571) | 74.3 (512) | 10.2 |
| 227caEβγ/HFC-161 | | | |
| 34.4/65.6 | 137.5 (948) | 137.5 (948) | 0.0 |
| 20/80 | 136.7 (943) | 135.6 (935) | 0.8 |
| 10/90 | 134.7 (929) | 132.6 (914) | 1.6 |
| 1/99 | 130.8 (902) | 130.4 (899) | 0.3 |
| 40/60 | 134.4 (927) | 137.3 (947) | 2.2 |
| 60/40 | 135.0 (931) | 131.0 (903) | 3.0 |
| 72/28 | 130.2 (898) | 117.8 (812) | 9.5 |
| 73/27 | 129.6 (894) | 116.0 (800) | 10.4 |
| 227caEβγ/HFC-263fb | | | |
| 32.9/67.1 | 54.6 (376) | 54.6 (376) | 0.0 |
| 20/80 | 54.5 (376) | 54.5 (376) | 0.0 |
| 10/90 | 54.3 (374) | 54.3 (374) | 0.0 |
| 1/99 | 54.0 (372) | 54.0 (372) | 0.0 |
| 50/50 | 54.4 (375) | 54.4 (375) | 0.0 |
| 70/30 | 53.4 (368) | 53.2 (367) | 0.4 |
| 90/10 | 50.9 (351) | 50.7 (349) | 0.4 |
| 99/1 | 49.0 (338) | 48.9 (337) | 0.2 |
| 227caEβγ/HFC-272ca | | | |
| 89.0/11.0 | 49.6 (342) | 49.6 (342) | 0.0 |
| 99/1 | 48.9 (337) | 48.9 (337) | 0.0 |
| 60/40 | 47.1 (325) | 46.0 (317) | 2.3 |
| 40/60 | 44.1 (304) | 41.3 (285) | 6.3 |
| 30/70 | 42.2 (291) | 36.9 (268) | 7.8 |
| 20/80 | 40.1 (276) | 36.9 (254) | 8.0 |
| 10/90 | 37.6 (259) | 35.4 (244) | 5.9 |
| 1/99 | 34.8 (240) | 34.6 (238) | 0.6 |
| 80/20 | 49.3 (340) | 49.2 (339) | 0.2 |
| 227caEβγ/HFC-281ea | | | |
| 73.1/26.9 | 54.0 (372) | 54.0 (372) | 0.0 |
| 80/20 | 53.8 (371) | 53.8 (371) | 0.0 |
| 90/10 | 52.6 (362) | 52.3 (360) | 0.0 |
| 99/1 | 49.3 (340) | 49.2 (339) | 0.6 |
| 60/40 | 53.4 (368) | 53.4 (368) | 0.2 |
| 40/60 | 52.0 (358) | 51.4 (354) | 0.0 |
| 30/70 | 51.0 (351) | 50.1 (345) | 1.8 |
| 10/90 | 48.6 (335) | 48.0 (331) | 1.2 |
| 1/99 | 47.3 (326) | 47.2 (325) | 0.2 |
| 227caEβγ/HFC-281fa | | | |
| 85.9/14.1 | 51.0 (351) | 51.0 (351) | 0.0 |
| 90/10 | 50.9 (351) | 50.9 (351) | 0.0 |
| 99/1 | 49.1 (338) | 49.1 (338) | 0.0 |
| 70/30 | 50.0 (345) | 49.5 (341) | 1.0 |
| 40/60 | 45.9 (316) | 43.3 (298) | 5.7 |

TABLE 3-continued

| Refrigerant Composition | 0 wt % evaporated psia (kPa) | 50 wt % evaporated psia (kPa) | % change in vapor pressure |
|---|---|---|---|
| 30/70 | 44.2 (305) | 41.2 (284) | 6.8 |
| 20/80 | 42.3 (291) | 39.6 (273) | 6.4 |
| 10/90 | 40.1 (276) | 38.5 (265) | 4.0 |
| 1/99 | 38.0 (262) | 37.8 (260) | 0.5 |
| 227caE/HFC-32 | | | |
| 30.0/70.0 | 272.3 (1878) | 272.3 (1878) | 0.0 |
| 20/80 | 272.1 (1877) | 270.9 (1869) | 0.4 |
| 10/90 | 271.2 (1871) | 246.7 (1702) | 9.0 |
| 1/99 | 257.1 (1774) | 246.7 (1702) | 4.0 |
| 50/50 | 271.4 (1872) | 268.6 (1853) | 1.0 |
| 60/40 | 269.6 (1860) | 259.6 (1791) | 3.7 |
| 68/32 | 266.4 (1838) | 240.8 (1661) | 9.6 |
| 69/31 | 265.8 (1834) | 237.1 (1636) | 10.8 |
| 227eaE/HFC-134 | | | |
| 1.0/99.0 | 76.7 (529) | 76.3 (526) | 0.5 |
| 10.0/90.0 | 80.9 (558) | 78.9 (544) | 2.5 |
| 38.2/61.8 | 84.7 (584) | 84.7 (584) | 0 |
| 60.0/40.0 | 82.7 (570) | 80.7 (556) | 2.4 |
| 78.0/22.0 | 76.4 (527) | 69.1 (476) | 9.6 |
| 227eaE/HFC-134a | | | |
| 9.5/90.7 | 98.6 (680) | 98.6 (680) | 0.0 |
| 1/99 | 98.3 (678) | 98.3 (678) | 0.0 |
| 30/70 | 97.2 (670) | 96.5 (665) | 0.7 |
| 40/60 | 95.5 (659) | 93.8 (647) | 1.8 |
| 60/40 | 89.6 (618) | 83.9 (578) | 6.4 |
| 70/30 | 84.6 (583) | 76.2 (525) | 9.0 |
| 71/29 | 84.0 (579) | 75.5 (519) | 10.4 |
| 227eaE/HFC-143 | | | |
| 92.0/8.0 | 65.4 (451) | 59.1 (408) | 9.6 |
| 74.9/25.1 | 68.9 (475) | 68.9 (475) | 0.0 |
| 47.0/53.0 | 67.7 (469) | 61.7 (426) | 8.9 |
| 80.0/20.0 | 68.8 (475) | 68.4 (472) | 0.6 |
| 93.0/7.0 | 64.6 (451) | 57.7 (398) | 10.7 |
| 60.0/40.0 | 68.4 (446) | 67.6 (466) | 1.2 |
| 50.0/50.0 | 67.9 (472) | 65.2 (450) | 4.0 |
| 46.0/54.0 | 67.7 (474) | 59.0 (407) | 12.8 |
| 227eaE/HFC-152a | | | |
| 42.1/57.9 | 93.2 (643) | 93.2 (643) | 0.0 |
| 20/80 | 91.6 (632) | 90.3 (623) | 1.4 |
| 10/90 | 89.4 (616) | 87.8 (605) | 1.8 |
| 1/99 | 86.2 (594) | 85.9 (592) | 0.3 |
| 60/40 | 92.0 (634) | 90.7 (625) | 1.4 |
| 70/30 | 89.7 (618) | 85.8 (592) | 4.3 |
| 80/20 | 84.9 (585) | 76.5 (527) | 9.9 |
| 81/19 | 84.2 (581) | 75.2 (518) | 10.7 |
| 30/70 | 92.8 (640) | 92.3 (636) | 0.5 |
| 227eaE/HFC-161 | | | |
| 37.5/62.5 | 139.5 (962) | 139.5 (962) | 0.0 |
| 20/80 | 138.5 (954) | 136.4 (941) | 1.4 |
| 10/90 | 135.8 (937) | 132.6 (914) | 2.4 |
| 1/99 | 131.0 (903) | 130.3 (899) | 0.5 |
| 60/40 | 137.5 (948) | 134.2 (926) | 2.4 |
| 70/30 | 134.2 (926) | 124.8 (866) | 7.0 |
| 73/27 | 132.6 (914) | 120.1 (828) | 9.4 |
| 74/26 | 131.9 (910) | 118.3 (816) | 10.3 |
| 30/70 | 139.3 (961) | 139.0 (959) | 0.2 |
| 227eaE/HFC-263fb | | | |
| 49.3/50.7 | 55.7 (384) | 55.7 (384) | 0.0 |
| 30/70 | 55.4 (382) | 55.3 (381) | 0.2 |
| 20/80 | 55.0 (379) | 55.0 (379) | 0.0 |
| 10/90 | 54.6 (376) | 54.5 (376) | 0.2 |
| 1/99 | 54.1 (373) | 54.0 (372) | 0.2 |
| 70/30 | 55.2 (380) | 55.1 (380) | 0.2 |
| 80/20 | 54.4 (375) | 54.3 (374) | 0.2 |
| 90/10 | 53.2 (367) | 53.0 (365) | 0.4 |
| 99/1 | 51.5 (355) | 51.5 (355) | 0.0 |
| 227eaE/HFC-272ca | | | |
| 90.7/9.3 | 52.0 (358) | 52.0 (358) | 0.0 |
| 99/1 | 51.4 (354) | 51.4 (354) | 0.0 |
| 70/30 | 50.3 (347) | 49.6 (342) | 1.4 |
| 50/50 | 47.3 (326) | 44.7 (308) | 5.5 |
| 35/65 | 44.5 (307) | 40.4 (278) | 9.2 |
| 30/70 | 43.4 (299) | 39.1 (269) | 9.9 |
| 29/71 | 43.2 (298) | 38.8 (267) | 10.2 |
| 80/20 | 51.4 (354) | 51.2 (353) | 0.4 |
| 227eaE/HFC-281ea | | | |
| 76.8/23.2 | 55.9 (385) | 55.9 (385) | 0.0 |
| 90/10 | 54.9 (378) | 54.7 (377) | 0.4 |
| 99/1 | 51.8 (357) | 51.7 (356) | 0.2 |
| 60/40 | 55.2 (380) | 54.8 (378) | 0.7 |
| 40/60 | 53.2 (367) | 52.1 (359) | 2.1 |
| 30/70 | 51.9 (358) | 50.6 (349) | 2.5 |
| 20/80 | 50.4 (347) | 49.2 (339) | 2.4 |
| 10/90 | 48.9 (337) | 48.1 (331) | 1.6 |
| 1/99 | 47.3 (326) | 47.2 (325) | 0.2 |
| 227eaE/HFC-281fa | | | |
| 87.6/12.4 | 53.3 (367) | 53.3 (367) | 0.0 |
| 99/1 | 51.7 (356) | 51.6 (356) | 0.2 |
| 60/40 | 50.5 (348) | 48.9 (337) | 3.2 |
| 40/60 | 47.2 (325) | 43.7 (301) | 7.4 |
| 30/70 | 45.2 (311) | 41.4 (285) | 8.4 |
| 20/80 | 43.0 (296) | 39.6 (273) | 7.9 |
| 10/90 | 40.5 (279) | 38.4 (265) | 5.2 |
| 1/99 | 38.0 (262) | 37.8 (260) | 0.5 |
| 70/30 | 51.9 (358) | 51.2 (353) | 1.3 |
| C-234fEαβ/HFC-245cb | | | |
| 13.5/86.5 | 69.9 (482) | 69.9 (482) | 0.0 |
| 1.0/99.0 | 67.9 (468) | 67.7 (467) | 0.3 |
| 40.0/60.0 | 67.6 (466) | 65.6 (452) | 3.0 |
| 50.0/50.0 | 66.4 (458) | 63.6 (439) | 4.2 |
| 55.0/45.0 | 65.9 (454) | 62.0 (427) | 5.9 |
| 57.0/43.0 | 65.7 (453) | 60.7 (419) | 7.6 |
| 58.0/42.0 | 65.6 (452) | 59.5 (410) | 9.3 |
| 59.0/41.0 | 65.5 (452) | 57.5 (396) | 12.2 |
| C-234fEαβ/HFC-245eb | | | |
| 49.1/50.9 | 17.6 (121) | 17.6 (121) | 0.0 |
| 20.0/80.0 | 17.3 (119) | 17.3 (119) | 0.0 |
| 1.0/99.0 | 16.9 (117) | 16.9 (117) | 0.0 |
| 80.0/20.0 | 17.3 (119) | 17.3 (119) | 0.0 |
| 99.0/1.0 | 16.8 (116) | 16.8 (116) | 0.0 |
| C-234fEαβ/HFC-356mff | | | |
| 59.0/41.0 | 18.8 (130) | 18.8 (130) | 0.0 |
| 80.0/20.0 | 18.4 (127) | 18.2 (125) | 1.1 |
| 99.0/1.0 | 16.9 (117) | 16.8 (116) | 0.6 |
| 40.0/60.0 | 18.5 (128) | 18.3 (126) | 1.1 |
| 20.0/80.0 | 17.3 (119) | 16.8 (116) | 2.9 |
| 10.0/90.0 | 16.2 (112) | 15.7 (108) | 3.1 |
| 1.0/99.0 | 14.8 (102) | 14.8 (102) | 0.0 |
| C-234fEαβ/HFC-356mmz | | | |
| 50.1/49.9 | 20.1 (139) | 20.1 (139) | 0.0 |
| 20.0/80.0 | 19.1 (132) | 18.7 (129) | 2.1 |
| 1.0/99.0 | 16.8 (116) | 16.7 (115) | 0.6 |
| 80.0/20.0 | 19.2 (132) | 18.7 (129) | 2.6 |
| 99.0/1.0 | 16.9 (117) | 16.8 (116) | 0.6 |
| C-234fEβγ/HFC-245cb | | | |
| 10.2/89.8 | 69.1 (476) | 69.1 (476) | 0.0 |
| 1.0/99.0 | 67.8 (467) | 67.7 (467) | 0.1 |
| 40.0/60.0 | 66.4 (458) | 64.4 (444) | 3.0 |
| 50.0/50.0 | 65.4 (451) | 62.7 (432) | 4.1 |
| 55.0/45.0 | 65.0 (448) | 61.0 (421) | 6.2 |
| 58.0/420 | 64.7 (446) | 52.6 (363) | 18.7 |
| 57.0/43.0 | 64.8 (447) | 57.9 (399) | 10.6 |
| 56.0/44.0 | 64.9 (447) | 60.0 (414) | 7.6 |

TABLE 3-continued

| Refrigerant Composition | 0 wt % evaporated psia (kPa) | 50 wt % evaporated psia (kPa) | % change in vapor pressure |
|---|---|---|---|
| C-234fEβγ/HFC-245ca | | | |
| 33.6/66.4 | 14.5 (100) | 14.5 (100) | 0.0 |
| 15.0/85.0 | 14.4 (99) | 14.4 (99) | 0.0 |
| 1.0/99.0 | 14.2 (98) | 14.2 (98) | 0.0 |
| 60.0/40.0 | 143 (99) | 14.3 (99) | 0.0 |
| 80.0/20.0 | 13.9 (96) | 13.9 (96) | 0.0 |
| 99.0/1.0 | 13.3 (92) | 13.3 (92) | 0.0 |
| C-234fEβγ/HFC-245ea | | | |
| 55.0/45.0 | 65.9 (454) | 62.0 (427) | 5.9 |
| 57.0/43.0 | 65.7 (453) | 60.7 (419) | 7.6 |
| 58.0/42.0 | 65.6 (452) | 59.5 (410) | 9.3 |
| 59.0/41.0 | 65.5 (452) | 57.5 (396) | 12.2 |
| C-234fEβγ/HFC-245eb | | | |
| 49.1/50.9 | 17.6 (121) | 17.6 (121) | 0.0 |
| 20.0/80.0 | 17.3 (119) | 17.3 (119) | 0.0 |
| 1.0/99.0 | 16.9 (117) | 16.9 (117) | 0.0 |
| 80.0/20.0 | 17.3 (119) | 17.3 (119) | 0.0 |
| 99.0/1.0 | 16.8 (116) | 16.8 (116) | 0.0 |
| C-234Eβγ/HFC-356mff | | | |
| 59.0/41.0 | 18.8 (130) | 18.8 (130) | 0.0 |
| 80.0/20.0 | 18.4 (127) | 18.2 (125) | 1.1 |
| 99.0/1.0 | 16.9 (117) | 16.8 (116) | 0.6 |
| 40.0/60.0 | 18.5 (128) | 18.3 (126) | 1.1 |
| 20.0/80.0 | 17.3 (119) | 16.8 (116) | 2.9 |
| 10.0/90.0 | 16.2 (112) | 15.7 (108) | 3.1 |
| 1.0/99.0 | 14.8 (102) | 14.8 (102) | 0.0 |
| C-234fEβγ/HFC-356mmz | | | |
| 50.1/49.9 | 20.1 (139) | 20.1 (139) | 0.0 |
| 20.0/80.0 | 19.1 (132) | 18.7 (129) | 2.1 |
| 1.0/99.0 | 16.8 (116) | 16.7 (115) | 0.6 |
| 80.0/20.0 | 19.2 (132) | 18.7 (129) | 2.6 |
| 99.0/1.0 | 16.9 (117) | 16.8 (116) | 0.6 |
| C-234fEβγ/HFC-245cb | | | |
| 10.2/89.8 | 69.1 (476) | 69.1 (476) | 0.0 |
| 1.0/99.0 | 67.8 (467) | 67.7 (467) | 0.1 |
| 40.0/60.0 | 66.4 (458) | 64.4 (444) | 3.0 |
| 50.0/50.0 | 65.4 (451) | 62.7 (432) | 4.1 |
| 55.0/45.0 | 65.0 (448) | 61.0 (421) | 6.2 |
| 58.0/420 | 64.7 (446) | 52.6 (363) | 18.7 |
| 57.0/43.0 | 64.8 (447) | 57.9 (399) | 10.6 |
| 56.0/44.0 | 64.9 (447) | 60.0 (414) | 7.6 |
| C-234fEβγ/HFC-245ca | | | |
| 33.6/66.4 | 14.5 (100) | 14.5 (100) | 0.0 |
| 15.0/85.0 | 14.4 (99) | 14.4 (99) | 0.0 |
| 1.0/99.0 | 14.2 (98) | 14.2 (98) | 0.0 |
| 60.0/40.0 | 14.3 (99) | 14.3 (99) | 0.0 |
| 80.0/20.0 | 13.9 (96) | 13.9 (96) | 0.0 |
| 99.0/1.0 | 13.3 (92) | 13.3 (92) | 0.0 |
| C-234fEβγ/HFC-245ea | | | |
| 36.0/64.0 | 14.5 (100) | 14.5 (100) | 0.0 |
| 15.0/85.0 | 14.4 (99) | 14.4 (99) | 0.0 |
| 1.0/99.0 | 14.2 (98) | 14.2 (98) | 0.0 |
| 60.0/40.0 | 14.4 (99) | 14.3 (99) | 0.7 |
| 80.0/20.0 | 14.0 (97) | 13.9 (96) | 0.7 |
| 99.0/1.0 | 13.3 (92) | 13.3 (92) | 0.0 |
| C-234fEβγ/HFC-254ca | | | |
| 36.0/64.0 | 13.8 (95) | 13.8 (95) | 0.0 |
| 15.0/85.0 | 13.8 (95) | 13.8 (95) | 0.0 |
| 1.0/99.0 | 13.7 (94) | 13.7 (94) | 0.0 |
| 60.0/40.0 | 13.8 (95) | 13.8 (95) | 0.0 |
| 80.0/20.0 | 13.6 (94) | 13.6 (94) | 0.0 |
| 99.0/1.0 | 133 (92) | 13.3 (92) | 0.0 |
| C-234Eβγ/HFC-356mff | | | |
| 43.1/56.9 | 17.1 (118) | 17.1 (118) | 0.0 |
| 20.0/80.0 | 16.5 (114) | 16.3 (112) | 1.2 |
| 1.0/99.0 | 14.8 (102) | 14.8 (102) | 0.0 |
| 70.0/30.0 | 16.5 (114) | 16.0 (110) | 3.0 |
| 90.0/10.0 | 15.0 (103) | 14.0 (97) | 6.7 |
| 99.0/1.0 | 13.5 (93) | 13.3 (92) | 1.5 |
| C-234fEβγγ/HFC-356mmz | | | |
| 35.8/64.2 | 18.6 (128) | 18.6 (128) | 0.0 |
| 15.0/85.0 | 18.0 (124) | 17.8 (123) | 1.1 |
| 1.0/99.0 | 16.7 (115) | 16.7 (115) | 0.0 |
| 60.0/40.0 | 18.1 (125) | 17.6 (121) | 2.8 |
| 80.0/20.0 | 16.8 (116) | 15.3 (105) | 8.9 |
| 85.0/15.0 | 16.2 (112) | 14.5 (100) | 10.5 |
| 83.0/17.0 | 16.5 (114) | 14.8 (102) | 10.3 |
| 82.0/18.0 | 16.6 (114) | 15.0 (103) | 9.6 |
| 236caE/HFC-143 | | | |
| 60.0/40.0 | 30.4 (210) | 27.4 (189) | 9.9 |
| 12.0/88.0 | 33.4 (230) | 33.4 (231) | 0.0 |
| 10.0/90.0 | 33.4 (230) | 33.4 (230) | 0.0 |
| 1.0/99.0 | 33.1 (228) | 33.1 (228) | 0.0 |
| 5.0/95.0 | 33.3 (230) | 33.3 (230) | 0.0 |
| 30.0/70.0 | 33.0 (228) | 33.0 (228) | 0.0 |
| 40.0/60.0 | 32.4 (224) | 31.7 (219) | 2.2 |
| 61.0/39.0 | 30.3 (209) | 27.1 (187) | 10.6 |
| 236caE/HFC-245ca | | | |
| 1.0/99.0 | 142 (98) | 142 (98) | 0.0 |
| 10.0/90.0 | 14.1 (97) | 14.1 (97) | 0.0 |
| 20.0/80.0 | 14.0 (97) | 14.0 (97) | 0.0 |
| 30.0/70.0 | 13.9 (96) | 13.9 (96) | 0.0 |
| 40.0/60.0 | 13.8 (95) | 13.7 (94) | 0.7 |
| 50.0/50.0 | 13.6 (94) | 13.6 (94) | 0.0 |
| 60.0/40.0 | 13.5 (93) | 13.4 (92) | 0.7 |
| 70.0/30.0 | 13.3 (92) | 13.3 (92) | 0.0 |
| 80.0/20.0 | 13.2 (91) | 13.2 (91) | 0.0 |
| 90.0/10.0 | 13.1 (90) | 13.0 (90) | 0.8 |
| 99.0/1.0 | 12.9 (89) | 12.9 (89) | 0.0 |
| 236caE/HFC-254ca | | | |
| 17.6/82.4 | 13.7 (94) | 13.7 (94) | 0.0 |
| 10/90 | 13.7 (94) | 13.7 (94) | 0.0 |
| 1/99 | 13.7 (94) | 13.7 (94) | 0.0 |
| 30/70 | 13.7 (94) | 13.7 (94) | 0.0 |
| 50/50 | 13.6 (93) | 13.6 (93) | 0.0 |
| 70/30 | 13.4 (92) | 13.4 (92) | 0.0 |
| 90/10 | 13.1 (90) | 13.1 (90) | 0.0 |
| 99/1 | 13.0 (89) | 13.0 (89) | 0.0 |
| 40/60 | 13.7 (94) | 13.7 (94) | 0.0 |
| 236eaEβγ/HFC-143 | | | |
| 66.0/34.0 | 32.1 (221) | 29.1 (201) | 93 |
| 25.9/74.1 | 34.6 (239) | 34.6 (239) | 0 |
| 10.0/90.0 | 34.1 (235) | 33.9 (234) | 0.6 |
| 1.0/99.0 | 33.2 (229) | 33.2 (229) | 0 |
| 236eaEβγ/HFC-245ca | | | |
| 1.0/99.0 | 14.7 (101) | 14.7 (101) | 0.0 |
| 10.0/90.0 | 15.0 (103) | 15.0 (103) | 0.0 |
| 20.0/80.0 | 15.4 (106) | 15.3 (105) | 0.6 |
| 30.0/70.0 | 15.6 (108) | 15.6 (108) | 0.0 |
| 40.0/60.0 | 15.8 (109) | 15.8 (109) | 0.0 |
| 50.0/50.0 | 16.0 (110) | 16.0 (110) | 0.0 |
| 60.0/40.0 | 16.1 (111) | 16.1 (111) | 0.0 |
| 69.1/30.9 | 16.1 (111) | 16.1 (111) | 0.0 |
| 80.0/20.0 | 16.1 (111) | 16.1 (111) | 0.0 |
| 90.0/10.0 | 15.9 (110) | 15.9 (110) | 0.0 |
| 99.0/1.0 | 15.7 (108) | 15.7 (108) | 0.0 |
| 236eaEβγ/HFC-263ca | | | |
| 4.1/95.9 | 18.2 (125) | 18.2 (125) | 0.0 |
| 1/99 | 18.2 (125) | 18.2 (125) | 0.0 |
| 30/70 | 18.1 (124) | 18.1 (124) | 0.0 |
| 50/50 | 17.9 (123) | 17.8 (122) | 0.6 |
| 70/30 | 17.5 (119) | 17.2 (118) | 0.6 |
| 90/10 | 16.4 (113) | 16.3 (112) | 0.6 |

TABLE 3-continued

| Refrigerant Composition | 0 wt % evaporated psia (kPa) | 50 wt % evaporated psia (kPa) | % change in vapor pressure |
|---|---|---|---|
| 99/1 | 15.8 (109) | 15.8 (109) | 0.0 |
| 236eaEβγ/HFC-338mf | | | |
| 92.6/7.4 | 16.2 (111) | 16.1 (111) | 0.6 |
| 99/1 | 15.8 (109) | 15.7 (108) | 0.6 |
| 70/30 | 17.4 (120) | 17.2 (118) | 1.1 |
| 50/50 | 18.1 (124) | 18.0 (124) | 0.6 |
| 40/60 | 18.4 (127) | 18.4 (127) | 0.0 |
| 30/70 | 18.6 (128) | 18.6 (128) | 0.0 |
| 10/90 | 18.8 (129) | 18.8 (129) | 0.0 |
| 1/99 | 18.8 (129) | 18.8 (129) | 0.0 |
| 236eaEβγ/HFC-356mff | | | |
| 1.0/99.0 | 14.9 (103) | 14.9 (103) | 0.0 |
| 10.0/90.0 | 15.1 (104) | 15.1 (104) | 0.0 |
| 20.0/80.0 | 15.2 (105) | 15.2 (105) | 0.0 |
| 30.0/70.0 | 15.3 (106) | 15.3 (106) | 0.0 |
| 40.0/60.0 | 15.4 (106) | 15.4 (106) | 0.0 |
| 50.0/50.0 | 15.5 (107) | 15.5 (107) | 0.0 |
| 60.0/40.0 | 15.6 (108) | 15.6 (108) | 0.0 |
| 70.0/30.0 | 15.6 (108) | 15.6 (108) | 0.0 |
| 80.0/20.0 | 15.7 (108) | 15.7 (108) | 0.0 |
| 90.0/10.0 | 15.7 (108) | 15.7 (108) | 0.0 |
| 96.9/3.1 | 15.7 (108) | 15.7 (108) | 0.0 |
| 99.0/1.0 | 15.7 (108) | 15.7 (108) | 0.0 |
| 236eaEβγ/HFC-356mmz | | | |
| 15.1/84.9 | 16.6 (114) | 16.6 (114) | 0.0 |
| 1/99 | 16.6 (114) | 16.6 (114) | 0.0 |
| 30/70 | 16.6 (114) | 16.6 (114) | 0.0 |
| 50/50 | 16.5 (113) | 16.5 (113) | 0.0 |
| 70/30 | 16.2 (111) | 16.2 (111) | 0.0 |
| 90/10 | 15.9 (109) | 15.9 (109) | 0.0 |
| 99/1 | 15.7 (108) | 15.7 (108) | 0.0 |
| 236faE/HFC-32 | | | |
| 8.5/91.5 | 248.6 (1715) | 248.6 (1715) | 0.0 |
| 1/99 | 247.2 (1705) | 247.0 (1704) | 0.1 |
| 20/80 | 247.5 (1707) | 246.5 (1700) | 0.4 |
| 40/60 | 243.5 (1680) | 236.4 (1631) | 2.9 |
| 50/50 | 240.0 (1656) | 224.0 (1545) | 6.7 |
| 55/45 | 237.3 (1637) | 213.8 (1475) | 9.9 |
| 56/44 | 236.7 (1633) | 211.3 (1458) | 10.7 |
| 236faE/HFC-143 | | | |
| 84.0/16.0 | 42.2 (291) | 38.2 (264) | 9.5 |
| 56.9/43.1 | 45.1 (311) | 45.1 (311) | 0.0 |
| 30.0/70.0 | 43.8 (302) | 40.4 (279) | 7.8 |
| 28.0/72.0 | 43.6 (301) | 39.5 (272) | 9.4 |
| 40.0/60.0 | 44.6 (308) | 43.6 (301) | 2.2 |
| 27.0/73.0 | 43.5 (300) | 39.0 (269) | 10.3 |
| 70.0/30.0 | 44.6 (308) | 43.9 (303) | 1.6 |
| 80.0/20.0 | 43.2 (298) | 40.5 (280) | 6.3 |
| 86.0/14.0 | 41.4 (286) | 37.0 (255) | 10.6 |
| 85.0/15.0 | 41.8 (288) | 37.6 (259) | 10.0 |
| 26faE/HFC-272ca | | | |
| 27.8/72.2 | 34.8 (240) | 34.8 (240) | 0.0 |
| 10/90 | 34.7 (239) | 34.7 (239) | 0.0 |
| 1/99 | 34.5 (238) | 34.5 (238) | 0.0 |
| 40/60 | 34.7 (239) | 34.7 (239) | 0.0 |
| 60/40 | 34.2 (236) | 34.1 (235) | 0.3 |
| 70/30 | 33.7 (232) | 33.5 (231) | 0.6 |
| 90/10 | 31.6 (218) | 31.3 (216) | 0.9 |
| 99/1 | 29.8 (205) | 29.8 (205) | 0.0 |
| 236faE/HFC-272fb | | | |
| 82.3/17.7 | 30.2 (208) | 30.2 (208) | 0.0 |
| 99/1 | 29.7 (204) | 29.7 (204) | 0.0 |
| 70/30 | 30.0 (207) | 30.0 (207) | 0.0 |
| 50/50 | 29.3 (202) | 29.2 (201) | 0.3 |
| 40/60 | 28.9 (199) | 28.6 (197) | 1.0 |
| 30/70 | 28.3 (195) | 28.0 (193) | 1.1 |
| 20/80 | 27.7 (191) | 27.5 (189) | 0.7 |
| 10/90 | 27.1 (187) | 26.9 (185) | 0.7 |
| 1/99 | 26.5 (182) | 26.5 (182) | 0.0 |
| 236faE/HFC-281fa | | | |
| 9.3/90.7 | 37.7 (260) | 37.7 (260) | 0.0 |
| 1/99 | 37.7 (260) | 37.7 (260) | 0.0 |
| 20/80 | 37.7 (260) | 37.7 (260) | 0.0 |
| 40/60 | 37.4 (258) | 37.4 (258) | 0.0 |
| 60/40 | 36.6 (252) | 36.4 (251) | 0.5 |
| 70/30 | 35.9 (247) | 35.6 (245) | 0.8 |
| 80/20 | 34.8 (240) | 34.2 (236) | 1.7 |
| 90/10 | 32.9 (227) | 32.3 (222) | 1.8 |
| 99/1 | 30.0 (207) | 29.9 (206) | 0.3 |
| 245faEβγ/HFC-356mff | | | |
| 1.0/99.0 | 14.9 (103) | 14.9 (103) | 0.0 |
| 4.4/95.6 | 14.9 (103) | 14.9 (103) | 0.0 |
| 10.0/90.0 | 14.9 (103) | 14.9 (103) | 0.0 |
| 20.0/80.0 | 14.8 (102) | 14.8 (102) | 0.0 |
| 30.0/70.0 | 14.7 (101) | 14.7 (101) | 0.0 |
| 40.0/60.0 | 14.6 (100) | 14.6 (100) | 0.0 |
| 50.0/50.0 | 14.4 (99) | 14.3 (99) | 0.7 |
| 60.0/40.0 | 14.2 (98) | 14.1 (97) | 0.7 |
| 70.0/30.0 | 13.9 (96) | 13.8 (95) | 0.7 |
| 80.0/20.0 | 13.6 (93) | 13.4 (93) | 1.5 |
| 90.0/10.0 | 13.2 (91) | 13.1 (90) | 0.8 |
| 99.0/1.0 | 12.8 (88) | 12.7 (88) | 0.8 |

EXAMPLE 3

Refrigerant Performance

The following table shows the refrigerant performance of various compositions. Except where indicated, the data are based on the following conditions.

TABLE 4

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| HCFC-22 | 90.6 (625) | 312.6 (2155) | 212.8 (100.4) | 3.41 | 351.3 (6.2) |
| 125E/HFC-32 | | | | | |
| 5.0/95.0 | 146.3 (1009) | 502.6 (3465) | 250.5 (121.0) | 3.14 | 544.0 (9.6) |
| 40.0/60.0 | 134.4 (927) | 462.2 (3187) | 217.3 (102.9) | 3.11 | 474.9 (8.3) |
| 95.0/5.0 | 82.4 (568) | 298.2 (2056) | 162.0 (72.2) | 3.04 | 272.7 (4.8) |
| 125E/HFC-125 | | | | | |
| 5.0/95.0 | 16.2 (112) | 70.8 (488) | 166.3 (74.6) | 3.99 | 85.8 (1.5) |
| 95.0/5.0* | 49.8 (343) | 236.8 (1633) | 120.5 (49.2) | 3.14 | 209.6 (3.7) | tl,1 * = Condenser temp. is 80° F., evaporator temp. is 0° F., subcool temp. is 25° F. and return gas is 20° F.

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 125E/HFC-134 | | | | | |
| 99.0/1.0 | 74.1 (511) | 271.9 (1875) | 156.4 (69.1) | 2.98 | 241.6 (4.2) |
| 86.5/13.5 | 72.3 (498) | 266.2 (1835) | 158.1 (70.1) | 3.06 | 244.5 (4.3) |
| 37.0/63.0 | 56.2 (387) | 218.2 (1504) | 166.9 (74.9) | 3.43 | 228.4 (4.0) |
| 5.0/95.0 | 44.5 (307) | 179.4 (1237) | 173.1 (78.4) | 3.58 | 197.6 (3.5) |
| 125E/HFC-134a | | | | | |
| 5.0/95.0 | 56.1 (387) | 215.9 (1489) | 172.0 (77.8) | 3.44 | 228.7 (4.0) |
| 50.0/50.0 | 63.6 (439) | 240.2 (1655) | 164.5 (73.6) | 3.27 | 238.6 (4.2) |
| 95.0/5.0 | 73.0 (503) | 268.9 (1854) | 157.2 (69.6) | 3.00 | 241.2 (4.2) |
| 125E/HFC-143 | | | | | |
| 5.0/95.0 | 17.7 (122) | 77.8 (536) | 190.0 (87.8) | 3.87 | 93.0 (1.6) |
| 92.0/8.0 | 64.7 (446) | 248.4 (1713) | 165.0 (73.9) | 3.12 | 231.3 (4.1) |
| 99.0/1.0 | 76.3 (526) | 280.3 (1933) | 160.3 (71.3) | 3.05 | 254.9 (4.5) |
| 125E/HFC-143a | | | | | |
| 5.0/95.0* | 110.8 (764) | 367.1 (2531) | 216.7 (102.6) | 3.18 | 384.5 (6.8) |
| 95.0/5.0+ | 33.1 (228) | 143.5 (989) | 119.4 (48.6) | 3.40 | 145.9 (2.6) |

* = Subcool temp. is 20° F.
+ = Condenser temp. is 80° F., evaporator temp. is 0° F. and return gas temp. is 20° F.

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 125E/HFC-152a | | | | | |
| 5.0/95.0 | 52.1 (359) | 197.2 (1360) | 202.1 (94.5) | 3.60 | 227.5 (4.0) |
| 84.4/15.6 | 75.4 (520) | 274.4 (1892) | 168.7 (75.9) | 3.17 | 264.0 (4.6) |
| 95.0/ 5.0 | 77.6 (535) | 282.9 (1951) | 163.9 (73.3) | 3.07 | 260.2 (4.6) |
| 125E/HFC-161 | | | | | |
| 5.0/95.0 | 80.4 (554) | 282.6 (1948) | 200.3 (93.5) | 3.47 | 317.4 (5.6) |
| 66.5/35.5 | 89.6 (618) | 311.9 (2150) | 178.9 (81.6) | 3.23 | 314.7 (5.5) |
| 99.0/1.0 | 78.9 (544) | 288.0 (1986) | 162.4 (72.4) | 3.02 | 259.3 (4.6) |
| 125E/HFC-227ca | | | | | |
| 5.0/95.0 | 38.2 (263) | 149.4 (1030) | 143.7 (62.1) | 3.22 | 141.4 (2.5) |
| 95.0/5.0 | 75.4 (520) | 277.1 (1911) | 160.9 (71.6) | 3.04 | 250.5 (4.4) |
| 125E/HFC-227ea | | | | | |
| 5.0/95.0 | 30.4 (210) | 130.4 (899) | 140.9 (60.5) | 3.24 | 121.2 (2.1) |
| 95.0/5.0 | 74.6 (514) | 276.0 (1903) | 161.0 (71.7) | 3.04 | 249.2 (4.4) |
| 125E/HFC-236cb | | | | | |
| 5.0/95.0 | 20.0 (138) | 86.2 (594) | 146.1 (63.4) | 3.57 | 90.8 (1.6) |
| 95.0/5.0 | 71.1 (490) | 267.4 (1844) | 161.7 (72.1) | 3.08 | 244.8 (4.3) |
| 125E/HFC-236fa | | | | | |
| 5.0/95.0 | 21.9 (151) | 93.2 (643) | 145.9 (63.3) | 3.53 | 97.1 (1.7) |
| 95.0/5.0 | 71.8 (495) | 268.8 (1853) | 161.5 (71.9) | 3.08 | 245.9 (4.3) |
| 125E/HFC-245ca | | | | | |
| 5.0/95.0 | 8.46 (58) | 42.6 (294) | 156.8 (69.3) | 3.97 | 48.7 (0.9) |
| 95.0/5.0 | 61.2 (422) | 250.5 (1727) | 165.9 (74.4) | 3.08 | 226.2 (4.0) |
| 125E/HFC-245cb | | | | | |
| 5.0/95.0 | 37.9 (261) | 143.0 (986) | 139.7 (59.8) | 3.33 | 143.0 (2.5) |
| 95.0/5.0 | 74.2 (512) | 276.8 (1908) | 161.5 (71.9) | 3.00 | 246.0 (4.3) |
| 125E/HFC-245ea | | | | | |
| 5.0/95.0 | 8.41 (58) | 43.2 (298) | 161.4 (71.9) | 4.00 | 49.6 (0.9) |
| 95.0/5.0 | 61.2 (422) | 251.0 (1731) | 166.2 (74.6) | 3.08 | 226.6 (4.0) |
| 125E/HFC-245fa | | | | | |
| 5.0/95.0 | 12.7 ((88) | 59.7 (412) | 154.4 (68.0) | 3.80 | 66.4 (1.2) |
| 95.0/5.0 | 61.9 (427) | 258.4 (1782) | 167.6 (75.3) | 2.88 | 216.9 (3.8) |
| 125E/HFC-254ca | | | | | |
| 5.0/95.0 | 8.05 (56) | 40.5 (279) | 160.0 (71.1) | 3.99 | 46.8 (0.8) |
| 95.0/5.0 | 59.0 (407) | 245.6 (1693) | 166.7 (74.8) | 3.09 | 222.0 (3.9) |
| 125E/HFC-254cb | | | | | |
| 5.0/95.0 | 20.0 (138) | 85.0 (586) | 154.6 (68.1) | 3.67 | 93.8 (1.6) |
| 95.0/5.0 | 69.7 (481) | 263.2 (1815) | 162.1 (72.3) | 3.11 | 243.4 (4.3) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 125E/HFC-254eb | | | | | |
| 5.0/95.0 | 69.3 (478) | 263.5 (1817) | 162.5 (72.5) | 3.08 | 241.1 (4.2) |
| 95.0/5.0 | 67.1 (463) | 270.3 (1864) | 166.6 (74.8) | 2.87 | 226.9 (4.0) |
| 125E/HFC-263ca | | | | | |
| 5.0/95.0 | 10.6 (73) | 49.5 (341) | 161.5 (71.9) | 3.90 | 57.3 (1.0) |
| 95.0/5.0 | 61.4 (423) | 246.6 (1700) | 164.9 (73.8) | 3.14 | 228.5 (4.0) |
| 125E/HFC-263fb | | | | | |
| 5.0/95.0 | 31.7 (219) | 124.2 (856) | 155.0 (68.3) | 3.54 | 134.2 (2.4) |
| 95.0/5.0 | 72.6 (501) | 268.6 (1852) | 161.3 (71.8) | 3.10 | 248.1 (4.4) |
| 125E/HFC-272ca | | | | | |
| 5.0/95.0 | 20.1 (139) | 82.4 (568) | 160.4 (71.3) | 3.74 | 94.7 (1.7) |
| 95.0/5.0 | 67.4 (465) | 255.6 (1762) | 162.3 (72.4) | 3.16 | 240.8 (4.2) |
| 125E/HFC-272ea | | | | | |
| 5.0/95.0 | 11.8 (81) | 54.9 (379) | 170.0 (76.7) | 3.90 | 64.1 (1.1) |
| 95.0/5.0 | 61.1 (421) | 244.5 (1686) | 165.1 (73.9) | 3.17 | 229.2 (4.0) |
| 125E/HFC-272fb | | | | | |
| 5.0/95.0 | 15.0 (103) | 67.4 (465) | 168.1 (75.6) | 3.83 | 78.0 (1.4) |
| 95.0/5.0 | 64.3 (443) | 250.4 (1726) | 163.8 (73.2) | 3.17 | 235.5 (4.1) |
| 125E/HFC-281ea | | | | | |
| 5.0/95.0 | 27.4 (189) | 107.9 (744) | 167.8 (75.4) | 3.71 | 124.5 (2.2) |
| 95.0/5.0 | 69.1 (476) | 258.2 (1780) | 162.3 (72.4) | 3.16 | 244.6 (4.3) |
| 125E/HFC-281fa | | | | | |
| 5.0/95.0 | 21.5 (148) | 89.8 (619) | 169.0 (76.1) | 3.75 | 103.6 (1.8) |
| 95.0/5.0 | 66.4 (458) | 252.4 (1740) | 162.9 (72.7) | 3.19 | 240.1 (4.2) |
| 134E/HFC-227ea | | | | | |
| 5.0/95.0 | 35.9 (248) | 141.5 (976) | 143.9 (62.2) | 3.23 | 134.7 (2.4) |
| 7.3/92.7 | 36.0 (248) | 141.7 (977) | 144.5 (62.5) | 3.24 | 135.5 (2.4) |
| 95.0/5.0 | 16.7 (115) | 79.1 (545) | 173.0 (78.3) | 3.82 | 89.3 (1.6) |
| 134E/HFC-236fa | | | | | |
| 14.2/85.8 | 21.2 (146) | 91.1 (628) | 148.6 (64.8) | 3.50 | 94.3 (1.7) |
| 5.0/95.0 | 20.6 (142) | 88.6 (611) | 146.3 (63.5) | 3.48 | 91.1 (1.6) |
| 95.0/5.0 | 15.7 (108) | 75.9 (523) | 174.0 (78.9) | 3.74 | 83.5 (1.5) |
| 134E/HFC-254eb | | | | | |
| 28.6/71.4 | 19.0 (131) | 82.9 (572) | 159.2 (70.7) | 3.64 | 90.4 (1.6) |
| 5.0/95.0 | 19.0 (131) | 81.6 (563) | 155.2 (68.4) | 3.62 | 88.7 (1.6) |
| 95.0/5.0 | 15.5 (107) | 74.9 (516) | 174.5 (79.2) | 3.73 | 82.2 (1.4) |
| 134E/HFC-356mff | | | | | |
| 97.1/2.9 | 15.1 (104) | 73.5 (507) | 174.4 (79.1) | 3.73 | 80.6 (1.4) |
| 5.0/95.0 | 8.0 (55) | 41.6 (287) | 139.4 (59.7) | 3.60 | 41.8 (0.7) |
| 95.0/5.0 | 15.1 (104) | 73.4 (506) | 173.4 (78.6) | 3.72 | 80.4 (1.4) |
| 134aE/HFC-32 | | | | | |
| 5.0/95.0 | 148.4 (1023) | 506.8 (3494) | 199.1 (92.8) | 3.15 | 511.8 (9.0) |
| 95.0/5.0 | 51.1 (352) | 201.2 (1387) | 167.8 (75.4) | 3.56 | 216.6 (3.8) |
| 55/45* | 55.4 (382) | 227.7 (1571) | 153.7 (67.6) | 3.50 | 247.5 (4.4) |
| 11.5/88.5* | 77.6 (535) | 293.8 (2027) | 163.5 (73.1) | 3.48 | 328.8 (5.8) |
| 1/99* | 78.9 (544) | 299.8 (2068) | 166.8 (74.9) | 3.49 | 337.2 (5.9) |

*Condenser temp. 90° F., evaporator temp. 10° F., and return gas temp. 30° F.

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 134aE/HFC-125 | | | | | |
| 5.0/95.0 | 113.6 (783) | 382.2 (2635) | 170.1 (76.7) | 2.80 | 325.1 (5.7) |
| 95.0/5.0 | 44.6 (308) | 178.2 (1229) | 164.7 (73.7) | 3.45 | 185.2 (3.3) |
| 134aE/HFC-134 | | | | | |
| 99.0/1.0 | 41.8 (288) | 167.7 (1156) | 164.1 (73.4) | 3.45 | 174.7 (3.1) |
| 42.6/57.4 | 42.9 (296) | 171.5 (1183) | 174.1 (78.9) | 3.53 | 185.8 (3.3) |
| 1.0/99.0 | 42.2 (291) | 169.6 (1169) | 182.2 (83.4) | 3.59 | 188.7 (3.3) |
| 134aE/HFC-134a | | | | | |
| 5.0/95.0 | 53.9 (372) | 212.0 (1462) | 170.8 (77.1) | 3.42 | 221.2 (3.9) |
| 95.0/5.0 | 42.4 (292) | 170.1 (1173) | 164.5 (73.6) | 3.44 | 176.8 (3.1) |
| 134aE/HFC-143 | | | | | |
| 5.0/95.0 | 16.7 (115) | 74.9 (516) | 192.5 (89.2) | 3.81 | 87.9 (1.5) |
| 95.0/5.0 | 38.9 (268) | 158.7 (1094) | 166.0 (74.4) | 3.48 | 166.8 (2.9) |
| 134aE/HFC-143a | | | | | |
| 5.0/95.0 | 108.7 (749) | 361.3 (2491) | 216.8 (102.7) | 3.20 | 381.9 (6.7) |
| 95.0/5.0 | 45.2 (312) | 179.7 (1239) | 166.9 (74.9) | 3.46 | 188.3 (3.3) |
| 134aE/HFC-152 | | | | | |
| 99/1 | 41.9 (289) | 168.2 (1160) | 164.5 (73.6) | 3.45 | 175.3 (3.1) |
| 19.1/80.9 | 50.0 (345) | 191.4 (1160) | 197.6 (73.6) | 3.59 | 218.2 (3.1) |
| 1/99 | 50.8 (350) | 193.2 (1320) | 203.8 (92.0) | 3.61 | 223.3 (2.8) |
| 134aE/HFC-152a | | | | | |
| 5.0/95.0 | 50.6 (349) | 192.8 (1329) | 202.5 (94.7) | 3.60 | 222.3 (3.9) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 95.0/5.0 | 42.7 (294) | 170.5 (1176) | 166.4 (74.7) | 3.46 | 178.8 (3.1) |
| 99/1 | 41.9 (289) | 168.2 (1161) | 164.5 (73.6) | 3.45 | 175.3 (3.1) |
| 19.1/80.9 | 50.0 (345) | 191.4 (1161) | 197.6 (73.6) | 3.59 | 218.2 (3.1) |
| 1/99 | 50.8 (351) | 193.2 (1321) | 203.8 (92.0) | 3.61 | 223.3 (2.8) |
| 134aE/HFC-161 | | | | | |
| 5.0/95.0 | 79.0 (545) | 277.8 (1915) | 200.1 (93.4) | 3.49 | 313.7 (5.5) |
| 95.0/5.0 | 45.5 (314) | 180.6 (1245) | 167.6 (75.3) | 3.45 | 189.2 (3.3) |
| 134aE/HFC-227ca | | | | | |
| 5.0/95.0 | 37.8 (261) | 148.1 (1021) | 143.9 (62.2) | 3.21 | 140.0 (2.5) |
| 95.0/5.0 | 42.4 (292) | 169.5 (1169) | 163.1 (72.8) | 3.42 | 175.0 (3.1) |
| 99/1 | 41.9 (289) | 167.9 (1158) | 163.8 (73.2) | 3.44 | 174.5 (3.1) |
| 65.5/34.5 | 44.7 (308) | 174.0 (1200) | 156.6 (69.2) | 3.33 | 173.9 (3.1) |
| 1/99 | 36.8 (253) | 143.8 (992) | 142.8 (61.6) | 3.21 | 136.1 (2.4) |
| 134aE/HFC-227ea | | | | | |
| 5.0/95.0 | 36.9 (254) | 145.3 (1002) | 143.9 (62.2) | 3.22 | 137.7 (2.4) |
| 95.0/5.0 | 42.2 (291) | 169.3 (1167) | 163.1 (72.8) | 3.42 | 174.5 (3.1) |
| 99/1 | 41.7 (288) | 167.5 (1156) | 163.7 (73.2) | 3.45 | 174.2 (3.1) |
| 65.4/34.6 | 39.7 (274) | 160.8 (1110) | 156.0 (68.9) | 3.37 | 161.3 (2.8) |
| 1/99 | 28.6 (198) | 123.6 (853) | 139.8 (59.9) | 3.22 | 114.2 (2.0) |
| 134aE/HFC-236ca | | | | | |
| 5.0/95.0 | 14.2 (98) | 66.5 (459) | 152.1 (66.7) | 3.65 | 70.6 (1.2) |
| 95.0/5.0 | 39.7 (274) | 161.4 (1113) | 163.9 (73.3) | 3.45 | 167.8 (3.0) |
| 134aE/HFC-236cb | | | | | |
| 5.0/95.0 | 19.5 (134) | 84.6 (583) | 146.6 (63.7) | 3.52 | 87.9 (1.5) |
| 95.0/5.0 | 40.7 (281) | 164.0 (1131) | 163.2 (72.9) | 3.45 | 170.5 (3.0) |
| 134aE/HFC-236fa | | | | | |
| 5.0/95.0 | 21.4 (148) | 91.6 (632) | 146.3 (63.5) | 3.49 | 94.4 (1.7) |
| 95.0/5.0 | 41.0 (283) | 165.1 (1138) | 163.3 (72.9) | 3.43 | 170.8 (3.0) |
| 134aE/HFC-245ca | | | | | |
| 5.0/95.0 | 7.9 (54) | 40.9 (282) | 158.2 (70.1) | 3.84 | 45.0 (0.8) |
| 95.0/5.0 | 36.8 (254) | 154.9 (1068) | 165.7 (74.3) | 3.45 | 159.8 (2.8) |
| 134aE/HFC-245cb | | | | | |
| 5.0/95.0 | 36.6 (252) | 139.3 (960) | 140.1 (60.1) | 3.31 | 138.5 (2.4) |
| 95.0/5.0 | 41.7 (288) | 166.7 (1149) | 162.6 (72.6) | 3.44 | 173.1 (3.0) |
| 99/1 | 41.8 (288) | 167.4 (1155) | 163.7 (73.2) | 3.45 | 174.2 (3.1) |
| 57.7/42.3 | 40.4 (279) | 157.8 (1089) | 152.7 (67.1) | 3.39 | 161.0 (2.8) |
| 1/99 | 36.3 (251) | 137.6 (949) | 139.2 (59.6) | 3.31 | 136.6 (2.4) |
| 134aE/HFC-245ea | | | | | |
| 5.0/95.0 | 7.9 (54) | 41.5 (286) | 163.0 (72.8) | 3.86 | 45.6 (0.8) |
| 95.0/5.0 | 36.7 (253) | 155.2 (1070) | 166.1 (74.5) | 3.44 | 159.4 (2.8) |
| 134aE/HFC-245fa | | | | | |
| 5.0/95.0 | 12.1 (83) | 57.8 (399) | 155.4 (68.6) | 3.71 | 62.4 (1.1) |
| 95.0/5.0 | 38.7 (267) | 158.9 (1096) | 164.3 (73.5) | 3.46 | 165.4 (2.9) |
| 134aE/HFC-254ca | | | | | |
| 5.0/95.0 | 7.6 (52) | 39.0 (269) | 161.4 (71.8) | 3.86 | 43.2 (0.8) |
| 95.0/5.0 | 35.9 (248) | 152.6 (1052) | 166.3 (74.6) | 3.45 | 157.1 (2.8) |
| 134aE/HFC-254cb | | | | | |
| 5.0/95.0 | 19.4 (134) | 83.1 (573) | 155.0 (68.3) | 3.63 | 90.6 (1.6) |
| 95.0/5.0 | 39.9 (275) | 161.5 (1114) | 163.8 (73.2) | 3.46 | 168.3 (3.0) |
| 134aE/HFC-254eb | | | | | |
| 5.0/95.0 | 19.7 (136) | 84.3 (581) | 154.9 (68.3) | 3.63 | 91.9 (1.6) |
| 95.0/5.0 | 39.9 (275) | 161.6 (1114) | 163.7 (73.2) | 3.46 | 168.6 (3.0) |
| 134aE/HFC-263ca | | | | | |
| 5.0/95.0 | 10.1 (70) | 48.0 (331) | 162.5 (72.5) | 3.81 | 54.1 (1.0) |
| 95.0/5.0 | 36.8 (254) | 153.7 (1060) | 165.4 (74.1) | 3.47 | 160.0 (2.8) |
| 134aE/HFC-263fb | | | | | |
| 5.0/95.0 | 31.0 (214) | 121.9 (840) | 155.2 (68.4) | 3.53 | 131.3 (2.3) |
| 95.0/5.0 | 41.0 (283) | 164.5 (1134) | 163.4 (73.0) | 3.45 | 171.7 (3.0) |
| 134aE/HFC-272ca | | | | | |
| 5.0/95.0 | 19.6 (135) | 80.7 (556) | 160.8 (71.6) | 3.71 | 91.9 (1.6) |
| 95.0/5.0 | 39.1 (270) | 158.4 (1092) | 164.0 (73.3) | 3.48 | 166.7 (2.9) |
| 134aE/HFC-272ea | | | | | |
| 5.0/95.0 | 11.3 (78) | 53.6 (370) | 171.0 (77.2) | 3.82 | 61.1 (1.1) |
| 95.0/5.0 | 36.7 (253) | 153.2 (1056) | 165.8 (74.3) | 3.48 | 160.0 (2.8) |
| 134aE/HFC-272fb | | | | | |
| 5.0/95.0 | 14.6 (101) | 66.0 (455) | 168.8 (76.0) | 3.77 | 75.0 (1.3) |
| 95.0/5.0 | 38.0 (262) | 155.9 (1075) | 165.0 (73.9) | 3.49 | 163.7 (2.9) |
| 134aE/HFC-281ea | | | | | |
| 5.0/95.0 | 26.9 (185) | 106.3 (733) | 168.0 (75.6) | 3.69 | 122.1 (2.1) |

TABLE 4-continued

| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig.<br>Comp. | Evap.<br>Press.<br>Psia (kPa) | Cond.<br>Press.<br>Psia (kPa) | Comp. Dis.<br>Temp. °F.<br>(°C.) | COP | Capacity<br>BTU/min<br>(kw) |
|---|---|---|---|---|---|
| 95.0/5.0 | 39.9 (275) | 160.4 (1106) | 164.3 (73.5) | 3.49 | 169.2 (3.0) |
| 134aE/HFC-281fa | | | | | |
| 5.0/95.0 | 21.1 (145) | 88.4 (610) | 169.5 (76.4) | 3.72 | 101.0 (1.8) |
| 95.0/5.0 | 38.9 (268) | 157.8 (1088) | 164.7 (73.7) | 3.49 | 166.1 (2.9) |
| 143aE/HFC-32 | | | | | |
| 5.0/95.0 | 147.8 (1019) | 504.7 (3480) | 199.1 (92.8) | 3.16 | 510.9 (9.0) |
| 95.0/5.0 | 55.7 (384) | 211.3 (1457) | 170.0 (76.7) | 3.55 | 230.2 (4.1) |
| 54/46 | 106.8 (736) | 385.7 (2661) | 188.3 (86.8) | 3.25 | 391.0 (6.9) |
| 6.2/93.8 | 147.5 (1017) | 502.7 (3468) | 198.5 (92.5) | 3.17 | 509.9 (9.0) |
| 1/99 | 149.2 (1029) | 509.7 (3516) | 200.0 (93.3) | 3.16 | 518.0 (9.1) |
| 143aE/HFC-125 | | | | | |
| 5.0/95.0 | 115.3 (795) | 385.6 (2659) | 170.2 (76.8) | 2.80 | 328.3 (5.8) |
| 95.0/5.0 | 50.6 (349) | 193.4 (1333) | 167.5 (75.3) | 3.47 | 205.8 (3.6) |
| 143aE/HFC-134 | | | | | |
| 99.0/1.0 | 47.9 (33) | 183.8 (1267) | 167.2 (75.1) | 3.48 | 196.1 (3.4) |
| 92.4/7.6 | 47.6 (328) | 183.3 (1264) | 168.1 (75.6) | 3.48 | 196.1 (3.4) |
| 1.0/99.0 | 42.2 (291) | 169.8 (1171) | 182.2 (83.4) | 3.59 | 188.9 (3.3) |
| 143aE/HFC-134a | | | | | |
| 5.0/95.0 | 54.1 (373) | 212.3 (1464) | 170.8 (77.1) | 3.43 | 222.0 (3.9) |
| 95.0/5.0 | 48.2 (332) | 185.2 (1277) | 167.2 (75.1) | 3.47 | 197.2 (3.5) |
| 143aE/HFC-143 | | | | | |
| 5.0/95.0 | 16.9 (117) | 75.7 (522) | 192.3 (89.1) | 3.83 | 89.1 (1.6) |
| 95.0/5.0 | 44.4 (306) | 174.1 (1200) | 168.9 (76.1) | 3.50 | 186.8 (3.3) |
| 143aE/HFC-143a | | | | | |
| 5.0/95.0 | 108.8 (750) | 361.8 (2495) | 216.8 (102.7) | 3.20 | 380.8 (6.7) |
| 95.0/5.0 | 50.5 (348) | 194.6 (1342) | 170.2 (76.8) | 3.44 | 205.2 (3.6) |
| 53/47 | 77.4 (534) | 275.0 (1897) | 189.0 (87.2) | 3.37 | 292.4 (5.1) |
| 8.7/91.3* | 106.8 (736) | 355.5 (2453) | 214.0 (101.1) | 3.23 | 376.8 (6.6) |
| 1/99* | 111.7 (770) | 368.5 (2542) | 219.1 (103.9) | 3.19 | 388.4 (6.8) |
| *subcool temp. 20° F. | | | | | |
| 143aE/HFC-152a | | | | | |
| 5.0/95.0 | 50.6 (349) | 192.7 (1329) | 202.5 (94.7) | 3.60 | 222.4 (3.9) |
| 95.0/5.0 | 48.0 (331) | 184.2 (1270) | 169.1 (76.2) | 3.49 | 197.7 (3.5) |
| 99/1 | 47.9 (330) | 183.9 (1268) | 167.5 (75.3) | 3.47 | 196.4 (3.5) |
| 48.6/51.4 | 49.2 (339) | 188.3 (1299) | 186.9 (86.1) | 3.57 | 211.2 (3.7) |
| 1/99 | 50.8 (350) | 193.2 (1333) | 203.8 (95.4) | 3.61 | 223.3 (3.9) |
| 143aE/HFC-161 | | | | | |
| 5.0/95.0 | 78.9 (544) | 277.6 (1914) | 200.3 (93.5) | 3.48 | 313.1 (5.5) |
| 95.0/5.0 | 50.7 (350) | 193.7 (1336) | 170.0 (76.7) | 3.47 | 206.7 (3.6) |
| 143aE/HFC-227ca | | | | | |
| 5.0/95.0 | 38.6 (266) | 150.9 (1040) | 144.4 (62.4) | 3.22 | 143.0 (2.5) |
| 95.0/5.0 | 48.5 (334) | 186.0 (1282) | 166.1 (74.5) | 3.45 | 196.5 (3.5) |
| 99/1 | 48.0 (331) | 184.3 (1271) | 166.9 (74.9) | 3.47 | 196.1 (3.5) |
| 71.5/28.5 | 50.6 (349) | 190.7 (1315) | 160.5 (71.4) | 3.37 | 195.4 (3.4) |
| 1/99 | 36.9 (254) | 144.6 (997) | 142.9 (16.1) | 3.21 | 136.7 (2.4) |
| 143aE/HFC-227ea | | | | | |
| 5.0/95.0 | 37.8 (261) | 148.3 (1022) | 144.4 (62.4) | 32.3 | 141.0 (2.5) |
| 95.0/5.0 | 48.5 (334) | 185.9 (1282) | 166.1 (74.5) | 3.45 | 196.5 (3.5) |
| 99/1 | 48.0 (331) | 184.3 (1271) | 166.9 (74.9) | 3.47 | 196.1 (3.5) |
| 75.6/24.4 | 50.5 (348) | 190.4 (1313) | 161.4 (71.9) | 3.39 | 196.3 (3.5) |
| 1/99 | 36.9 (254) | 144.6 (997) | 142.6 (61.4) | 3.21 | 136.7 (2.4) |
| 143aE/HFC-236ca | | | | | |
| 5.0/95.0 | 14.6 (101) | 68.4 (472) | 152.3 (66.8) | 3.67 | 73.2 (1.3) |
| 95.0/5.0 | 45.7 (315) | 178.3 (1229) | 167.1 (75.1) | 3.47 | 188.9 (3.3) |
| 143aE/HFC-236cb | | | | | |
| 5.0/95.0 | 19.9 (137) | 86.2 (594) | 146.9 (63.8) | 3.54 | 90.2 (1.6) |
| 95.0/5.0 | 46.7 (322) | 180.6 (1245) | 166.5 (74.7) | 3.46 | 191.2 (3.4) |
| 143aE/HFC-236fa | | | | | |
| 5.0/95.0 | 22.0 (152) | 93.7 (646) | 146.6 (63.7) | 3.51 | 97.2 (1.7) |
| 95.0/5.0 | 47.1 (325) | 181.6 (1252) | 166.3 (74.6) | 3.46 | 192.4 (3.4) |
| 143aE/HFC-245ca | | | | | |
| 5.0/95.0 | 8.3 (57) | 42.3 (292) | 158.4 (70.2) | 3.88 | 47.0 (0.8) |
| 95.0/5.0 | 42.6 (294) | 171.3 (1181) | 168.8 (76.0) | 3.46 | 180.3 (3.2) |
| 143aE/HFC-245cb | | | | | |
| 5.0/95.0 | 37.2 (256) | 140.9 (971) | 140.3 (60.2) | 3.32 | 140.7 (2.5) |
| 95.0/5.0 | 47.7 (329) | 182.8 (1260) | 165.7 (74.3) | 3.47 | 194.2 (3.4) |
| 99/1 | 48.0 (331) | 184.3 (1271) | 166.9 (73.3) | 3.47 | 196.1 (3.5) |
| 59.6/40.4 | 50.9 (351) | 190.6 (1315) | 157.7 (69.8) | 3.33 | 192.1 (3.4) |
| 20/80 | 44.3 (305) | 169.4 (1168) | 148.5 (64.7) | 3.25 | 163.3 (2.9) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 143aE/HFC-245ea | | | | | |
| 5.0/95.0 | 8.2 (57) | 42.7 (294) | 163.0 (72.8) | 3.90 | 47.7 (0.8) |
| 95.0/5.0 | 42.3 (292) | 171.3 (1181) | 169.5 (76.4) | 3.45 | 179.6 (3.2) |
| 143aE/HFC-245fa | | | | | |
| 5.0/95.0 | 12.5 (86) | 59.4 (410) | 155.0 (68.3) | 3.74 | 65.0 (1.1) |
| 95.0/5.0 | 44.6 (308) | 175.4 (1209) | 167.5 (75.3) | 3.48 | 186.2 (3.3) |
| 143aE/HFC-254ca | | | | | |
| 5.0/95.0 | 7.8 (54) | 40.1 (276) | 161.5 (71.9) | 3.90 | 45.1 (0.8) |
| 95.0/5.0 | 41.5 (286) | 168.9 (1165) | 169.6 (76.4) | 3.45 | 177.1 (3.1) |
| 143aE/HFC-254cb | | | | | |
| 5.0/95.0 | 19.7 (136) | 84.3 (581) | 155.3 (68.5) | 3.64 | 92.3 (1.6) |
| 95.0/5.0 | 45.9 (316) | 177.8 (1226) | 166.8 (74.9) | 3.48 | 189.6 (3.3) |
| 143aE/HFC-254eb | | | | | |
| 5.0/95.0 | 20.1 (139) | 85.6 (590) | 155.2 (68.4) | 3.63 | 93.6 (1.6) |
| 95.0/5.0 | 45.9 (31.6) | 177.9 (1227) | 166.7 (74.8) | 3.48 | 189.9 (3.3) |
| 143aE/HFC-263ca | | | | | |
| 5.0/95.0 | 10.3 (71) | 48.9 (337) | 162.6 (72.6) | 3.83 | 55.6 (1.0) |
| 95.0/5.0 | 42.4 (292) | 169.7 (1170) | 168.7 (75.9) | 3.48 | 179.9 (3.2) |
| 143aE/HFC-263fb | | | | | |
| 5.0/95.0 | 31.3 (216) | 122.9 (847) | 155.4 (68.6) | 3.53 | 132.5 (2.3) |
| 95.0/5.0 | 46.9 (323) | 180.3 (1243) | 166.4 (74.7) | 3.48 | 192.4 (3.4) |
| 143aE/HFC-272ca | | | | | |
| 5.0/95.0 | 19.9 (137) | 81.6 (563) | 160.9 (71.6) | 3.71 | 93.1 (1.6) |
| 95.0/5.0 | 44.9 (310) | 174.3 (1202) | 167.0 (75.0) | 3.50 | 187.2 (3.3) |
| 143aE/HFC-272ea | | | | | |
| 5.0/95.0 | 11.5 (79) | 54.3 (374) | 171.0 (77.2) | 3.84 | 62.3 (1.1) |
| 95.0/5.0 | 42.2 (291) | 168.9 (1165) | 169.0 (76.1) | 3.49 | 179.8 (3.2) |
| 143aE/HFC-272fb | | | | | |
| 5.0/95.0 | 14.8 (102) | 66.7 (460) | 168.9 (76.1) | 3.78 | 76.1 (1.3) |
| 95.0/5.0 | 43.5 (300) | 171.7 (1184) | 168.1 (75.6) | 3.50 | 183.7 (3.2) |
| 143aE/HFC-281ea | | | | | |
| 5.0/95.0 | 27.0 (186) | 106.7 (736) | 168.2 (75.7) | 3.69 | 122.5 (2.2) |
| 95.0/5.0 | 45.3 (312) | 175.2 (1208) | 167.3 (75.2) | 3.51 | 188.6 (3.3) |
| 143aE/HFC-281fa | | | | | |
| 5.0/95.0 | 21.3 (147) | 89.0 (614) | 169.5 (76.4) | 3.73 | 101.9 (1.8) |
| 95.0/5.0 | 44.4 (306) | 173.1 (1193) | 167.6 (75.3) | 3.51 | 186.0 (3.3) |
| C216E/HFC-32 | | | | | |
| 5.0/95.0* | 156.5 (1079) | 525.3 (3622) | 197.4 (91.9) | 3.30 | 556.2 (9.8) |
| 95.0/5.0 | 76.7 (529) | 238.9 (1647) | 150.5 (65.8) | 3.15 | 252.8 (4.4) |
| * = subcool temperature of 20.0° F. | | | | | |
| C216E/HFC-125 | | | | | |
| 5.0/95.0* | 62.6 (432) | 230.8 (1591) | 131.3 (55.2) | 3.28 | 233.2 (4.1) |
| 95.0/5.0 | 58.8 (405) | 210.4 (1451) | 141.0 (60.0) | 2.95 | 182.0 (3.2) |
| * = evaporator temperature of 10.0° F., condenser temperature of 90.0°F. and return gas of 30.0° F. | | | | | |
| C216E/HFC-134 | | | | | |
| 99.0/1.0 | 60.2 (415) | 217.4 (1499) | 140.3 (612) | 2.96 | 190.1 (3.3) |
| 79.8/20.2 | 69.3 (478) | 245.1 (1690) | 146.3 (63.5) | 3.01 | 219.9 (3.9) |
| 1.0/99.0 | 43.1 (297) | 174.9 (1206) | 173.9 (78.8) | 3.58 | 192.8 (3.4) |
| C216E/HFC-134a | | | | | |
| 5.0/95.0 | 56.9 (392) | 221.2 (1525) | 169.4 (76.3) | 3.41 | 229.8 (4.0) |
| 95.0/5.0 | 59.5 (410) | 212.8 (1467) | 141.2 (60.7) | 2.96 | 184.1 (3.2) |
| 99/1 | 58.8 (405) | 196.4 (1355) | 135.6 (57.6) | 3.24 | 189.3 (3.3) |
| 61.7/38.3 | 56.2 (387) | 202.3 (1395) | 139.6 (39.8) | 2.93 | 173.3 (3.1) |
| 1/99 | 55.1 (380) | 215.3 (1485) | 170.5 (76.9) | 3.44 | 225.4 (4.0) |
| C216E/HFC-143 | | | | | |
| 5.0/95.0 | 18.2 (125) | 78.9 (544) | 188.7 (87.1) | 3.97 | 97.1 (1.7) |
| 95.0/5.0 | 54.8 (378) | 196.7 (1356) | 141.2 (60.7) | 3.01 | 174.1 (3.1) |
| C216E/HFC-143a | | | | | |
| 5.0/95.0* | 110.9 (765) | 365.8 (2522) | 215.2 (101.8) | 3.18 | 383.3 (6.7) |
| 95.0/5.0 | 60.0 (414) | 214.1 (1476) | 143.2 (61.8) | 2.99 | 188.0 (3.3) |
| * = subcool temperature of 20.0° F. | | | | | |
| C216E/HFC-152a | | | | | |
| 5.0/95.0 | 52.8 (364) | 199.0 (1372) | 201.0 (93.9) | 3.61 | 230.2 (4.0) |
| 95.0/5.0 | 61.2 (422) | 217.9 (1502) | 143.5 (61.9) | 2.98 | 190.9 (3.4) |
| 99/1 | 57.0 (383) | 203.5 (1404) | 193.0 (59.4) | 2.96 | 176.5 (3.1) |
| 77.6/22.4 | 72.4 (499) | 250.0 (1725) | 155.0 (68.3) | 3.08 | 231.5 (4.1) |
| 1/99 | 51.0 (351) | 195.0 (1345) | 204.3 (95.7) | 3.58 | 223.6 (3.9) |
| C216E/HFC-161 | | | | | |

TABLE 4-continued

| | | | | | |
|---|---|---|---|---|---|
| Evaporator temperature | 45.0° F. (7.2° C.) | | | | |
| Condenser temperature | 130.0° F. (54.4° C.) | | | | |
| Subcool temperature | 15° F. | | | | |
| Return gas temperature | 65.0° F. (18.3° C.) | | | | |
| Compressor efficiency is 75%. | | | | | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 5.0/95.0 | 81.6 (563) | 284.8 (1964) | 199.1 (92.8) | 3.49 | 321.2 (5.6) |
| 95.0/5.0 | 66.8 (461) | 237.7 (1639) | 145.9 (63.3) | 3.00 | 209.6 (3.7) |
| 99/1 | 58.4 (403) | 207.9 (1434) | 140.2 (60.1) | 2.99 | 182.2 (3.2) |
| 58.8/41.2 | 98.5 (679) | 325.5 (2246) | 171.2 (77.3) | 3.13 | 315.7 (5.6) |
| 1/99 | 80.2 (553) | 280.6 (1936) | 200.8 (93.8) | 3.50 | 318.0 (5.6) |
| C216E/HFC-227ca | | | | | |
| 5.0/95.0 | 37.2 (256) | 145.5 (1003) | 142.5 (61.4) | 3.19 | 136.5 (2.4) |
| 95.0/5.0 | 54.3 (374) | 196.0 (1351) | 139.2 (59.6) | 2.95 | 169.6 (3.0) |
| C216E/HFC-227ea | | | | | |
| 5.0/95.0 | 36.3 (250) | 142.5 (983) | 142.5 (61.4) | 3.20 | 134.2 (2.4) |
| 95.0/5.0 | 54.1 (373) | 195.6 (1349) | 139.3 (59.6) | 2.95 | 169.1 (3.0) |
| C216E/HFC-236ca | | | | | |
| 5.0/95.0 | 14.4 (99) | 66.8 (461) | 150.3 (65.7) | 3.68 | 71.6 (1.3) |
| 95.0/5.0 | 51.3 (354) | 189.2 (1304) | 140.0 (60.0) | 2.99 | 165.6 (2.9) |
| C216E/HFC-236cb | | | | | |
| 5.0/95.0 | 19.4 (138) | 84.3 (581) | 145.2 (62.9) | 3.52 | 87.3 (1.5) |
| 95.0/5.0 | 52.4 (361) | 191.2 (1318) | 139.5 (59.7) | 2.98 | 167.0 (2.9) |
| C216E/HFC-236fa | | | | | |
| 5.0/95.0 | 21.3 (147) | 90.9 (627) | 144.8 (62.7) | 3.48 | 93.5 (1.6) |
| 95.0/5.0 | 52.5 (362) | 191.7 (1322) | 139.6 (59.8) | 2.98 | 167.0 (2.9) |
| C216E/HFC-245ca | | | | | |
| 5.0/95.0 | 8.4 (58) | 42.2 (291) | 156.5 (69.2) | 3.96 | 48.1 (0.8) |
| 95.0/5.0 | 48.0 (331) | 183.5 (1265) | 141.5 (60.8) | 2.99 | 159.9 (2.8) |
| C216E/HFC-245cb | | | | | |
| 5.0/95.0 | 37.1 (256) | 140.4 (968) | 139.0 (59.4) | 3.29 | 138.6 (2.4) |
| 95.0/5.0 | 54.8 (378) | 196.9 (1358) | 139.0 (59.4) | 2.95 | 170.5 (3.0) |
| 99/1 | 55.5 (382) | 198.8 (1371) | 139.0 (59.4) | 2.94 | 171.4 (3.0) |
| 95.1/4.9 | 54.8 (378) | 197.0 (1359) | 139.0 (59.4) | 2.95 | 170.6 (3.0) |
| 1/99 | 36.3 (253) | 13.8 (952) | 139.0 (59.4) | 3.30 | 136.4 (2.4) |
| C216E/HFC-245ea | | | | | |
| 5.0/95.0 | 8.6 (59) | 43.5 (300) | 159.4 (70.8) | 4.06 | 50.9 (0.9) |
| 95.0/5.0 | 492 (339) | 185.9 (1282) | 141.2 (60.7) | 2.99 | 162.2 (2.9) |
| C216E/HFC-245fa | | | | | |
| 5.0/95.0 | 12.5 (86) | 58.9 (406) | 153.4 (67.4) | 3.78 | 65.1 (1.1) |
| 95.0/5.0 | 50.6 (349) | 187.8 (1295) | 140.3 (60.2) | 3.00 | 164.8 (2.9) |
| C216E/HFC-254ca | | | | | |
| 5.0/95.0 | 8.2 (57) | 40.7 (281) | 158.3 (70.2) | 4.04 | 47.8 (0.8) |
| 95.0/5.0 | 47.7 (329) | 183.8 (1258) | 141.6 (60.9) | 3.00 | 159.7 (2.8) |
| C216E/HFC-254cb | | | | | |
| 5.0/95.0 | 19.7 (136) | 84.0 (579) | 153.7 (67.6) | 3.65 | 92.0 (1.6) |
| 95.0/5.0 | 52.4 (361) | 190.9 (1316) | 140.0 (60.0) | 2.99 | 167.8 (2.9) |
| C216E/HFC-254eb | | | | | |
| 5.0/95.0 | 20.1 (139) | 85.3 (588) | 153.7 (67.6) | 3.64 | 93.2 (1.6) |
| 95.0/5.0 | 52.4 (362) | 191.1 (1318) | 139.8 (59.9) | 3.00 | 168.3 (3.0) |
| C216E/HFC-263ca | | | | | |
| 5.0/95.0 | 10.7 (74) | 49.6 (342) | 160.1 (71.2) | 3.93 | 58.1 (1.0) |
| 95.0/5.0 | 49.1 (339) | 183.8 (1267) | 141.0 (60.6) | 3.02 | 163.0 (2.9) |
| C216E/HFC-263fb | | | | | |
| 5.0/95.0 | 31.5 (217) | 123.4 (851) | 154.3 (67.9) | 3.52 | 132.5 (2.3) |
| 95.0/5.0 | 54.4 (375) | 195.5 (1348) | 139.9 (59.9) | 2.98 | 171.7 (3.0) |
| C216E/HFC-272ca | | | | | |
| 5.0/95.0 (139) | 20.1 (139) | 82.2 (567) | 159.6 (70.9) | 3.74 | 94.4 (1.7) |
| 95.0/5.0 (361) | 52.4 (361) | 189.9 (1309) | 140.2 (60.1) | 3.02 | 169.1 (3.0) |
| C216E/HFC-272ea | | | | | |
| 5.0/95.0 | 12.3 (85) | 56.1 (387) | 167.8 (75.4) | 4.00 | 67.6 (1.2) |
| 95.0/5.0 | 51.2 (353) | 187.8 (1295) | 140.8 (60.4) | 3.03 | 167.4 (2.9) |
| C216E/HFC-272fb | | | | | |
| 5.0/95.0 | 15.5 (107) | 68.4 (472) | 166.5 (74.7) | 3.89 | 80.6 (1.4) |
| 95.0/5.0 | 52.6 (362) | 190.9 (1316) | 140.5 (60.3) | 3.02 | 169.7 (3.0) |
| C216E/HFC-281ea | | | | | |
| 5.0/95.0 | 27.6 (190) | 108.3 (747) | 167.0 (75.0) | 3.72 | 125.2 (2.2) |
| 95.0/5.0 | 55.2 (381) | 197.1 (1359) | 140.9 (60.5) | 3.01 | 175.1 (3.1) |
| C216E/HFC-281fa | | | | | |
| 5.0/95.0 | 21.9 (151) | 90.5 (624) | 168.0 (75.6) | 3.78 | 105.3 (1.9) |
| 95.0/5.0 | 54.2 (374) | 194.5 (1341) | 141.0 (60.6) | 3.01 | 173.3 (3.1) |
| C-216E2/HFC-32 | | | | | |
| 5.0/95.0 | 149.0 (1027) | 508.2 (3504) | 1982 (92.3) | 3.16 | 513.2 (9.0) |
| 36.0/64.0 | 138.0 (951) | 473.4 (3264) | 184.7 (84.8) | 3.21 | 475.3 (8.4) |
| 95.0/5.0 | 56.1 (387) | 216.3 (1491) | 141.9 (61.1) | 3.25 | 204.7 (3.6) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| *20° F. Subcool | | | | | |
| C-216E2/HFC-134 | | | | | |
| 5.0/95.0 | 42.7 (294) | 171.6 (1183) | 180.0 (82.2) | 3.58 | 189.6 (3.3) |
| 95.0/5.0 | 45.4 (313) | 174.2 (1201) | 1362 (57.9) | 3.11 | 159.2 (2.8) |
| 60.5/39.5 | 48.5 (334) | 186.1 (1283) | 152.3 (66.8) | 3.34 | 186.6 (3.3) |
| C-216E2/HFC-134a | | | | | |
| 5.0/95.0 | 54.8 (378) | 214.5 (1479) | 1692 (76.2) | 3.42 | 222.9 (3.9) |
| 20.7/79.4 | 55.5 (383) | 214.9 (1482) | 163.8 (73.2) | 3.37 | 219.3 (3.9) |
| 95.0/5.0 | 46.0 (317) | 176.4 (1216) | 135.9 (57.7) | 3.11 | 160.9 (2.8) |
| C-216E2/HFC-143 | | | | | |
| 5.0/95.0 | 16.7 (115) | 74.8 (516) | 190.8 (882) | 3.83 | 88.1 (1.6) |
| 87.1/12.9 | 36.4 (251) | 146.7 (1011) | 142.3 (61.3) | 3.30 | 143.2 (2.5) |
| 95.0/5.0 | 41.0 (283) | 160.5 (1107) | 137.0 (58.3) | 3.18 | 149.8 (2.6) |
| C-216E2/HFC-152a | | | | | |
| 60.5/39.5 | 53.8 (371) | 200.7 (1384) | 164.6 (73.7) | 3.42 | 210.7 (3.7) |
| 5.0/95.0 | 51.1 (352) | 194.3 (1340) | 201.3 (94.1) | 3.59 | 223.4 (3.9) |
| 95.0/5.0 | 46.7 (322) | 178.4 (1230) | 138.2 (59.0) | 3.15 | 165.3 (2.9) |
| C-216E/HFC-161 | | | | | |
| 45.7/54.3 | 78.8 (543) | 275.5 (1900) | 178.6 (81.4) | 3.39 | 294.1 (5.2) |
| 5.0/95.0 | 79.9 (551) | 279.8 (1929) | 199.1 (92.8) | 3.49 | 315.6 (5.6) |
| 95.0/5.0 | 51.4 (354) | 194.9 (1344) | 140.4 (60.2) | 3.17 | 182.1 (3.2) |
| C-216E2/HFC-245cb | | | | | |
| 74.7/25.3 | 41.2 (284) | 158.2 (1091) | 135.3 (57.4) | 3.16 | 147.4 (2.6) |
| 5.0/95.0 | 36.4 (251) | 138.4 (954) | 138.8 (59.3) | 3.29 | 136.7 (2.4) |
| 95.0/5.0 | 43.5 (300) | 167.2 (1153) | 134.1 (56.7) | 3.09 | 151.5 (2.7) |
| 218E/HFC-32 | | | | | |
| 5.0/95.0* | 155.2 (1070) | 523.5 (3609) | 197.5 (91.9) | 3.30 | 553.7 (9.7) |
| 95.0/5.0 | 69.2 (477) | 279.5 (1927) | 151.1 (66.2) | 2.94 | 227.1 (4.0) |
| * = subcool temperature of 20.0° F. | | | | | |
| 218E/HFC-125 | | | | | |
| 5.0/95.0 | 62.6 (432) | 231.3 (1595) | 131.4 (55.2) | 3.28 | 233.0 (4.1) |
| 95.0/5.0 | 52.1 (359) | 203.0 (1400) | 140.0 (60.0) | 2.83 | 162.4 (2.9) |
| 218E/HFC-134 | | | | | |
| 99.0/1.0 | 49.1 (339) | 192.4 (1327) | 138.2 (59.0) | 2.80 | 152.6 (2.7) |
| 63.3/36.7 | 63.7 (439) | 235.1 (1621) | 1532 (67.3) | 3.04 | 211.5 (3.7) |
| 35.0/65.0 | 54.8 (378) | 213.6 (1473) | 167.0 (75.0) | 3.34 | 215.8 (3.8) |
| 5.0/95.0 | 44.6 (308) | 177.3 (1222) | 179.4 (81.9) | 3.62 | 198.5 (3.5) |
| 218E/HFC-134a | | | | | |
| 5.0/95.0 | 56.5 (390) | 220.5 (1520) | 169.5 (76.4) | 3.41 | 228.9 (4.0) |
| 95.0/5.0 | 52.8 (364) | 205.7 (1418) | 140.4 (602) | 2.82 | 164.4 (2.9) |
| 99/1 | 49.3 (340) | 192.8 (1330) | 138.0 (53.3) | 2.81 | 153.4 (2.7) |
| 53.0/47.0 | 70.4 (485) | 258.8 (1785) | 154.2 (67.9) | 3.00 | 228.7 (4.0) |
| 1/99 | 55.0(379) | 215.4 (1486) | 170.6 (77.0) | 3.43 | 225.2 (4.0) |
| 218E/HFC-143 | | | | | |
| 5.0/95.0 | 17.9 (123) | 78.1 (538) | 189.2 (8.72) | 3.95 | 95.3 (1.7) |
| 95.0/5.0 | 48.1 (332) | 187.0 (1289) | 139.8 (60.0) | 2.90 | 155.0 (2.7) |
| 218E/HFC-143a | | | | | |
| 5.0/95.0* | 110.8 (764) | 366.5 (2527) | 215.4 (101.9) | 3.18 | 383.2 (6.7) |
| 95.0/5.0 | 53.6 (370) | 207.7 (1432) | 142.5 (61.4) | 2.86 | 169.4 (3.0) |
| * = subcool temperature of 20.° F. | | | | | |
| 218E/HFC-152a | | | | | |
| 5.0/95.0 | 52.5 (362) | 198.6 (1369) | 201.1 (93.9) | 3.61 | 229.5 (4.0) |
| 95.0/5.0 | 54.8 (378) | 211.7 (1460) | 142.8 (61.6) | 2.85 | 172.0 (3.0) |
| 99/1 | 49.8 (343) | 194.4 (1341) | 138.6 (59.2) | 2.82 | 155.5 (2.7) |
| 68.2/31.8 | 69.8 (481) | 250.5 (1728) | 160.9 (71.6) | 3.12 | 234.9 (4.1) |
| 41/59 | 63.1 (435) | 232.3 (1602) | 179.3 (81.8) | 3.42 | 247.4 (4.4) |
| 218E/HFC-161 | | | | | |
| 5.0/95.0 | 81.5 (562) | 284.7 (1963) | 199.2 (92.9) | 3.49 | 321.1 (5.7) |
| 95.0/5.0* | 61.1 (421) | 236.0 (1627) | 146.0 (63.3) | 3.05 | 204.6 (3.6) |
| 84/16* | 88.3 (609) | 275.7 (1907) | 146.6 (63.7) | 3.74 | 310.2 (5.5) |
| 62.6/37.4 | 97.7 (674) | 329.2 (2271) | 169.3 (76.3) | 3.04 | 307.5 (5.4) |
| 39/61 | 92.2 (636) | 315.8 (2179) | 183.2 (84.0) | 3.30 | 329.2 (5.8) |
| * = subcool temperature of 20.0° F. | | | | | |
| 218E/HFC-227ca | | | | | |
| 5.0/95.0 | 36.8 (254) | 144.7 (998) | 142.4 (61.3) | 3.18 | 135.2 (2.4) |
| 95.0/5.0 | 47.3 (326) | 185.9 (1282) | 137.8 (58.8) | 2.82 | 148.1 (2.6) |
| 218E/HFC-227ea | | | | | |
| 5.0/95.0 | 35.0 (248) | 141.8 (978) | 142.4 (61.3) | 3.20 | 133.2 (2.3) |
| 95.0/5.0 | 473 (326) | 185.7 (1280) | 137.7 (58.7) | 2.83 | 149.0 (2.6) |

TABLE 4-continued

| | | | | | |
|---|---|---|---|---|---|
| Evaporator temperature | 45.0° F. (7.2° C.) | | | | |
| Condenser temperature | 130.0° F. (54.4° C.) | | | | |
| Subcool temperature | 15° F. | | | | |
| Return gas temperature | 65.0° F. (18.3° C.) | | | | |
| Compressor efficiency is 75%. | | | | | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 218E/HFC-236ca | | | | | |
| 5.0/95.0 | 14.0 (97) | 65.7 (453) | 150.3 (65.7) | 3.65 | 69.8 (1.2) |
| 95.0/5.0 | 443 (305) | 1783 (1229) | 138.3 (59.1) | 2.88 | 145.4 (2.6) |
| 218E/HFC-236cb | | | | | |
| 5.0/95.0 | 19.1 (132) | 83.0 (572) | 145.0 (62.8) | 3.51 | 85.7 (1.5) |
| 95.0/5.0 | 45.1 (311) | 179.8 (1240) | 138.0 (58.9) | 2.87 | 146.2 (2.6) |
| 218E/HFC-236fa | | | | | |
| 5.0/95.0 | 21.0 (145) | 89.8 (619) | 144.7 (62.6) | 3.47 | 92.0 (1.6) |
| 95.0/5.0 | 45.4 (313) | 180.8 (1247) | 138.0 (58.9) | 2.86 | 146.6 (2.6) |
| 218E/HFC-245ca | | | | | |
| 5.0/95.0 | 8.1 (56) | 41.2 (284) | 156.0 (68.9) | 3.91 | 56.8 (1.0) |
| 95.0/5.0 | 41.2 (284) | 172.2 (1187) | 139.5 (59.7) | 2.90 | 140.4 (2.5) |
| 218E/HFC-245cb | | | | | |
| 5.0/95.0 | 36.8 (254) | 139.7 (963) | 138.9 (59.3) | 3.29 | 137.6 (2.4) |
| 95.0/5.0 | 47.9 (330) | 187.1 (1290) | 137.5 (58.6) | 2.83 | 150.4 (2.6) |
| 218E/HFC-245ea | | | | | |
| 5.0/95.0 | 8.2 (57) | 42.5 (293) | 160.1 (71.2) | 3.99 | 48.5 (0.9) |
| 95.0/5.0 | 42.3 (292) | 174.7 (1205) | 139.3 (59.6) | 2.89 | 142.4 (2.5) |
| 218E/HFC-245fa | | | | | |
| 5.0/95.0 | 12.2 (84) | 58.0 (400) | 153.6 (67.6) | 3.74 | 63.2 (1.1) |
| 95.0/5.0 | 43.8 (302) | 176.8 (1219) | 138.5 (59.2) | 2.90 | 145.0 (2.6) |
| 218E/HFC-254ca | | | | | |
| 5.0/95.0 | 7.9 (54) | 39.8 (274) | 159.0 (70.6) | 3.97 | 45.6 (0.8) |
| 95.0/5.0 | 40.9 (282) | 171.0 (1179) | 139.6 (59.8) | 2.91 | 140.4 (2.5) |
| 218E/HFC-254cb | | | | | |
| 5.0/95.0 | 19.4 (134) | 83.1 (573) | 153.7 (67.6) | 3.63 | 90.5 (1.6) |
| 95.0/5.0 | 45.4 (313) | 180.1 (1242) | 138.2 (59.0) | 2.89 | 148.0 (2.6) |
| 218E/HFC-254eb | | | | | |
| 5.0/95.0 | 19.8 (137) | 84.3 (581) | 153.6 (67.6) | 3.63 | 91.9 (1.6) |
| 95.0/5.0 | 45.5 (314) | 180.2 (1242) | 138.2 (59.0) | 2.89 | 148.2 (2.6) |
| 218E/HFC-263ca | | | | | |
| 5.0/95.0 | 10.4 (72) | 48.9 (337) | 160.5 (71.4) | 3.89 | 56.4 (1.0) |
| 95.0/5.0 | 42.5 (293) | 172.6 (1190) | 139.0 (59.4) | 2.94 | 144.0 (2.5) |
| 218E/HFC-263fb | | | | | |
| 5.0/95.0 | 31.2 (215) | 122.8 (847) | 154.2 (67.9) | 3.52 | 131.5 (2.3) |
| 95.0/5.0 | 47.6 (328) | 185.8 (1281) | 138.4 (59.1) | 2.87 | 151.8 (2.7) |
| 99/1 | 48.2 (332) | 188.7 (1302) | 137.7 (58.7) | 2.81 | 150.2 (2.6) |
| 96.3/3.7 | 47.8 (329) | 186.9 (1289) | 138.2 (59.0) | 2.85 | 151.3 (2.7) |
| 1/99 | 27.9 (192) | 120.6 (832) | 155.5 (68.6) | 3.26 | 116.9 (2.1) |
| 218E/HFC-272ca | | | | | |
| 5.0/95.0 | 19.9 (137) | 81.5 (562) | 159.6 (70.9) | 3.73 | 93.3 (1.6) |
| 95.0/5.0 | 45.8 (316) | 179.7 (1239) | 138.7 (59.3) | 2.92 | 150.1 (2.6) |
| 218E/HFC-272ea | | | | | |
| 5.0/95.0 | 12.0 (83) | 55.6 (383) | 168.4 (75.8) | 3.96 | 65.9 (1.2) |
| 95.0/5.0 | 44.5 (307) | 177.2 (1222) | 139.2 (59.6) | 2.93 | 148.3 (2.6) |
| 218E/HFC-272fb | | | | | |
| 5.0/95.0 | 15.2 (105) | 67.7 (467) | 167.0 (75.0) | 3.86 | 78.9 (1.4) |
| 95.0/5.0 | 45.9 (316) | 180.6 (1245) | 139.0 (59.4) | 2.91 | 150.5 (2.6) |
| 218E/HFC-281ea | | | | | |
| 5.0/95.0 | 27.4 (189) | 107.9 (744) | 167.0 (75.0) | 3.71 | 124.4 (2.2) |
| 95.0/5.0 | 48.6 (335) | 187.8 (1295) | 139.6 (59.8) | 2.91 | 156.6 (2.8) |
| 218E/HFC-281fa | | | | | |
| 5.0/95.0 | 21.6 (149) | 90.0 (621) | 168.3 (75.7) | 3.76 | 104.1 (1.8) |
| 95.0/5.0 | 47.7 (329) | 185.3 (1278) | 139.6 (59.8) | 2.91 | 154.7 (2.7) |
| 218E2/HFC-32 | | | | | |
| 5.0/95.0 | 151.9 (1047) | 516.9 (3564) | 198.0 (92.2) | 2.93 | 484.2 (8.5) |
| 95.0/5.0 | 48.6 (335) | 211.8 (1460) | 140.9 (60.5) | 3.43 | 197.4 (3.5) |
| 218E2/HFC-125 | | | | | |
| 5.0/95.0 | 60.8 (419) | 228.6 (1576) | 131.8 (55.4) | 3.26 | 228.5 (4.0) |
| 95.0/5.0 | 34.1 (235) | 150.5 (1038) | 131.9 (55.5) | 2.97 | 123.1 (2.2) |

* = evaporator temperature of 10.0° F., condenser temperature of 90.0° F., and return gas of 30.0° F.

| | | | | | |
|---|---|---|---|---|---|
| 218E2/HFC-134 | | | | | |
| 95.0/5.0 | 33.1 (228) | 145.8 (1005) | 132.1 (55.6) | 2.94 | 118.9 (2.1) |
| 79.0/21.0 | 40.1 (276) | 169.2 (1167) | 140.9 (60.5) | 3.06 | 147.0 (2.6) |
| 46.1/53.9 | 46.5 (321) | 184.9 (1275) | 156.6 (69.2) | 3.32 | 183.0 (3.2) |
| 1.0/99.0 | 42.2 (291) | 170.2 (1173) | 182.0 (83.3) | 3.58 | 188.8 (3.3) |
| 218E2/HFC-134a | | | | | |
| 5.0/95.0 | 54.9 (379) | 215.4 (1485) | 169.0 (76.1) | 3.40 | 222.7 (3.9) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 95.0/5.0 | 33.6 (232) | 148.2 (1022) | 132.0 (55.6) | 2.94 | 120.7 (2.1) |
| 72/28 | 45.8 (346) | 189.8 (1309) | 143.0 (61.7) | 3.07 | 166.1 (2.9) |
| 24.7/75.3 | 55.8 (385) | 217.6 (1501) | 161.1 (71.7) | 3.30 | 215.6 (3.8) |
| 1/99 | 54.6 (376) | 214.3 (1478) | 170.6 (77.0) | 3.42 | 223.5 (3.9) |
| 218E2/HFC-143 | | | | | |
| 5.0/95.0 | 16.6 (114) | 174.7 (515) | 190.6 (88.1) | 3.82 | 187.7 (1.5) |
| 95.0/5.0 | 30.2 (208) | 133.2 (918) | 131.8 (55.4) | 2.99 | 111.2 (2.0) |
| 218E2/HFC-143a | | | | | |
| 5.0/95.0* | 108.9 (751) | 363.2 (1067) | 215.4 (56.8) | 3.18 | 379.1 (2.3) |
| 95.0/5.0 | 35.3 (243) | 154.7 (1344) | 134.3 (93.8) | 3.02 | 129.2 (3.9) |
| * = subcool temperature of 20.0° F. | | | | | |
| 218E2/HFC-152a | | | | | |
| 5.0/95.0 | 51.3 (354) | 194.9 (1344) | 200.9 (93.8) | 3.59 | 223.9 (3.9) |
| 95.0/5.0 | 35.1 (242) | 153.1 (1056) | 134.5 (56.9) | 2.99 | 127.5 (2.2) |
| 81/19 | 45.1 (311) | 183.9 (1268) | 146.7 (63.7) | 3.16 | 167.7 (3.0) |
| 51.0/49.0 | 53.4 (368) | 203.8 (1406) | 168.7 (75.9) | 3.38 | 210.6 (3.7) |
| 1/99 | 50.9 (351) | 193.6 (1335) | 203.6 (95.3) | 3.60 | 223.5 (3.9) |
| 218E2/HFC-161 | | | | | |
| 5.0/95.0 | 80.2 (553) | 281.3 (1940) | 199.0 (92.8) | 3.48 | 315.9 (5.6) |
| 95.0/5.0 | 39.9 (275) | 173.8 (1198) | 137.8 (58.8) | 3.05 | 147.2 (2.6) |
| 78/22 | 63.2 (436) | 246.7 (1702) | 156.1 (68.9) | 3.11 | 224.5 (4.0) |
| 46.4/53.6 | 81.0 (558) | 285.4 (1969) | 175.4 (80.2) | 3.30 | 293.3 (5.2) |
| 1/99 | 79.9 (551) | 280.0 (1932) | 200.8 (93.8) | 3.49 | 316.7 (5.6) |
| 218E2/HFC-227ca | | | | | |
| 5.0/95.0 | 36.0 (248) | 142.5 (983) | 142.0 (61.1) | 3.19 | 133.1 (2.3) |
| 95.0/5.0* | 30.6 (211) | 135.4 (934) | 134.3 (56.8) | 2.85 | 107.3 (1.9) |
| * = return gas temperature = 70.0° F.. | | | | | |
| 218E2/HFC-227ea | | | | | |
| 5.0/95.0 | 35.2 (243) | 139.7 (963) | 142.0 (61.1) | 3.20 | 131.1 (2.3) |
| 95.0/5.0* | 30.5 (210) | 135.2 (932) | 134.3 (56.8) | 2.85 | 107.2 (1.9) |
| * = return gas temperature = 70.0° F.. | | | | | |
| 218E2/HFC-236ca | | | | | |
| 5.0/95.0 | 13.4 (92) | 63.6 (439) | 150.1 (65.6) | 3.60 | 66.5 (1.2) |
| 95.0/5.0 | 28.2 (194) | 128.0 (883) | 129.9 (54.4) | 2.96 | 104.5 (1.8) |
| 218E2/HFC-236cb | | | | | |
| 5.0/95.0 | 18.5 (128) | 81.1 (559) | 144.6 (62.6) | 3.49 | 83.1 (1.5) |
| 95.0/5.0 | 28.9 (215) | 129.8 (895) | 129.6 (54.2) | 2.94 | 105.6 (1.9) |
| 218E2/HFC-236fa | | | | | |
| 5.0/95.0 | 20.4 (141) | 88.0 (607) | 144.3 (62.4) | 3.45 | 89.4 (1.6) |
| 95.0/5.0* | 29.3 (202) | 130.8 (902) | 134.4 (56.9) | 2.89 | 105.0 (1.8) |
| 99/1 | 30.1 (207) | 134.3 (926) | 133.7 (56.5) | 2.84 | 105.8 (1.9) |
| 89.8/10.2 | 28.3 (195) | 126.7 (874) | 130.5 (54.7) | 2.98 | 105.1 (1.8) |
| 1/99 | 20.3 (140) | 87.0 (600) | 145.0 (62.8) | 3.47 | 89.0 (1.6) |
| * = return gas temperature = 70.0° F.. | | | | | |
| 218E2/HFC-245ca | | | | | |
| 5.0/95.0 | 7.4 (51) | 38.9 (268) | 156.6 (69.2) | 3.77 | 41.7 (0.7) |
| 95.0/5.0 | 26.2 (181) | 122.8 (847) | 130.9 (54.9) | 3.00 | 100.9 (1.8) |
| 218E2/HFC-245cb | | | | | |
| 5.0/95.0 | 35.9 (248) | 137.1 (945) | 138.5 (59.2) | 3.29 | 135.0 (2.4) |
| 95.0/5.0* | 30.7 (212) | 135.4 (934) | 134.2 (56.8) | 2.87 | 108.0 (1.9) |
| * = return gas temperature of 70.0° F. | | | | | |
| 218E2/HFC-245ea | | | | | |
| 5.0/95.0 | 7.4 (51) | 39.7 (274) | 161.2 (71.8) | 3.81 | 42.8 (0.8) |
| 95.0/5.0 | 26.6 (183) | 123.9 (854) | 130.9 (54.9) | 2.99 | 102.0 (1.8) |
| 218E2/HFC-245fa | | | | | |
| 5.0/95.0 | 11.5 (79) | 55.8 (385) | 153.6 (67.6) | 3.67 | 59.4 (1.0) |
| 95.0/5.0 | 27.7 (191) | 126.6 (873) | 130.3 (54.6) | 2.97 | 103.7 (1.8) |
| 218E2/HFC-254ca | | | | | |
| 5.0/95.0 | 7.2 (50) | 37.4 (258) | 159.9 (71.1) | 3.81 | 40.8 (0.7) |
| 95.0/5.0 | 25.9 (179) | 121.4 (837) | 131.1 (55.1) | 3.02 | 100.6 (1.8) |
| 218E2/HFC-254cb | | | | | |
| 5.0/95.0 | 18.9 (130) | 81.1 (897) | 153.4 (54.6) | 3.61 | 87.7 (1.9) |
| 95.0/5.0 | 29.1 (201) | 130.1 (569) | 130.2 (67.4) | 2.96 | 106.5 (1.6) |
| 218E2/HFC-254eb | | | | | |
| 5.0/95.0 | 19.2 (132) | 82.5 (569) | 153.3 (67.4) | 3.60 | 88.9 (1.6) |
| 95.0/5.0 | 29.1 (201) | 130.0 (896) | 130.1 (54.5) | 2.96 | 106.8 (1.9) |
| 218E2/HFC-263ca | | | | | |
| 5.0/95.0 | 9.7 (67) | 46.6 (321) | 161.0 (71.7) | 3.78 | 52.1 (0.9) |
| 95.0/5.0 | 26.9 (185) | 123.1 (849) | 130.9 (54.9) | 3.03 | 103.2 (1.8) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 218E2/HFC-263fb | | | | | |
| 5.0/95.0 | 30.6 (211) | 120.7 (832) | 153.8 (67.7) | 3.52 | 129.1 (2.3) |
| 95.0/5.0 | 30.5 (210) | 134.3 (926) | 130.4 (54.7) | 2.95 | 110.3 (1.9) |
| 99/1 | 30.6 (211) | 120.1 (828) | 154.0 (67.8) | 3.53 | 129.4 (2.3) |
| 60.5/39.5 | 30.8 (212.5) | 128.0 (883) | 140.5 (60.3) | 3.28 | 122.5 (2.2) |
| 1/99 | 30.6 (211) | 120.2 (829) | 154.6 (68.1) | 3.53 | 129.4 (2.3) |
| 218E2/HFC-272ca | | | | | |
| 5.0/95.0 | 19.3 (133) | 79.8 (550) | 159.6 (70.9) | 3.69 | 90.2 (1.6) |
| 95.0/5.0 | 29.1 (201) | 129.1 (890) | 130.8 (54.9) | 3.00 | 107.9 (1.9) |
| 218E2/HFC-272ea | | | | | |
| 5.0/95.0 | 11.2 (77) | 52.9 (365) | 169.5 (76.4) | 3.82 | 60.2 (1.1) |
| 95.0/5.0 | 27.9 (192) | 125.7 (867) | 131.3 (55.2) | 3.02 | 106.0 (1.9) |
| 218E2/HFC-272fb | | | | | |
| 5.0/95.0 | 14.4 (99) | 65.4 (451) | 167.3 (75.2) | 3.77 | 34.2 (1.3) |
| 95.0/5.0 | 29.0 (200) | 129.1 (890) | 131.0 (55.0) | 3.01 | 108.1 (1.9) |
| 218E2/HFC-281ea | | | | | |
| 5.0/95.0 | 26.8 (185) | 105.9 (730) | 166.8 (74.9) | 3.69 | 121.5 (2.1) |
| 95.0/5.0 | 31.0 (214) | 135.2 (932) | 131.9 (55.5) | 2.99 | 113.5 (2.0) |
| 218E2/HFC-281fa | | | | | |
| 5.0/95.0 | 21.0 (145) | 87.9 (606) | 168.3 (75.7) | 3.72 | 100.4 (1.8) |
| 95.0/5.0 | 30.1 (208) | 132.3 (912) | 131.9 (55.5) | 3.00 | 111.4 (2.0) |
| C-225eEαβ/HFC-143 | | | | | |
| 55.9/44.1 | 16.9 (117) | 75.2 (518) | 167.9 (75.5) | 3.73 | 84.6 (1.5) |
| 5.0/95.0 | 16.1 (111) | 72.6 (501) | 191.7 (88.7) | 3.80 | 84.8 (1.5) |
| 95.0/5.0 | 16.8 (116) | 74.4 (513) | 148.8 (64.9) | 3.60 | 79.6 (1.4) |
| C-225eEαβ/HFC-236cb | | | | | |
| 16.7/83.3 | 18.4 (127) | 80.2 (553) | 145.4 (63.0) | 3.51 | 83.1 (1.5) |
| 5.0/95.0 | 18.3 (126) | 79.9 (551) | 145.5 (63.1) | 3.50 | 82.5 (1.5) |
| 95.0/5.0 | 16.9 (117) | 74.8 (516) | 146.3 (63.5) | 3.57 | 79.0 (1.4) |
| C-225eEαβ/HFC-236ea | | | | | |
| 91.5/8.5 | 16.6 (114) | 73.9 (510) | 146.6 (63.7) | 3.58 | 78.2 (1.4) |
| 5.0/95.0 | 15.4 (106) | 70.5 (486) | 150.2 (65.7) | 3.57 | 73.7 (1.3) |
| 95.0/5.0 | 16.7 (115) | 73.9 (510) | 146.4 (63.6) | 3.58 | 78.3 (1.4) |
| C-225eEαβ/HFC-245cb | | | | | |
| 22.4/77.6 | 30.8 (212) | 122.2 (843) | 140.9 (60.5) | 3.38 | 123.6 (2.2) |
| 5.0/95.0 | 34.9 (241) | 133.9 (923) | 139.4 (59.7) | 3.32 | 133.2 (2.3) |
| 95.0/5.0 | 17.5 (121) | 76.9 (530) | 145.9 (63.3) | 3.59 | 81.7 (1.4) |
| 227caEαβ/HFC-32* | | | | | |
| 61/39 | 55.4 (382) | 257.2 (1774) | 149.6 (65.3) | 3.05 | 230.4 (4.1) |
| 17.9/82.1 | 84.3 (581) | 312.6 (2156) | 158.1 (70.1) | 3.43 | 342.4 (6.0) |
| 1/99 | 79.4 (547.9) | 511.6 (3530) | 225.3 (107.4) | 1.90 | 262.3 (4.6) |

*Condenser temp. 90° F., Evaporator temp. 10° F., and Return gas Temp. 30° F.

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 227caEαβ/HFC-125 | | | | | |
| 5.0/95.0 | 111.8 (771) | 384.0 (2648) | 170.5 (76.9) | 2.75 | 318.0 (5.6) |
| 95.0/5.0 | 26.0 (179) | 113.8 (785) | 135.3 (57.4) | 3.28 | 106.6 (1.9) |
| 227caEαβ/HFC-134 | | | | | |
| 5.0/95.0 | 42.4 (292) | 170.3 (1174) | 179.7 (82.1) | 3.57 | 188.0 (3.3) |
| 95.0/5.0 | 24.7 (170) | 109.4 (754) | 136.1 (57.8) | 3.25 | 101.5 (1.8) |
| 227caEαβ/HFC-134a | | | | | |
| 5.0/95.0 | 54.3 (374) | 212.9 (1468) | 169.2 (76.2) | 3.41 | 220.8 (3.9) |
| 95.0/5.0 | 25.1 (173) | 111.2 (767) | 135.7 (57.6) | 3.25 | 103.0 (1.8) |
| 227caEαβ/HFC-143 | | | | | |
| 5.0/95.0 | 16.4 (113) | 73.8 (509) | 190.7 (88.2) | 3.10 | 86.4 (1.5) |
| 95.0/5.0 | 22.6 (156) | 101.0 (696) | 136.4 (58.0) | 3.27 | 94.5 (1.7) |
| 227caEαβ/HFC-143a | | | | | |
| 5.0/95.0 | 107.2 (739) | 359.0 (2475) | 216.0 (102.2) | 2.30 | 270.8 (4.8) |
| 95.0/5.0 | 27.1 (187) | 117.8 (812) | 137.6 (58.7) | 3.31 | 111.8 (2.0) |
| 227caEαβ/HFC-152a | | | | | |
| 5.0/95.0 | 50.9 (351) | 193.4 (1333) | 201.1 (93.9) | 3.60 | 222.4 (3.9) |
| 95.0/5.0 | 26.4 (182) | 115.4 (796) | 138.0 (58.9) | 3.28 | 108.5 (1.9) |
| 227caEαβ/HFC-161 | | | | | |
| 5.0/95.0 | 79.7 (550) | 279.4 (1926) | 199.0 (92.8) | 3.48 | 314.7 (5.5) |
| 95.0/5.0 | 30.8 (212) | 131.4 (906) | 139.8 (59.9) | 3.34 | 126.1 (2.2) |
| 227caEαβ/HFC-227ca | | | | | |
| 5.0/95.0 | 35.5 (245) | 141.0 (972) | 142.5 (61.4) | 3.19 | 131.7 (2.3) |
| 95.0/5.0 | 22.8 (157) | 102.7 (708) | 134.2 (56.8) | 3.20 | 93.1 (1.6) |
| 227caEαβ/HFC-227ea | | | | | |
| 5.0/95.0 | 34.7 (239) | 138.3 (954) | 142.4 (61.3) | 3.20 | 129.8 (2.3) |
| 95.0/5.0 | 22.8 (157) | 102.6 (707) | 134.8 (57.1) | 3.20 | 93.1 (1.6) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 227caEαβ/HFC-236ca | | | | | |
| 5.0/95.0 | 13.3 (92) | 62.9 (433) | 150.2 (65.7) | 3.60 | 65.8 (1.2) |
| 95.0/5.0 | 21.5 (148) | 97.3 (671) | 134.3 (56.8) | 3.24 | 89.6 (1.6) |
| 227caEαβ/HFC-236cb | | | | | |
| 5.0/95.0 | 18.4 (127) | 80.3 (554) | 144.9 (62.7) | 3.49 | 82.4 (1.4) |
| 95.0/5.0 | 21.9 (151) | 99.0 (682) | 134.2 (56.8 | 3.22 | 90.7 (1.6) |
| 227caEαβ/HFC-236fa | | | | | |
| 5.0/95.0 | 20.1 (140) | 87.1 (600) | 144.5 (62.5) | 3.46 | 88.9 (1.6) |
| 95.0/5.0 | 22.1 (152) | 99.4 (685) | 134.1 (56.7) | 3.23 | 91.2 (1.6) |
| 227caEαβ/HFC-245ca | | | | | |
| 5.0/95.0 | 7.4 (51) | 38.4 (265) | 156.6 (69.1) | 3.76 | 41.0 (0.7) |
| 95.0/5.0 | 20.4 (141) | 94.1 (649) | 134.9 (57.2) | 3.25 | 86.5 (1.5) |
| 227caEαβ/HFC-245cb | | | | | |
| 5.0/95.0 | 35.4 (244) | 135.7 (936) | 139.0 (59.4) | 3.28 | 133.4 (2.3) |
| 95.0/5.0 | 22.9 (158) | 102.8 (709) | 134.1 (56.7) | 3.20 | 93.5 (1.6) |
| 1/99 | 36.0 (248.4) | 136.9 (944) | 139.0 (59.4) | 3.30 | 135.6 (2.4) |
| 8.1/91.9 | 35.0 (241.5) | 134.7 (929) | 138.8 (59.3) | 3.29 | 132.7 (2.3) |
| 82/18 | 24.8 (171) | 107.8 (1743) | 134.8 (57.1) | 3.25 | 100.6 (1.8) |
| 227caEαβ/HFC-245ea | | | | | |
| 5.0/95.0 | 7.4 (51) | 39.1 (269) | 161.3 (71.8) | 3.78 | 41.9 (0.7) |
| 95.0/5.0 | 20.6 (142) | 94.7 (653) | 135.1 (57.3) | 3.24 | 87.0 (1.5) |
| 227caEαβ/HFC-245fa | | | | | |
| 5.0/95.0 | 11.5 (79) | 54.7 (377) | 153.2 (67.3) | 3.68 | 58.7 (1.0) |
| 95.0/5.0 | 21.5 (148) | 96.4 (664) | 134.0 (56.7) | 3.29 | 90.2 (1.6) |
| 227caEαβ/HFC-254ca | | | | | |
| 5.0/95.0 | 7.1 (49) | 36.9 (254) | 160.0 (71.1) | 3.78 | 40.0 (0.7) |
| 95.0/5.0 | 20.3 (140) | 93.3 (643) | 135.1 (57.3) | 3.26 | 86.2 (1.5) |
| 227caEαβ/HFC-254cb | | | | | |
| 5.0/95.0 | 18.7 (129) | 80.5 (555) | 153.6 (67.6) | 3.61 | 87.0 (1.5) |
| 95.0/5.0 | 22.0 (152) | 98.9 (682) | 134.7 (57.1 | 3.24 | 91.3 (1.6) |
| 227caEαβ/HFC-254eb | | | | | |
| 5.0/95.0 | 19.0 (131) | 81.7 (563) | 153.5 (67.5) | 3.60 | 88.3 (1.6) |
| 95.0/5.0 | 22.0 (152) | 99.0 (683) | 134.7 (57.1) | 3.24 | 91.4 (1.6) |
| 227caEαβ/HFC-263ca | | | | | |
| 5.0/95.0 | 9.7 (67) | 46.2 (318) | 161.1 (71.7) | 3.77 | 51.4 (0.9) |
| 95.0/5.0 | 20.8 (143) | 94.5 (651) | 135.1 (57.3) | 3.27 | 88.0 (1.5) |
| 227caEαβ/HFC-263fb | | | | | |
| 5.0/95.0 | 30.3 (209) | 119.6 (825) | 154.1 (67.8) | 3.52 | 128.1 (2.3) |
| 95.0/5.0 | 22.9 (158) | 1023 (706) | 135.0 (57.2) | 3.23 | 94.2 (1.7) |
| 227caEαβ/HFC-272ca | | | | | |
| 5.0/95.0 | 19.2 (132) | 793 (54.7) | 159.8 (71.0) | 3.69 | 89.6 (1.6) |
| 95.0/5.0 | 22.2 (153) | 98.9 (682) | 135.4 (57.4) | 3.26 | 92.4 (1.6) |
| 99/1 | 22.3 (153) | 100.2 (691) | 133.8 (56.6) | 3.23 | 91.8 (1.6) |
| 94.3/5.7 | 22.1 (152) | 98.5 (679) | 135.5 (57.5) | 3.28 | 92.5 (1.6) |
| 1/99 | 19.1 (131) | 78.6 (542) | 160.4 (71.3) | 3.70 | 89.4 (1.6) |
| 227caEαβ/HFC-272ea | | | | | |
| 5.0/95.0 | 11.1 (76) | 51.5 (355) | 168.6 (75.9) | 3.84 | 59.2 (1.0) |
| 95.0/5.0 | 21.4 (148) | 96.5 (665) | 135.7 (57.6) | 3.28 | 90.4 (1.6) |
| 227caEαβ/HFC-272fb | | | | | |
| 5.0/95.0 | 14.3 (98) | 64.6 (445) | 167.4 (75.2) | 3.76 | 73.2 (13) |
| 95.0/5.0 | 21.9 (151) | 98.5 (679) | 135.7 (51.6) | 3.27 | 91.8 (1.6) |
| 227caEαβ/HFC-281ea | | | | | |
| 5.0/95.0 | 26.6 (184) | 105.3 (726) | 167.0 (75.0) | 3.69 | 120.7 (2.1) |
| 95.0/5.0 | 23.4 (162) | 103.3 (712) | 136.3 (57.9) | 3.28 | 97.2 (1.7) |
| 99/1 | 22.5 (155) | 101.2 (698) | 134.1 (56.7) | 3.22 | 92.6 (1.6) |
| 31.5/68.5 | 26.8 (184) | 107.4 (741) | 160.6 (71.4) | 3.63 | 119.7 (2.1) |
| 1/99 | 26.6 (183) | 104.9 (723) | 167.8 (75.4) | 3.70 | 120.7 (2.1) |
| 227caEαβ/HFC-281fa | | | | | |
| 5.0/95.0 | 20.8 (144) | 87.5 (604) | 168.6 (75.9) | 3.71 | 99.6 (1.8) |
| 95.0/5.0 | 22.8 (157) | 101.4 (699) | 136.3 (57.9) | 3.28 | 952 (1.7) |
| 99/1 | 22.4 (154) | 100.7 (694) | 134.0 (56.7) | 3.20 | 92.4 (1.6) |
| 843/15.7 | 23.4 (161) | 101.3 (699) | 141.8 (61.0) | 3.39 | 100.2 (1.8) |
| 1/99 | 20.7 (142) | 86.8 (598) | 169.3 (763) | 3.72 | 99.4 (1.7) |
| 227caEβλ/HFC-32 | | | | | |
| 5.0/95.0 | 152.1 (1049) | 517.0 (3565) | 198.4 (92.4) | 2.92 | 483.9 (8.5) |
| 95.0/5.0* | 42.9 (296) | 190.1 (1311) | 152.0 (66.7) | 3.77 | 200.3 (3.5) |
| 67/33 | 98.9 (682) | 360.0 (2484) | 169.6 (76.4) | 3.35 | 365.6 (6.4) |
| 28.4/71.6* | 159.9 (1103) | 477.2 (3292) | 176.6 (80.3) | 3.61 | 550.1 (9.7) |
| 1/99 | 150.1 (1035) | 512.2 (3534) | 199.9 (93.3) | 3.16 | 519.7 (9.1) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| * = subcool temperature of 20.0° F. | | | | | |
| 227caEβλ/HFC-125 | | | | | |
| 5.0/95.0* | 59.7 (412) | 226.0 (1558) | 132.8 (56.0) | 3.27 | 226.3 (4.0) |
| 95.0/5.0 | 30.3 (209) | 130.7 (901) | 141.8 (61.0) | 3.31 | 124.1 (2.2) |
| * = evaporator temperature of 10.0° F., condenser temperature of 90.0° F., and return gas temperature of 30.0° F. | | | | | |
| 227caEβλ/HFC-134 | | | | | |
| 95.0/5.0 | 29.2 (201) | 126.5 (872) | 142.3 (61.3) | 3.27 | 118.7 (2.1) |
| 76.0/24.0 | 37.1 (256) | 152.2 (1049) | 149.9 (65.5) | 3.38 | 151.3 (2.7) |
| 34.8/65.2 | 44.2 (305) | 175.3 (1209) | 166.9 (74.9) | 3.46 | 184.2 (3.2) |
| 1.0/99.0 | 42.2 (291) | 170.0 (1172) | 182.0 (83.3) | 3.59 | 188.7 (3.3) |
| 227caEβλ/HFC-134a | | | | | |
| 5.0/95.0 | 54.7 (377) | 214.0 (1475) | 169.5 (76.4) | 3.41 | 222.2 (3.9) |
| 95.0/5.0 | 29.6 (204) | 128.5 (886) | 142.0 (61.1) | 3.27 | 120.7 (2.1) |
| 67/33 | 42.7 (294) | 175.0 (1207) | 152.2 (66.8) | 3.31 | 169.4 (3.0) |
| 1.9/98.1 | 54.6 (376) | 214.0 (1476) | 170.3 (76.8) | 3.43 | 223.2 (3.9) |
| 1/99 | 54.6 (376) | 214.0)1476) | 170.7 (77.1) | 3.43 | 223.4 (3.9) |
| 227caEβλ/HFC-143 | | | | | |
| 5.0/95.0 | 16.5 (114) | 74.4 (513) | 191.4 (88.6) | 3.81 | 87.2 (1.5) |
| 95.0/5.0 | 26.9 (185) | 116.6 (804) | 142.2 (61.2) | 3.29 | 110.9 (2.0) |
| 227caEβλ/HFC-143a | | | | | |
| 5.0/95.0* | 107.8 (743) | 360.6 (2486) | 216.6 (102.6) | 3.18 | 377.2 (6.6) |
| 95.0/5.0 | 31.3 (216) | 134.3 (926) | 144.3 (62.4) | 3.35 | 129.6 (2.3) |
| * = subcool temperature of 20.0° F. | | | | | |
| 227caEβλ/HFC-152a | | | | | |
| 5.0/95.0 | 51.0 (352) | 194.2 (1339) | 201.5 (94.2) | 3.59 | 223.1 (3.9) |
| 95.0/5.0 | 30.9 (213) | 132.6 (914) | 144.4 (62.4) | 3.31 | 126.6 (2.2) |
| 78/22 | 41.4 (285) | 167.0 (1152) | 157.6 (69.8) | 3.39 | 168.3 (3.0) |
| 38.3/61.7 | 51.4 (354) | 195.1 (1346) | 182.2 (83.4) | 3.50 | 213.6 (3.8) |
| 1/99 | 50.8 (350) | 193.4 (1334) | 203.6 (95.3) | 3.6 | 223.5 (3.9) |
| 227caEβλ/HFC-161 | | | | | |
| 5.0/95.0 | 80.0 (552) | 280.1 (1931) | 199.3 (92.9) | 3.48 | 315.6 (5.6) |
| 95.0/5.0 | 35.1 (242) | 149.6 (1031) | 146.9 (63.8) | 3.39 | 146.2 (2.6) |
| 72/28 | 60.9 (420) | 233.8 (1613) | 168.0 (75.6) | 3.32 | 234.0 (4.1) |
| 34.4/65.6 | 54.1 (373) | 247.5 (1707) | 180.6 (82.6) | 2.73 | 194.7 (3.4) |
| 1/99 | 79.8 (550) | 279.8 (1930) | 200.8 (93.8) | 3.49 | 316.7 (5.6) |
| 227caEβλ/HFC-227ca | | | | | |
| 5.0/95.0 | 35.8 (247) | 141.8 (978) | 142.6 (61.4) | 3.20 | 133.1 (2.3) |
| 95.0/5.0 | 27.2 (188) | 118.5 (817) | 139.8 (59.9) | 3.23 | 109.8 (1.9) |
| 227caEβλ/HFC-227ea | | | | | |
| 5.0/95.0 | 35.0 (241) | 139.0 (958) | 142.6 (61.4) | 3.21 | 131.0 (2.3) |
| 95.0/5.0 | 27.2 (188) | 118.3 (816) | 139.7 (59.8) | 3.23 | 109.7 (1.9) |
| 227caEβλ/HFC-236ca | | | | | |
| 5.0/95.0 | 13.4 (92) | 63.9 (441) | 150.7 (65.9) | 3.60 | 66.4 (1.2) |
| 95.0/5.0 | 25.5 (176) | 112.6 (776) | 140.3 (60.2) | 3.27 | 105.5 (1.9) |
| 227caEβλ/HFC-236cb | | | | | |
| 5.0/95.0 | 18.5 (129) | 80.9 (578) | 145.3 (62.9) | 3.49 | 82.9 (1.5) |
| 95.0/5.0 | 26.1 (180) | 114.3 (788) | 139.9 (59.9) | 3.25 | 106.7 (1.9) |
| 227caEβλ/HFC-236fa | | | | | |
| 5.0/95.0 | 20.4 (141) | 87.6 (604) | 144.9 (62.7) | 3.46 | 89.5 (1.6) |
| 95.0/5.0 | 26.3 (181) | 114.9 (792) | 139.8 (59.9) | 3.26 | 107.3 (1.9) |
| 227caEβλ/HFC-245ca | | | | | |
| 5.0/95.0 | 7.4 (51) | 38.8 (268) | 157.1 (69.5) | 3.78 | 41.7 (0.7) |
| 95.0/5.0 | 24.0 (165) | 108.6 (749) | 141.2 (60.7) | 3.29 | 102.0 (1.8) |
| 227caEβλ/HFC-245cb | | | | | |
| 5.0/95.0 | 35.7 (246) | 136.4 (940) | 139.1 (59.5) | 3.30 | 134.7 (2.4) |
| 95.0/5.0 | 27.3 (188) | 118.4 (816) | 139.6 (59.8) | 3.24 | 110.1 (1.9) |
| 227caEβλ/HFC-245ea | | | | | |
| 5.0/95.0 | 7.4 (51) | 39.6 (273) | 161.8 (72.1) | 3.81 | 42.7 (0.8) |
| 95.0/5.0 | 24.3 (168) | 109.5 (755) | 141.2 (60.7) | 3.29 | 102.8 (1.8) |
| 227caEβλ/HFC-245fa | | | | | |
| 5.0/95.0 | 11.5 (79) | 55.7 (384) | 153.2 (67.3) | 3.68 | 59.5 (1.0) |
| 95.0/5.0 | 25.2 (174) | 111.5 (769) | 139.5 (59.7) | 3.29 | 105.1 (1.8) |
| 227caEβλ/HFC-254ca | | | | | |
| 5.0/95.0 | 7.2 (50) | 37.3 (257) | 160.5 (71.4) | 3.81 | 40.6 (0.7) |
| 95.0/5.0 | 23.8 (164) | 107.7 (743) | 141.4 (60.8) | 3.31 | 101.6 (1.8) |
| 227caEβλ/HFC-254cb | | | | | |
| 5.0/95.0 | 18.8 (130) | 81.0 (558) | 153.9 (67.7) | 3.61 | 87.7 (1.5) |
| 95.0/5.0 | 26.1 (180) | 114.1 (787) | 142.4 (60.2) | 3.27 | 107.4 (1.9) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 227caEβλ/HFC-254eb | | | | | |
| 5.0/95.0 | 19.2 (132) | 82.2 (567) | 153.8 (67.7) | 3.61 | 89.0 (1.6) |
| 95.0/5.0 | 26.2 (181) | 114.4 (789) | 140.3 (60.2) | 3.28 | 107.8 (1.9) |
| 227caEβλ/HFC-263ca | | | | | |
| 5.0/95.0 | 9.7 (67) | 46.5 (321) | 161.5 (71.9) | 3.78 | 52.0 (0.9) |
| 95.0/5.0 | 24.5 (169) | 109.1 (752) | 141.2 (60.7) | 3.31 | 103.4 (1.8) |
| 227caEβλ/HFC-263fb | | | | | |
| 5.0/95.0 | 30.5 (210) | 120.1 (828) | 154.3 (67.9) | 3.52 | 128.9 (2.3) |
| 95.0/5.0 | 27.2 (188) | 117.8 (812) | 140.6 (60.3) | 3.26 | 110.6 (1.9) |
| 99/1 | 26.9 (185) | 117.3 (809) | 139.7 (59.8) | 3.24 | 109.1 (1.9) |
| 32.9/67.1 | 29.9 (206) | 120.2 (829) | 150.9 (66.1) | 3.47 | 125.4 (2.2) |
| 1/99 | 30.6 (211) | 120.1 (828) | 154.7 (68.2) | 3.53 | 129.3 (2.3) |
| 227caEβλ/HFC-272ca | | | | | |
| 5.0/95.0 | 19.3 (133) | 79.5 (548) | 159.9 (71.1) | 3.70 | 90.2 (1.6) |
| 95.0/5.0 | 26.2 (181) | 113.7 (784) | 140.9 (60.5) | 3.30 | 108.2 (1.9) |
| 99/1 | 26.7 (184) | 116.6 (204) | 139.8 (15.9) | 3.25 | 108.6 (1.9) |
| 89.0/11.0 | 25.5 (176) | 109.7 (756) | 142.6 (61.4) | 3.36 | 107.3 (1.9) |
| 1/99 | 19.1 (131) | 78.7 (543) | 160.5 (71.4) | 3.70 | 89.5 (1.6) |
| 227caEβλ/HFC-272ea | | | | | |
| 5.0/95.0 | 11.1 (77) | 52.7 (363) | 169.9 (76.6) | 3.82 | 60.0 (1.1) |
| 95.0/5.0 | 25.3 (174) | 111.1 (766) | 141.4 (60.8) | 3.32 | 106.1 (1.9) |
| 227caEβλ/HFC-272fb | | | | | |
| 5.0/95.0 | 14.4 (99) | 65.1 (449) | 167.8 (75.4) | 3.77 | 73.9 (1.3) |
| 95.0/5.0 | 26.0 (179) | 113.4 (782) | 141.3 (60.7) | 3.30 | 107.9 (1.9) |
| 227caEβλ/HFC-281ea | | | | | |
| 5.0/95.0 | 26.7 (184) | 105.7 (729) | 167.3 (752) | 3.69 | 121.1 (2.1) |
| 95.0/5.0 | 27.7 (191) | 118.8 (819) | 142.0 (61.1) | 3.28 | 113.0 (2.0) |
| 99/1 | 27.0 (186) | 117.6 (811) | 140.0 (60.0) | 3.25 | 109.6 (1.9) |
| 73.1/26.9 | 28.9 (199) | 118.6 (818) | 150.6 (65.9) | 3.46 | 122.7 (2.2) |
| 1/99 | 26.6 (183) | 105.0 (724) | 167.9 (75.5) | 3.69 | 120.8 (2.1) |
| 227caEβλ/HFC-281fa | | | | | |
| 5.0/95.0 | 20.9 (144) | 87.8 (605) | 168.7 (75.9) | 3.72 | 100.2 (1.8) |
| 95.0/5.0 | 27.0 (186) | 116.5 (803) | 141.9 (61.1) | 3.30 | 111.1 (2.0) |
| 99/1 | 26.9 (185) | 117.2 (808) | 140.0 (60.0) | 3.25 | 109.3 (1.9) |
| 85.9/14.1 | 26.8 (184) | 113.6 (783) | 145.9 (63.2) | 3.40 | 113.3 (2.0) |
| 1/99 | 20.7 (142) | 86.9 (599) | 169.4 (76.3) | 3.72 | 99.4 (1.7) |
| 227eaE/HFC-32 | | | | | |
| 5.0/95.0 | 152.1 (1049) | 516.9 (3564) | 198.3 (92.4) | 2.93 | 484.1 (8.5) |
| 95.0/5.0* | 45.3 (312) | 196.1 (1352) | 151.3 (66.3) | 3.77 | 208.1 (3.7) |
| 68/32** | 51.2 (353) | 240.8 (1661) | 144.4 (62.4) | 3.26 | 228.0 (4.0) |
| 30.0/70.0 | 160.9 (1110) | 479.0 (3305) | 175.8 (79.9) | 3.60 | 549.5 (9.7) |
| 1/99 | 150.1 (1035) | 512.3 (3534) | 199.8 (93.2) | 3.16 | 519.7 (9.1) |

*Subcool temp. 20.0° F
**Subcool temp. 20° F. Return gas temp. 3° F.

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 227eaE/HFC-125 | | | | | |
| 5.0/95.0* | 60.0 (414) | 226.5 (1562) | 132.6 (55.9) | 3.27 | 227.1 (4.0) |
| 5.0/5.0 | 31.8 (219) | 135.8 (936) | 141.8 (61.0) | 3.29 | 128.0 (2.3) |

* = evaporator temperature of 10.0° F., condenser temperature of 90.0° F., and return gas temperature of 30.0° F.

| | | | | | |
|---|---|---|---|---|---|
| 227eaE/HFC-134 | | | | | |
| 95.0/5.0 | 30.7 (211) | 131.9 (909) | 142.3 (61.3) | 3.24 | 122.9 (2.2) |
| 78.0/22.0 | 37.2 (256) | 154.6 (1066) | 149.9 (65.5) | 3.29 | 148.8 (2.6) |
| 38.2/61.8 | 44.8 (309) | 177.0 (1220) | 165.5 (74.2) | 3.44 | 184.5 (3.2) |
| 1.0/99.0 | 42.2 (291) | 170.0 (1172) | 182.0 (83.3) | 3.59 | 188.8 (3.3) |
| 227eaE/HFC-134a | | | | | |
| 5.0/95.0 | 54.7 (377) | 214.3 (1478) | 169.5 (76.4) | 3.41 | 222.5 (3.9) |
| 95.0/5.0 | 31.1 (214) | 134.0 (924) | 142.1 (61.2) | 3.24 | 124.6 (2.2) |
| 70/30 | 43.0 (296) | 175.6 (1211) | 151.0 (66.1) | 3.29 | 168.8 (3.0) |
| 9.3/90.7 | 54.8 (378) | 214.3 (1478) | 168.2 (75.7) | 3.40 | 221.1 (3.9) |
| 1/99 | 54.6 (376) | 214.1 (1477) | 170.6 (77.0) | 3.43 | 223.5 (3.9) |
| 227eE/HFC-143 | | | | | |
| 5.0/95.0 | 16.6 (114) | 74.6 (514) | 191.3 (88.5) | 3.81 | 87.4 (1.5) |
| 95.0/5.0 | 28.3 (195) | 121.7 (839) | 142.2 (61.2) | 3.27 | 115.0 (2.0) |
| 227eaE//HFC-143a | | | | | |
| 5.0/95.0* | 108.1 (745) | 361.2 (2490) | 216.5 (102.5) | 3.18 | 377.9 (6.7) |
| 95.0/5.0 | 32.8 (226) | 139.6 (963) | 144.4 (62.4) | 3.32 | 133.4 (2.3) |

* = subcool temperature of 20.0° F.

| | | | | | |
|---|---|---|---|---|---|
| 227eaE/HFC-152a | | | | | |
| 5.0/95.0 | 51.1 (352) | 194.5 (1341) | 201.6 (94.2) | 3.59 | 223.3 (3.9) |

TABLE 4-continued

| Evaporator temperature | 45.0° F. (7.2° C.) |
|---|---|
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 95.0/5.0 | 32.5 (224) | 138.1 (952) | 144.5 (62.5) | 3.28 | 130.8 (2.3) |
| 80/20 | 42.1 (290) | 169.3 (1168) | 156.1 (68.9) | 3.36 | 168.9 (3.0) |
| 42.1/57.9 | 52.1 (359) | 197.3 (1361) | 179.9 (82.2) | 3.48 | 213.7 (3.8) |
| 1/99 | 50.8 (350) | 193.5 (1335) | 203.7 (95.4) | 3.60 | 223.5 (3.9) |
| 227eaE/HFC-161 | | | | | |
| 5.0/95.0 | 80.0 (552) | 280.3 (1933) | 199.3 (92.9) | 3.48 | 315.8 (5.6) |
| 95.0/5.0 | 36.7 (253) | 155.1 (1069) | 146.9 (63.8) | 3.36 | 150.1 (2.6) |
| 73/27 | 61.8 (426) | 236.3 (1630) | 167.1 (75.1) | 3.30 | 235.0 (4.1) |
| 37.5/62.5 | 79.3 (547) | 278.3 (1920) | 185.1 (85.1) | 3.38 | 298.1 (5.2) |
| 1/99 | 79.8 (550) | 279.8 (1930) | 200.8 (93.8) | 3.49 | 316.7 (5.6) |
| 227eaE/HFC-227ca | | | | | |
| 5.0/95.0 | 35.9 (248) | 142.0 (979) | 142.6 (61.4) | 3.20 | 133.3 (2.3) |
| 95.0/5.0 | 28.7 (198) | 123.6 (852) | 139.7 (59.8) | 3.21 | 113.9 (2.0) |
| 227eaE/HFC-227ea | | | | | |
| 5.0/95.0 | 35.1 (242) | 139.1 (959) | 142.6 (61.4) | 3.21 | 131.1 (2.3) |
| 95.0/5.0 | 28.6 (197) | 123.3 (850) | 139.7 (59.8) | 3.21 | 113.7 (2.0) |
| 227eaE/HFC-236ca | | | | | |
| 5.0/95.0 | 13.4 (92) | 63.5 (438) | 150.7 (65.9) | 3.60 | 66.5 (1.2) |
| 95.0/5.0 | 26.7 (184) | 117.4 (809) | 140.3 (60.2) | 3.25 | 109.3 (1.9) |
| 227eaE/HFC236cb | | | | | |
| 5.0/95.0 | 18.5 (128) | 81.0 (558) | 145.2 (62.9) | 3.49 | 83.3 (1.5) |
| 95.0/5.0 | 27.5 (190) | 119.3 (823) | 139.8 (59.9) | 3.24 | 111.0 (2.0) |
| 227eaE/HFC-236fa | | | | | |
| 5.0/95.0 | 20.4 (141) | 87.8 (605) | 144.9 (62.7) | 3.46 | 89.6 (1.6) |
| 95.0/5.0 | 27.6 (190) | 119.9 (827) | 139.8 (59.9) | 3.24 | 111.3 (2.0) |
| 227eaE/HFC-245ca | | | | | |
| 5.0/95.0 | 7.5 (52) | 38.9 (268) | 157.1 (69.5) | 3.78 | 41.9 (0.7) |
| 95.0/5.0 | 25.2 (174) | 113.4 (782) | 141.3 (60.7) | 3.27 | 105.6 (1.9) |
| 227eaE/HFC-245cb | | | | | |
| 5.0/95.0 | 35.8 (247) | 136.6 (942) | 139.0 (59.4) | 3.30 | 134.9 (2.4) |
| 95.0/5.0 | 28.7 (198) | 123.5 (852) | 139.6 (59.8) | 3.22 | 114.2 (2.0) |
| 227eaE/HFC-245ea | | | | | |
| 5.0/95.0 | 7.4 (51) | 39.7 (274) | 161.9 (72.2) | 3.81 | 42.9 (0.8) |
| 95.0/5.0 | 25.6 (177) | 114.3 (788) | 141.2 (60.7) | 3.27 | 106.7 (1.9) |
| 227eaE/HFC-245fa | | | | | |
| 5.0/95.0 | 11.6 (80) | 55.8 (385) | 154.2 (67.9) | 3.67 | 59.6 (1.0) |
| 95.0/5.0 | 26.4 (182) | 116.4 (803) | 140.6 (60.3) | 3.26 | 108.6 (1.9) |
| 227eaE/HFC-254ca | | | | | |
| 5.0/95.0 | 7.2 (50) | 37.4 (258) | 160.4 (71.3) | 3.81 | 40.9 (0.7) |
| 95.0/5.0 | 25.0 (172) | 112.4 (775) | 141.4 (60.8) | 3.28 | 105.3 (1.9) |
| 227eaE/HFC-254cb | | | | | |
| 5.0/95.0 | 18.9 (130) | 81.1 (559) | 153.9 (67.7) | 3.61 | 87.8 (1.5) |
| 95.0/5.0 | 27.5 (190) | 119.4 (823) | 140.5 (60.3) | 3.25 | 111.2 (2.0) |
| 227eaE/HFC-254eb | | | | | |
| 5.0/95.0 | 19.2 (132) | 82.3 (567) | 153.8 (67.7) | 3.61 | 89.1 (1.6) |
| 95.0/5.0 | 27.5 (190) | 119.2 (822) | 140.4 (60.2) | 3.25 | 111.4 (2.0) |
| 227eaE/HFC-263ca | | | | | |
| 5.0/95.0 | 9.8 (68) | 46.7 (322) | 161.5 (71.9) | 3.78 | 52.2 (0.9) |
| 95.0/5.0 | 25.7 (177) | 113.8 (785) | 141.2 (60.7) | 3.29 | 107.3 (1.9) |
| 227eaE/HFC-263fb | | | | | |
| 5.0/95.0 | 30.5 (210) | 120.3 (829) | 154.3 (67.9) | 3.52 | 129.0 (2.3) |
| 95.0/5.0 | 28.6 (197) | 122.7 (846) | 140.6 (60.3) | 3.24 | 114.6 (2.0) |
| 99/1 | 28.4 (194) | 122.7 (846) | 139.7 (59.8) | 3.22 | 113.4 (2.0) |
| 49.3/50.7 | 30.0 (207) | 121.8 (840) | 148.5 (64.7) | 3.42 | 124.4 (2.2) |
| 1/99 | 30.6 (211) | 120.1 (828) | 154.7 (68.2) | 3.53 | 129.3 (2.3) |
| 227eaE/HFC-272ca | | | | | |
| 5.0/95.0 | 19.3 (133) | 79.5 (548) | 159.9 (71.1) | 3.70 | 90.2 (1.6) |
| 95.0/5.0 | 27.4 (189) | 181.1 (814) | 141.0 (60.6) | 3.27 | 111.6 (2.0) |
| 99/1 | 28.2 (194) | 121.8 (840) | 139.9 (59.9) | 3.22 | 112.6 (2.0) |
| 90.7/9.3 | 26.7 (184) | 114.4 (789) | 142.1 (61.2) | 3.33 | 110.8 (2.0) |
| 29/71 | 20.6 (142) | 85.4 (589) | 156.1 (68.9) | 3.66 | 95.0 (1.7) |
| 227eaE/HFC-272ea | | | | | |
| 5.0/95.0 | 11.2 (77) | 52.8 (364) | 169.9 (76.6) | 3.82 | 60.2 (1.0) |
| 95.0/5.0 | 26.6 (183) | 116.1 (800) | 141.6 (60.9) | 3.29 | 109.8 (1.9) |
| 227eaE/HFC-272fb | | | | | |
| 5.0/95.0 | 14.4 (99) | 65.2 (450) | 167.8 (75.4) | 3.77 | 73.9 (1.3) |
| 95.0/5.0 | 27.3 (188) | 118.3 (816) | 141.3 (60.7) | 3.28 | 111.9 (2.0) |
| 227eaE/HFC-281ea | | | | | |
| 5.0/95.0 | 26.7 (184) | 105.8 (729) | 167.3 (75.2) | 3.68 | 121.2 (2.1) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 95.0/5.0 | 29.1 (201) | 123.7 (853) | 141.9 (61.0) | 3.27 | 117.1 (2.1) |
| 99/1 | 28.5 (196) | 123.0 (848) | 140.0 (60.0) | 3.23 | 113.9 (2.1) |
| 76.8/23.2 | 29.8 (205) | 122.1 (842) | 149.2 (65.1) | 3.43 | 126.9 (2.2) |
| 1/99 | 26.6 (183) | 105.1 (725) | 167.9 (75.5) | 3.59 | 120.8 (2.1) |
| 227eaE/HFC-281fa | | | | | |
| 5.0/95.0 | 21.0 (145) | 87.9 (606) | 168.6 (75.9) | 3.72 | 100.5 (1.8) |
| 95.0/5.0 | 28.4 (196) | 121.5 (838) | 141.9 (61.0) | 3.28 | 115.3 (2.0) |
| 99/1 | 28.4 (196) | 122.5 (845) | 140.0 (60.0) | 3.23 | 113.6 (2.0) |
| 87.6/12.4 | 20.7 (142) | 86.7 (698) | 169.2 (76.2) | 3.73 | 99.6 (1.8) |
| 1/99 | 20.7 (142) | 87.0 (600) | 169.4 (76.3) | 3.72 | 99.5 (1.8) |
| C-234fEαβ/HFC-245cb | | | | | |
| 13.5/86.5 | 29.3 (202) | 119.3 (823) | 142.1 (61.2) | 3.38 | 119.8 (2.1) |
| 5.0/95.0 | 33.5 (231) | 130.5 (900) | 140.1 (60.1) | 3.33 | 130.3 (2.3) |
| 95.0/5.0 | 9.4 (65) | 45.5 (314) | 151.4 (66.3) | 3.76 | 50.0 (0.9) |
| C-234fEαβ/HFC-245eb | | | | | |
| 49.1/50.9 | 11.6 (80) | 55.7 (384) | 152.3 (66.8) | 3.67 | 59.5 (1.0) |
| 5.0/95.0 | 8.6 (59) | 43.2 (298) | 156.3 (69.1) | 3.71 | 46.2 (0.8) |
| 95.0/5.0 | 8.6 (59) | 41.9 (389) | 152.6 (67.0) | 3.73 | 45.5 (0.8) |
| C-234fEαβ/HFC-356mff | | | | | |
| 59.0/41.0 | 9.1 (63) | 44.6 (308) | 145.3 (62.9) | 3.64 | 46.9 (0.8) |
| 5.0/95.0 | 7.6 (52) | 39.4 (272) | 138.4 (59.1) | 3.55 | 39.1 (0.7) |
| 95.0/5.0 | 8.6 (59) | 42.2 (291) | 151.5 (66.4) | 3.72 | 45.7 (0.8) |
| C-234fEαβ/HFC-356mmz | | | | | |
| 50.1/49.9 | 9.9 (68) | 47.1 (325) | 143.4 (61.9) | 3.62 | 49.5 (0.9) |
| 5.0/95.0 | 8.7 (60) | 43.2 (298) | 137.5 (58.6) | 3.54 | 43.4 (0.8) |
| 95.0 5.0 | 8.7 (60) | 42.5 (293) | 151.4 (66.3) | 3.73 | 46.2 (0.8) |
| C-234fEαλ/HFC-245ca | | | | | |
| 33.6/66.4 | 7.2 (50) | 37.0 (225) | 156.3 (69.1) | 3.74 | 39.7 (0.7) |
| 5.0/95.0 | 7.0 (48) | 36.7 (253) | 157.8 (69.9) | 3.74 | 39.2 (0.7) |
| 95.0 5.0 | 6.6 (46) | 33.9 (234) | 154.5 (68.1) | 3.76 | 36.7 (0.6) |
| C-234fEαλ/HFC-245cb | | | | | |
| 10.2/89.8 | 29.5 (203) | 120.8 (833) | 142.3 (61.3) | 3.36 | 120.3 (2.1) |
| 5.0/95.0 | 32.8 (226) | 129.0 (889) | 140.5 (60.3) | 3.33 | 128.5 (2.3) |
| 95.0/5.0 | 7.5 (52) | 37.7 (260) | 153.0 (67.2) | 3.89 | 42.4 (0.7) |
| C-234fEαλ/HFC-245ea | | | | | |
| 36.0/64.0 | 7.0 (48) | 36.9 (254) | 159.5 (70.8) | 3.76 | 39.6 (0.7) |
| 5.0/95.0 | 6.9 (48) | 37.2 (256) | 162.6 (72.6) | 3.77 | 39.7 (0.7) |
| 95.0/5.0 | 6.6 (46) | 33.9 (234) | 154.8 (68.2) | 3.76 | 36.7 (0.6) |
| C-234fEβλ/HFC-254ca | | | | | |
| 36.0/64.0 | 6.9 (48) | 35.6 (245) | 158.6 (70.3) | 3.77 | 38.6 (0.7) |
| 5.0/95.0 | 6.8 (47) | 35.3 (243) | 161.1 (71.7) | 3.77 | 38.1 (0.7) |
| 95.0/5.0 | 6.6 (46) | 33.8 (233) | 154.7 (68.2) | 3.76 | 36.7 (0.6) |
| C-234fEβλ/HFC-356mff | | | | | |
| 43.1/56.9 | 7.8 (54) | 39.7 (274) | 143.9 (62.2) | 3.63 | 41.1 (0.7) |
| 5.0/95.0 | 7.4 (51) | 38.8 (268) | 138.5 (59.2) | 3.55 | 38.4 (0.7) |
| 95.0/5.0 | 6.7 (46) | 34.3 (236) | 153.4 (67.4) | 3.76 | 37.1 (0.7) |
| C-234fEβλ/HFC-356mmz | | | | | |
| 35.8/64.2 | 8.4 (58) | 41.5 (286) | 142.4 (61.3) | 3.61 | 43.0 (0.8) |
| 5.0/95.0 | 8.5 (59) | 42.2 (291) | 137.6 (58.7) | 3.54 | 42.4 (0.7) |
| 95.0/5.0 | 6.7 (46) | 34.3 (236) | 153.3 (67.4) | 3.76 | 37.2 (0.7) |
| 236caE/HFC-245ca | | | | | |
| 5.0/95.0 | 7.0 (48) | 36.6 (252) | 157.7 (69.8) | 3.74 | 39.0 (0.7) |
| 50.0/50.0 | 6.7 (46) | 36.5 (252) | 154.4 (68.0) | 3.71 | 37.8 (0.7) |
| 95.0/5.0 | 6.2 (43) | 35.7 (246) | 150.9 (66.1) | 3.67 | 35.7 (0.6) |
| 236caE/HFC-254ca | | | | | |
| 99/1 | 6.2 (42) | 35.5 (245) | 150.6 (65.9) | 3.67 | 35.5 (2.0) |
| 17.6/82.4 | 6.7 (46) | 35.4 (244) | 159.9 (71.1) | 3.76 | 37.9 (1.8) |
| 1/99 | 6.7 (46) | 35.2 (242) | 161.4 (71.9) | 3.77 | 38.0 (1.8) |
| 236eaEβγ/HFC-263ca | | | | | |
| 99/1 | 7.7 (53) | 42.5 (293) | 149.3 (65.2) | 3.64 | 42.6 (0.7) |
| 4.1/95.9 | 9.3 (64) | 44.8 (309) | 162.0 (72.2) | 3.77 | 49.8 (0.9) |
| 1/99 | 9.4 (64) | 44.8 (309) | 162.3 (72.4) | 3.77 | 49.9 (0.9) |
| 236eaEβγ/HFC-338mf | | | | | |
| 99/1 | 7.7 (53) | 42.7 (294) | 148.9 (64.9) | 3.64 | 42.7 (0.8) |
| 92.6/7.4 | 8.0 (55) | 43.8 (302) | 147.5 (64.2) | 3.63 | 43.9 (0.8) |
| 1/99 | 9.7 (66) | 48.3 (333) | 131.1 (55.1) | 3.39 | 45.8 (0.8) |
| 236eaEβγ/HFC-356mmz | | | | | |
| 99/1 | 7.7 (53) | 42.5 (293) | 149.0 (65.0) | 3.64 | 42.6 (0.7) |
| 15.1/84.9 | 8.6 (59) | 43.2 (298) | 138.3 (59.1) | 3.53 | 43.1 (0.8) |

TABLE 4-continued

| | |
|---|---|
| Evaporator temperature | 45.0° F. (7.2° C.) |
| Condenser temperature | 130.0° F. (54.4° C.) |
| Subcool temperature | 15° F. |
| Return gas temperature | 65.0° F. (18.3° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 1/99 | 8.4 (58) | 42.0 (289) | 136.9 (58.3) | 3.53 | 42.2 (0.7) |
| 236faE/HFC-32 | | | | | |
| 55/45* | 80.8 (557) | 320.8 (2213) | 181.3 (82.9) | 3.62 | 352.9 (6.2) |
| 8.5/91.5 | 149.2 (1029) | 506.5 (3494) | 196.7 (91.5) | 3.96 | 479.3 (8.4) |
| 1/99 | 149.6 (1032) | 510.4 (3521) | 199.8 (93.2) | 3.16 | 518.3 (9.1) |
| *Subcool temp. 25° F. | | | | | |
| 236faE/HFC-272ca | | | | | |
| 99/1 | 15.7 (108) | 74.5 (514) | 142.3 (61.3) | 3.46 | 73.7 (1.3) |
| 27.8/72.2 | 18.6 (128) | 78.2 (539) | 156.9 (69.4) | 3.67 | 87.1 (1.5) |
| 1/99 | 19.1 (131) | 78.5 (541) | 160.5 (71.4) | 3.70 | 89.3 (1.6) |
| 236faE/HFC-272fb | | | | | |
| 99/1 | 15.6 (107) | 74.3 (512) | 142.4 (61.3) | 3.47 | 73.6 (1.3) |
| 82.3/17.7 | 15.7 (108) | 73.2 (505) | 148.1 (64.5) | 3.55 | 75.4 (1.3) |
| 1/99 | 14.0 (96) | 63.5 (438) | 168.7 (75.9) | 3.76 | 72.0 (1.3) |
| 236faE/HFC-281fa | | | | | |
| 99/1 | 15.8 (109) | 75.1 (517) | 142.5 (61.4) | 3.47 | 74.3 (1.3) |
| 9.3/90.7 | 20.6 (142) | 86.7 (598) | 167.9 (75.5) | 3.72 | 98.9 (1.7) |
| 1/99 | 20.7 (142) | 86.7 (598) | 169.3 (76.3) | 3.73 | 99.3 (1.7) |

EXAMPLE 4

The following table shows the refrigerant performance of various compositions. The data are based on the following conditions.

TABLE 5

| | |
|---|---|
| Evaporator temperature | 40.0° F. (4.4° C.) |
| Condenser temperature | 100.0° F. (37.8° C.) |
| Compressor efficiency is 75%. | |
| Return gas temperature | 60.0° F. |

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| CFC-11 | 7.1 (49) | 23.5 (162) | 130.0 (54.4) | 5.68 | 44.2 (0.8) |
| 134E/HFC-32 | | | | | |
| 5.0/95.0 | 135.9 (937) | 483.2 (3331) | 202.5 (94.7) | 3.17 | 490.0 (8.6) |
| 95.0/5.0 | 21.1 (145) | 95.6 (659) | 175.8 (79.9) | 4.08 | 116.8 (2.1) |
| 134E/HFC-125* | | | | | |
| 5.0/95.0 | 107.4 (741) | 387.9 (2675) | 154.0 (67.8) | 2.13 | 244.0 (43) |
| 95.0/5.0 | 23.7 (163) | 63.5 (438) | 126.4 (42.4) | 7.10 | 146.9 (2.6) |
| *=Condenser temp. of 130° F., evaporator temp. of 45° F., and return gas temp. of 65° F. | | | | | |
| 134E/HFC-134 | | | | | |
| 5.0/95.0 | 36.3 (250) | 104.9 (723) | 127.1 (52.8) | 5.38 | 184.8 (3.2) |
| 95.0/5.0 | 15.2 (105) | 50.5 (348) | 119.5 (48.6) | 5.53 | 90.5 (1.6) |
| 134E/HFC-134a | | | | | |
| 5.0/95.0 | 46.8 (323) | 132.8 (916) | 118.5 (48.1) | 5.20 | 222.8 (3.9) |
| 95.0/5.0 | 15.7 (108) | 51.8 (357) | 119.9 (48.8) | 5.57 | 93.5 (1.6) |
| 134E/HFC-143 | | | | | |
| 5.0/95.0 | 14.5 (100) | 45.2 (312) | 134.5 (56.9) | 5.60 | 84.0 (1.5) |
| 37.9/62.1 | 14.7 (101) | 46.7 (322) | 128.9 (53.8) | 5.57 | 85.7 (1.5) |
| 95.0/5.0 | 14.4 (99) | 48.0 (331) | 119.0 (48.3) | 5.51 | 85.7 (1.5) |
| 134E/HFC-143a | | | | | |
| 5.0/95.0 | 101.0 (696) | 247.9 (1709) | 149.7 (65.4) | 4.84 | 394.9 (6.9) |
| 95.0/5.0 | 23.9 (165) | 69.4 (479) | 133.2 (56.2) | 6.54 | 148.0 (2.6) |

TABLE 5-continued

Evaporator temperature 40.0° F. (4.4° C.)
Condenser temperature 100.0° F. (37.8° C.)
Compressor efficiency is 75%.
Return gas temperature 60.0° F.

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 134E/HFC-152a | | | | | |
| 5.0/95.0 | 44.5 (307) | 122.9 (847) | 142.8 (61.6 | 5.39 | 220.3 (3.9) |
| 95.0/5.0 | 16.1 (111) | 52.8 (364) | 121.7 (49.8) | 5.57 | 95.4 (1.7) |
| 134E/HFC-161 | | | | | |
| 5.0/95.0 | 70.2 (484) | 181.9 (1254) | 141.2 (60.7) | 5.28 | 317.3 (5.6) |
| 95.0/5.0 | 18.1 (125) | 58.3 (402) | 125.4 (51.9) | 5.69 | 108.0 (1.9) |
| 134E/HFC-227ca | | | | | |
| 5.0/95.0 | 35.1 (242) | 97.7 (674) | 102.2 (39.0) | 4.88 | 149.7 (2.6) |
| 13.6/86.4 | 37.4 (258) | 103.4 (713) | 99.6 (37.6) | 4.92 | 160.1 (2.8) |
| 134E/HFC-227ea | | | | | |
| 5.0/95.0 | 34.3 (237) | 95.8 (661) | 102.3 (39.1) | 4.89 | 147.5 (2.6) |
| 95.0/5.0 | 18.9 (130) | 57.1 (394) | 122.6 (50.3) | 6.16 | 114.7 (2.0) |
| 7.3/92.7* | 36.0 (248) | 141.7 (977) | 144.5 (62.5) | 3.24 | 135.5 (2.4) |
| 134E/HFC-236ca | | | | | |
| 5.0/95.0 | 12.7 (87) | 40.6 (280) | 105.8 (41.0) | 5.41 | 70.5 (1.2) |
| 95.0/5.0 | 15.0 (103) | 49.8 (343) | 117.8 (47.7) | 5.52 | 88.9 (1.6) |
| 99/1 | 13.5 (93) | 44.8 (309) | 142.3 (61.3) | 5.59 | 81.5 (1.4) |
| 78.0/22.0 | 14.2 (98) | 46.2 (318) | 137.7 (58.7) | 5.57 | 83.5 (1.5) |
| 1/99 | 11.8 (81) | 62.1 (428) | 152.1 (66.7) | 3.33 | 58.0 (1.0) |
| 134E/HFC-236cb | | | | | |
| 5.0/95.0 | 17.7 (122) | 53.5 (369) | 101.2 (38.4) | 5.28 | 90.4 (1.6) |
| 36.3/63.7 | 22.3 (154) | 66.2 (456) | 104.1 (40.1) | 5.26 | 111.8 (2.0) |
| 95.0/5.0 | 15.8 (109) | 51.6 (356) | 118.0 (47.8) | 5.61 | 93.8 (1.7) |
| 134E/HFC-236ea | | | | | |
| 5.0/95.0 | 14.7 (101) | 46.2 (319) | 104.9 (40.5) | 5.36 | 79.4 (1.4) |
| 52.8/47.2 | 19.1 (132) | 59.2 (408) | 108.9 (42.7) | 5.35 | 102.2 (1.8) |
| 95.0/5.0 | 15.2 (105) | 50.2 (346) | 118.0 (47.8) | 5.54 | 90.0 (1.6) |
| 134E/HFC-236fa | | | | | |
| 5.0/95.0 | 19.5 (135) | 58.3 (402) | 100.7 (3.82) | 5.25 | 97.7 (1.7) |
| 95.0/5.0 | 16.1 (111) | 52.0 (359) | 119.1 (48.4) | 5.65 | 95.3 (1.7) |
| 14.2/85.8* | 21.2 (146) | 91.1 (628) | 148.6 (64.8) | 3.50 | 94.3 (1.7) |
| 134E/HFC-245ca | | | | | |
| 5.0/95.0 | 6.9 (47) | 23.9 (164) | 111.7 (44.3) | 5.58 | 42.7 (0.8) |
| 95.0/5.0 | 14.4 (99) | 47.9 (331) | 117.2 (47.3) | 5.50 | 85.2 (1.5) |
| 134E/HFC-245cb | | | | | |
| 5.0/95.0 | 33.5 (231) | 91.5 (631) | 104.4 (40.2) | 4.90 | 142.1 (2.5) |
| 28.5/71.5 | 32.8 (226) | 91.8 (633) | 103.6 (39.8) | 5.03 | 147.3 (2.6) |
| 95.0/5.0 | 16.5 (114) | 53.1 (366) | 119.5 (48.6) | 5.69 | 97.9 (1.7) |
| 134E/HFC-245ea | | | | | |
| 5.0/95.0 | 6.7 (46) | 23.7 (164) | 115.2 (46.2) | 5.59 | 42.5 (0.7) |
| 95.0/5.0 | 14.2 (98) | 47.6 (328) | 117.6 (47.6) | 5.49 | 84.5 (1.5) |
| 134E/HFC-245fa | | | | | |
| 5.0/95.0 | 10.7 (74) | 35.0 (241) | 1082 (42.3) | 5.46 | 61.5 (1.1) |
| 95.0/5.0 | 14.6 (101) | 492 (339) | 117.8 (47.7) | 5.44 | 86.4 (1.5) |
| 134E/HFC-254ca | | | | | |
| 5.0/95.0 | 6.5 (45) | 22.5 (155) | 113.5 (45.3) | 5.59 | 40.5 (0.7) |
| 95.0/5.0 | 14.1 (97) | 47.4 (327) | 117.6 (47.6) | 5.48 | 84.1 (1.5) |
| 134E/HFC-254cb | | | | | |
| 5.0/95.0 | 17.4 (120) | 52.0 (359) | 107.1 (41.7) | 5.39 | 90.8 (1.6) |
| 29.7/70.3 | 19.4 (134) | 58.0 (400) | 108.5 (42.5) | 5.39 | 101.2 (1.8) |
| 95.0/5.0 | 15.2 (105) | 50.4 (347) | 118.1 (47.8) | 5.53 | 90.1 (1.6) |
| 134E/HFC-254eb* | | | | | |
| 28.6/71.4 | 19.0 (131) | 82.9 (572) | 159.2 (70.7) | 3.64 | 90.4 (1.6) |
| 134E/HFC-263ca | | | | | |
| 5.0/95.0 | 8.8 (61) | 28.6 (197) | 113.5 (45.3) | 5.57 | 51.9 (0.9) |
| 95.0/5.0 | 14.4 (99) | 47.8 (330) | 117.4 (47.4) | 5.50 | 85.1 (1.5) |

TABLE 5-continued

Evaporator temperature 40.0° F. (4.4° C.)
Condenser temperature 100.0° F. (37.8° C.)
Compressor efficiency is 75%.
Return gas temperature 60.0° F.

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 134E/HFC-263fb | | | | | |
| 5.0/95.0 | 28.0 (193) | 78.8 (543) | 106.5 (41.4) | 5.28 | 134.1 (2.4) |
| 95.0/5.0 | 16.1 (111) | 52.5 (362) | 119.4 (48.6) | 5.60 | 95.2 (1.7) |
| 134E/HFC-272ca | | | | | |
| 5.0/95.0 | 17.5 (121) | 51.2 (353) | 111.7 (44.3) | 5.44 | 91.0 (1.6) |
| 95.0/5.0 | 15.2 (105) | 50.0 (345) | 118.0 (47.8) | 5.51 | 89.3 (1.6) |
| 134E/HFC-272ea | | | | | |
| 5.0/95.0 | 9.8 (67) | 32.1 (221) | 119.8 (48.8) | 5.52 | 57.7 (1.0) |
| 95.0/5.0 | 14.1 (97) | 47.3 (326) | 118.1 (47.8) | 5.50 | 84.1 (1.5) |
| 134E/HFC-272fb | | | | | |
| 5.0/95.0 | 12.7 (88) | 40.1 (276) | 117.5 (47.5) | 5.51 | 72.3 (1.3) |
| 95.0/5.0 | 14.4 (100) | 48.2 (332) | 117.9 (47.7) | 5.50 | 85.8 (1.5) |
| 134E/HFC-281ea | | | | | |
| 5.0/95.0 | 24.0 (166) | 67.9 (468) | 116.7 (47.1) | 5.47 | 121.8 (2.1) |
| 95.0/5.0 | 15.5 (107) | 51.0 (351) | 118.8 (48.2) | 5.52 | 91.3 (1.6) |
| 134E/HFC-281fa | | | | | |
| 5.0/95.0 | 18.7 (129) | 55.3 (381) | 117.1 (47.3) | 5.50 | 99.8 (1.8) |
| 95.0/5.0 | 152 (105) | 49.6 (342) | 118.0 (47.8) | 5.57 | 89.7 (1.6) |
| 134E9/HFC-338mf | | | | | |
| 5.0/95.0 | 10.5 (72) | 34.7 (239) | 95.3 (35.2) | 5.35 | 58.5 (1.0) |
| 65.5/34.5 | 18.8 (130) | 59.8 (412) | 108.2 (42.3) | 5.21 | 99.7 (1.8) |
| 95.0/5.0 | 15.7 (108) | 51.6 (356) | 118.1 (47.8) | 5.62 | 93.1 (1.6) |
| 236caE/HFC-125 | | | | | |
| 5.0/95.0 | 90.0 (621) | 242.9 (1675) | 127.5 (53.1) | 4.33 | 330.6 (5.8) |
| 95.0/5.0 | 9.0 (62) | 30.8 (212) | 119.3 (48.5) | 6.26 | 61.3 (1.1) |
| 236caE/HFC-134 | | | | | |
| 5.0/95.0 | 35.3 (243) | 103.9 (716) | 129.2 (54.0) | 5.28 | 179.7 (3.2) |
| 95.0/5.0 | 6.9 (48) | 25.0 (172) | 110.7 (43.7) | 5.68 | 44.9 (0.8) |
| 236caE/HFC-134a | | | | | |
| 5.0/95.0 | 44.5 (307) | 129.1 (890) | 121.1 (49.5) | 5.13 | 213.3 (3.7) |
| 95.0/5.0 | 7.2 (50) | 26.0 (179) | 111.8 (44.3) | 5.74 | 47.3 (0.8) |
| 236caE/HFC-143 | | | | | |
| 5.0/95.0 | 14.1 (97) | 442 (305) | 134.3 (56.8) | 5.60 | 82.1 (1.4) |
| 95.0/5.0 | 6.1 (42) | 22.5 (155) | 107.2 (41.8) | 5.49 | 38.9 (0.7) |
| 236caE/HFC-143a | | | | | |
| 5.0/95.0 | 90.0 (621) | 232.8 (1605) | 160.3 (71.3) | 4.68 | 361.3 (6.3) |
| 95.0/5.0 | 9.6 (66) | 33.1 (228) | 123.6 (50.9) | 6.18 | 64.9 (1.1) |
| 236caE/HFC-152a | | | | | |
| 5.0/95.0 | 43.5 (300) | 121.3 (836) | 143.5 (61.9) | 5.34 | 215.6 (3.8) |
| 95.0/5.0 | 7.9 (54) | 28.2 (194) | 115.9 (46.6) | 5.82 | 51.9 (0.9) |
| 236ca/HFC-161 | | | | | |
| 5.0/95.0 | 69.0 (476) | 180.6 (1245) | 142.5 (61.4) | 522 | 311.7 (5.5) |
| 95.0/5.0 | 10.1 (70) | 36.1 (249) | 126.8 (52.7) | 5.90 | 67.4 (1.2 |
| 236caE/HFC-227ca | | | | | |
| 5.0/95.0 | 30.5 (210) | 87.5 (603) | 99.0 (37.2) | 4.93 | 135.8 (2.4) |
| 95.0/5.0 | 6.6 (46) | 23.8 (164) | 107.9 (42.2) | 5.67 | 42.7 (0.8) |
| 236caE/HFC-227ea | | | | | |
| 5.0/95.0 | 29.8 (205) | 95.7 (591) | 98.9 (37.2) | 4.95 | 133.6 (2.3) |
| 95.0/5.0 | 6.6 (46) | 23.7 (163) | 107.6 (42.0) | 5.67 | 42.5 (0.7) |
| 236caE/HFC-236ca | | | | | |
| 5.0/95.0 | 11.3 (78) | 36.9 (254) | 104.4 (40.2) | 5.37 | 63.5 (1.1) |
| 95.0/5.0 | 5.7 (39) | 21.4 (147) | 104.2 (40.1) | 5.44 | 36.5 (0.6) |

TABLE 5-continued

| | | | | | |
|---|---|---|---|---|---|
| Evaporator temperature | 40.0° F. (4.4° C.) | | | | |
| Condenser temperature | 100.0° F. (37.8° C.) | | | | |
| Compressor efficiency is 75%. | | | | | |
| Return gas temperature | 60.0° F. | | | | |

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 236caE/HFC-236cb | | | | | |
| 5.0/95.0 | 15.5 (107) | 47.9 (330) | 100.9 (38.3) | 5.25 | 80.4 (1.4) |
| 95.0/5.0 | 5.8 (40) | 21.7 (149) | 104.4 (40.2) | 5.46 | 37.2 (0.7) |
| 236caE/HFC-236fa | | | | | |
| 5.0/95.0 | 17.3 (119) | 52.8 (364) | 100.2 (37.9) | 5.21 | 87.9 (1.5) |
| 95.0/5.0 | 6.0 (41) | 22.2 (153) | 105.1 (40.6) | 5.50 | 38.3 (0.7) |
| 237caE/HFC-245cb | | | | | |
| 5.0/95.0 | 29.8 (205) | 84.4 (582) | 100.1 (37.8) | 4.96 | 132.8 (2.3) |
| 95.0/5.0 | 6.4 (44) | 23.4 (161) | 106.8 (41.6) | 5.59 | 41.2 (0.7) |
| 236caE/HFC-245ea | | | | | |
| 5.0/95.0 | 6.1 (42) | 21.9 (151) | 112.9 (44.9) | 5.53 | 38.8 (0.7) |
| 95.0/5.0 | 5.5 (38) | 20.7 (143) | 104.1 (40.1) | 5.42 | 35.2 (0.6) |
| 236caE/HFC-245fa | | | | | |
| 5.0/95.0 | 9.7 (67) | 32.3 (223) | 107.0 (41.7) | 5.38 | 55.9 (1.0) |
| 95.0/5.0 | 5.7 (39) | 212 (146) | 104.1 (40.1) | 5.43 | 36.2 (0.6) |
| 236caE/HFC-254ca | | | | | |
| 5.0/95.0 | 6.0 (41) | 21.0 (145) | 111.3 (44.1) | 5.54 | 37.3 (0.7) |
| 95.0/5.0 | 5.5 (38) | 20.6 (142) | 104.1 (40.1) | 5.43 | 35.2 (0.6) |
| 236caE/HFC-254cb | | | | | |
| 5.0/95.0 | 16.0 (111) | 48.8 (336) | 107.5 (41.9) | 5.37 | 84.8 (1.5) |
| 95.0/5.0 | 6.0 (41) | 22.1 (152) | 105.3 (40.7) | 5.47 | 38.0 (0.7) |
| 236caE/HFC-254eb | | | | | |
| 5.0/95.0 | 16.3 (113) | 49.6 (342) | 107.5 (41.9) | 5.37 | 86.1 (1.5) |
| 95.0/5.0 | 6.0 (41) | 22.1 (153) | 105.3 (40.7) | 5.47 | 38.2 (0.7) |
| 236caE/HFC-263ca | | | | | |
| 5.0/95.0 | 8.3 (57) | 27.8 (187) | 112.4 (44.7) | 5.53 | 48.8 (0.9) |
| 95.0/5.0 | 5.7 (39) | 21.1 (145) | 104.4 (40.2) | 5.44 | 36.1 (0.6) |
| 236caE/HFC-263fb | | | | | |
| 5.0/95.0 | 26.0 (179) | 74.5 (514) | 108.5 (42.5) | 5.26 | 126.3 (2.2) |
| 95.0/5.0 | 6.5 (45) | 23.6 (163) | 107.5 (41.9) | 5.57 | 41.5 (0.7) |
| 236caE/HFC-272ca | | | | | |
| 5.0/95.0 | 16.7 (115) | 49.0 (338) | 112.2 (44.6) | 5.46 | 873 (1.5) |
| 95.0/5.0 | 6.1 (42) | 22.5 (155) | 106.1 (412) | 5.49 | 39.0 (0.7) |
| 236caE/HFC-272ea | | | | | |
| 5.0/95.0 | 9.6 (66) | 30.7 (211) | 117.9 (47.7) | 5.68 | 57.1 (1.0) |
| 95.0/5.0 | 5.8 (40) | 21.6 (149) | 105.4 (40.8) | 5.44 | 37.0 (0.7) |
| 236caE/HFC-272fb | | | | | |
| 5.0/95.0 | 12.2 (84) | 38.9 (268) | 117.5 (47.5) | 5.48 | 69.7 (1.2) |
| 95.0/5.0 | 6.0 (41) | 22.1 (152) | 105.8 (41.0) | 5.46 | 38.0 (0.7) |
| 236caE/HFC-281ea | | | | | |
| 5.0/95.0 | 23.2 (160) | 66.2 (456) | 117.8 (47.7) | 5.46 | 118.4 (2.1) |
| 95.0/5.0 | 6.8 (47) | 24.4 (169) | 109.1 (42.8) | 5.58 | 43.2 (0.8) |
| 236caE/HFC-281fa | | | | | |
| 5.0/95.0 | 18.2 (125) | 54.5 (376) | 117.5 (47.5) | 5.51 | 97.4 (1.7) |
| 95.0/5.0 | 6.5 (45) | 23.4 (163) | 107.9 (42.2) | 5.53 | 41.3 (0.7) |
| 236eaEβγ/HFC-125 | | | | | |
| 5.0/95.0 | 93.0 (641) | 245.9 (1695) | 125.0 (51.7) | 4.39 | 338.5 (5.9) |
| 95.0/5.0 | 10.4 (72) | 35.5 (245) | 116.6 (47.0) | 6.00 | 67.6 (1.2) |
| 236eaEβγ/HFC-134 | | | | | |
| 5.0/95.0 | 36.1 (249) | 104.5 (721) | 127.2 (52.9) | 5.35 | 183.1 (3.2) |
| 95.0/5.0 | 8.3 (58) | 29.5 (204) | 108.7 (42.6) | 5.60 | 52.3 (0.9) |

TABLE 5-continued

| Evaporator temperature | 40.0° F. (4.4° C.) |
| Condenser temperature | 100.0° F. (37.8° C.) |
| Compressor efficiency is 75%. | |
| Return gas temperature | 60.0° F. |

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 236eaEβγ/HFC-134a | | | | | |
| 5.0/95.0 | 45.5 (314) | 130.6 (900) | 119.7 (48.7) | 5.16 | 217.2 (3.8) |
| 95.0/5.0 | 8.6 (59) | 30.6 (211) | 109.5 (43.1) | 5.65 | 54.3 (1.0) |
| 236eaEβγ/HFC-143 | | | | | |
| 5.0/95.0 | 14.3 (97) | 44.6 (307) | 134.4 (56.9) | 5.56 | 82.2 (1.4) |
| 95.0/5.0 | 7.4 (51) | 26.6 (1840) | 105.5 (40.8) | 5.43 | 45.8 (0.8) |
| 236eaEβγ/HFC-143a | | | | | |
| 5.0/95.0 | 90.0 (621) | 232.8 (1605) | 160.3 (713) | 4.68 | 361.3 (63) |
| 95.0/5.0 | 9.6 (66) | 32.8 (226) | 123.3 (50.7) | 6.23 | 65.1 (1.1) |
| 236eaEβγ/HFC-152a | | | | | |
| 5.0/95.0 | 44.3 (305) | 122.5 (844) | 142.1 (61.2) | 5.38 | 219.0 (3.8) |
| 95.0/5.0 | 9.5 (65) | 32.8 (226) | 113.6 (45.3) | 5.72 | 59.7 (1.0) |
| 236eaEβγ/HFC-161 | | | | | |
| 5.0/95.0 | 69.6 (480) | 181.5 (1251) | 141.7 (60.9) | 5.23 | 313.9 (5.5) |
| 95.0/5.0 | 11.7 (81) | 39.8 (274) | 121.8 (49.9) | 5.91 | 75.0 (1.3) |
| 236eaEβγ/HFC-227ca | | | | | |
| 5.0/95.0 | 30.9 (213) | 88.3 (609) | 102.1 (38.9) | 4.88 | 135.9 (2.4) |
| 95.0/5.0 | 7.9 (54) | 27.9 (193) | 105.6 (40.9) | 5.57 | 49.2 (0.9) |
| 236eaEβγ/HFC-227ea | | | | | |
| 5.0/95.0 | 30.3 (209) | 86.5 (596) | 102.0 (38.9) | 4.90 | 133.7 (2.3) |
| 95.0/5.0 | 7.9 (54) | 27.9 (192) | 105.5 (40.8) | 5.50 | 48.9 (0.9) |
| 236eaEβγ/HFC-236ca | | | | | |
| 5.0/95.0 | 11.4 (79) | 37.3 (257) | 104.3 (40.2) | 5.32 | 63.6 (1.1) |
| 95.0/5.0 | 7.0 (48) | 25.7 (177) | 103.2 (39.6) | 5.32 | 42.9 (0.8) |
| 236eaEβγ/HFC-236cb | | | | | |
| 5.0/95.0 | 15.9 (110) | 48.9 (337) | 100.0 (37.8) | 5.24 | 81.8 (1.4) |
| 95.0/5.0 | 7.2 (50) | 26.1 (180) | 103.2 (39.6) | 5.42 | 44.7 (0.8) |
| 236eaEβγ/HFC-236fa | | | | | |
| 5.0/95.0 | 17.6 (121) | 53.3 (368) | 104.1 (40.1) | 5.16 | 88.1 (1.6) |
| 95.0/5.0 | 7.3 (51) | 26.4 (182) | 103.6 (39.8) | 5.42 | 45.3 (0.8) |
| 236eaEβγ/HFC-245ca | | | | | |
| 5.0/95.0 | 6.2 (43) | 21.9 (151) | 109.0 (42.8) | 5.50 | 38.6 (0.7) |
| 95.0/5.0 | 6.8 (47) | 24.7 (170) | 102.8 (39.3) | 5.39 | 41.9 (0.7) |
| 236eaEβγ/HFC-245cb | | | | | |
| 5.0/95.0 | 30.3 (209) | 85.2 (587) | 99.8 (37.7) | 4.96 | 134.3 (2.4) |
| 95.0/5.0 | 7.7 (53) | 27.5 (190) | 104.7 (40.4) | 5.50 | 47.9 (0.8) |
| 236eaEβγ/HFC-245ea | | | | | |
| 5.0/95.0 | 6.2 (42) | 22.1 (152) | 112.9 (44.9) | 5.53 | 39.0 (0.7) |
| 95.0/5.0 | 6.8 (47) | 24.7 (170) | 103.0 (39.4) | 5.39 | 41.9 (0.7) |
| 236eaEβγ/HFC-245fa | | | | | |
| 5.0/95.0 | 9.8 (68) | 32.5 (224) | 106.6 (41.4) | 5.41 | 56.5 (1.0) |
| 95.0/5.0 | 6.9 (48) | 25.3 (175) | 103.0 (39.4) | 5.36 | 42.8 (0.8) |
| 236eaEβγ/HFC-254ca | | | | | |
| 5.0/95.0 | 6.0 (41) | 21.1 (146) | 111.3 (44.1) | 5.53 | 37.5 (0.7) |
| 95.0/5.0 | 6.8 (47) | 24.6 (170) | 103.0 (39.4) | 5.39 | 41.9 (0.7) |
| 95.0/5.0 | 6.8 (47) | 24.6 (170) | 103.0 (39.4) | 5.39 | 41.9 (0.7) |
| 236eaEβγ/HFC-254cb | | | | | |
| 5.0/95.0 | 16.2 (112) | 49.1 (338) | 107.0 (41.7) | 5.38 | 85.6 (1.5) |
| 95.0/5.0 | 8.2 (57) | 26.2 (181) | 103.0 (39.4) | 6.04 | 50.9 (0.9) |
| 236eaEβγ/HFC-254eb | | | | | |
| 5.0/95.0 | 16.5 (113) | 49.9 (344) | 106.9 (41.6) | 5.38 | 86.8 (1.5) |
| 95.0/5.0 | 7.3 (50) | 26.3 (181) | 103.8 (39.9) | 5.42 | 45.0 (0.8) |

TABLE 5-continued

| Evaporator temperature | 40.0° F. (4.4° C.) |
| Condenser temperature | 100.0° F. (37.8° C.) |
| Compressor efficiency is 75%. | |
| Return gas temperature | 60.0° F. |

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 236eaEβγ/HFC-263ca | | | | | |
| 5.0/95.0 | 8.3 (57) | 27.3 (188) | 112.2 (44.6) | 5.54 | 49.1 (0.9) |
| 95.0/5.0 | 6.9 (48) | 25.1 (173) | 103.2 (39.6) | 5.39 | 42.7 (0.8) |
| 236eaEβγ/HFC-263fb | | | | | |
| 5.0/95.0 | 26.3 (181) | 75.0 (517) | 107.8 (42.1) | 5.27 | 127.6 (22) |
| 95.0/5.0 | 7.8 (54) | 27.8 (192) | 105.5 (40.8) | 5.49 | 48.2 (0.8) |
| 236eaEβγ/HFC-272ca | | | | | |
| 5.0/95.0 | 16.8 (116) | 49.3 (340) | 111.6 (44.2) | 5.47 | 88.2 (1.5) |
| 95.0/5.0 | 7.5 (52) | 26.8 (184) | 104.6 (40.3) | 5.43 | 46.0 (0.8) |
| 236eaEβγ/HFC-272ea | | | | | |
| 5.0/95.0 | 9.5 (66) | 31.1 (214) | 118.6 (48.1) | 5.57 | 56.6 (1.0) |
| 95.0/5.0 | 7.1 (49) | 25.6 (176) | 103.9 (39.9) | 5.41 | 43.8 (0.8) |
| 236eaEβγ/HFC-272fb | | | | | |
| 5.0/95.0 | 12.4 (85) | 39.1 (269) | 117.1 (47.3) | 5.51 | 70.4 (1.2) |
| 95.0/5.0 | 7.3 (50) | 26.2 (181) | 104.3 (40.2) | 5.41 | 44.8 (0.8) |
| 236eaEβγ/HFC-281ea | | | | | |
| 5.0/95.0 | 23.4 (162) | 66.6 (459) | 117.3 (47.4) | 5.46 | 119.2 (2.1) |
| 95.0/5.0 | 8.1 (56) | 28.6 (197) | 107.0 (41.7) | 5.50 | 49.9 (0.9) |
| 236eaEβγ/HFC-281fa | | | | | |
| 5.0/95.0 | 18.3 (126) | 54.3 (375) | 117.4 (47.4) | 5.49 | 98.0 (1.7) |
| 95.0/5.0 | 7.8 (54) | 27.8 (192) | 106.0 (41.1) | 5.46 | 48.0 (0.8) |
| 236faE/HFC-125 | | | | | |
| 5.0/95.0 | 99.6 (687) | 252.9 (1743) | 119.9 (48.8) | 4.49 | 354.1 (6.2) |
| 95.0/5.0 | 17.4 (120) | 54.6 (377) | 103.8 (39.9) | 5.51 | 95.4 (1.7) |
| 236faE/HFC-134 | | | | | |
| 5.0/95.0 | 37.6 (259) | 108.1 (745) | 125.3 (5 1.8) | 5.33 | 188.4 (3.3) |
| 95.0/5.0 | 15.8 (109) | 50.6 (349) | 100.6 (38.1) | 5.29 | 85.0 (1.5) |
| 236faE/HFC-134a | | | | | |
| 5.0/95.0 | 48.2 (332) | 135.5 (934) | 116.5 (46.9) | 5.19 | 226.2 (4.0) |
| 95.0/5.0 | 16.2 (112) | 51.7 (356) | 101.1 (38.4) | 5.33 | 87.4 (1.5) |
| 236faE/HFC-143 | | | | | |
| 5.0/95.0 | 14.5 (100) | 45.5 (314) | 133.6 (56.4) | 5.58 | 84.1 (1.5) |
| 95.0/5.0 | 14.5 (100) | 46.6 (321) | 103.5 (39.7) | 5.17 | 76.7 (1.3) |
| 236faE/HFC-143a | | | | | |
| 5.0/95.0 | 96.7 (667) | 241.0 (1662) | 152.6 (67.0) | 4.81 | 382.2 (6.7) |
| 95.0/5.0 | 18.3 (126) | 56.9 (392) | 106.6 (41.4) | 5.58 | 101.1 (1.8) |
| 236faE/HFC-152a | | | | | |
| 5.0/95.0 | 45.7 (315) | 125.1 (863) | 140.1 (60.1) | 5.39 | 224.3 (3.9) |
| 95.0/5.0 | 17.1 (118) | 542 (374) | 103.9 (39.9) | 5.37 | 92.6 (1.6) |
| 236faE/HFC-161 | | | | | |
| 5.0/95.0 | 72.2 (498) | 185.7 (1280) | 138.9 (59.4) | 5.27 | 322.7 (5.7) |
| 95.0/5.0 | 20.6 (142) | 63.3 (436) | 110.6 (43.7) | 5.65 | 113.9 (2.0) |
| 236faE/HFC-227ca | | | | | |
| 5.0/95.0 | 31.9 (220) | 90.1 (621) | 101.5 (30.6) | 4.87 | 138.3 (2.4) |
| 95.0/5.0 | 14.8 (1020 | 47.7 (329) | 101.5 (38.6) | 5.16 | 78.0 (1.4) |
| 236faE/HFC-227ea | | | | | |
| 5.0/95.0 | 31.1 (215) | 88.3 (609) | 101.6 (38.7) | 4.88 | 135.8 (2.4) |
| 95.0/5.0 | 14.7 (101) | 47.6 (328) | 101.5 (38.6) | 5.16 | 77.8 (1.4) |
| 236faE/HFC-236ca | | | | | |
| 5.0/95.0 | 11.8 (81) | 38.1 (263) | 103.7 (39.8) | 5.35 | 65.4 (1.1) |
| 95.0/5.0 | 13.8 (95) | 45.0 (310) | 102.1 (38.9) | 5.12 | 73.1 (1.3) |

TABLE 5-continued

| | | | | | |
|---|---|---|---|---|---|
| Evaporator temperature | 40.0° F. (4.4° C.) | | | | |
| Condenser temperature | 100.0° F. (37.8° C.) | | | | |
| Compressor efficiency is 75%. | | | | | |
| Return gas temperature | 60.0° F. | | | | |

| Refrig. Comp | Evap. Press. Psia (kPa) | Cond. Press. Psia (kPa) | Comp. Dis. Temp. °F. (°C.) | COP | Capacity BTU/min (kw) |
|---|---|---|---|---|---|
| 236faE/HFC-236cb | | | | | |
| 5.0/95.0 | 16.3 (112) | 49.8 (343) | 104.2 (40.1) | 5.17 | 82.5 (1.4) |
| 95.0/5.0 | 14.1 (97) | 45.8 (316) | 101.8 (38.8) | 5.12 | 74.3 (1.3) |
| 236faE/HFC-236fa | | | | | |
| 5.0/95.0 | 18.0 (124) | 54.3 (375) | 104.0 (40.0) | 5.13 | 89.1 (1.6) |
| 95.0/5.0 | 14.2 (98) | 46.0 (317) | 101.8 (38.8) | 5.12 | 74.6 (1.3) |
| 236faE/HFC-245ca | | | | | |
| 5.0/95.0 | 6.4 (44) | 22.5 (155) | 109.1 (42.8) | 5.51 | 39.7 (0.7) |
| 95.0/5.0 | 13.2 (91) | 43.3 (299) | 102.3 (39.1) | 5.18 | 71.1 (1.2) |
| 236faE/HFC-245cb | | | | | |
| 5.0/95.0 | 31.6 (218) | 87.4 (603) | 109.0 (42.8) | 4.84 | 134.4 (2.4) |
| 95.0/5.0 | 14.8 (102) | 47.5 (328) | 106.5 (41.4) | 5.09 | 76.9 (1.4) |
| 236faE/HFC-245ea | | | | | |
| 5.0/95.0 | 6.4 (44) | 22.7 (157) | 113.1 (45.1) | 5.54 | 40.3 (0.7) |
| 95.0/5.0 | 13.3 (92) | 43.6 (301) | 102.4 (39.1) | 5.17 | 71.6 (1.3) |
| 236faE/HFC-245fa | | | | | |
| 5.0/95.0 | 10.1 (70) | 33.3 (230) | 106.3 (41.3) | 5.40 | 57.9 (1.0) |
| 95.0/5.0 | 13.7 (94) | 44.6 (308) | 102.0 (38.9) | 5.16 | 72.9 (1.3) |
| 236faE/HFC-254ca | | | | | |
| 5.0/95.0 | 6.2 (43) | 21.6 (149) | 111.5 (442) | 5.55 | 38.6 (0.7) |
| 95.0/5.0 | 13.2 (91) | 43.3 (299) | 102.6 (392) | 5.17 | 70.9 (1.2) |
| 236faE/HFC-254cb | | | | | |
| 5.0/95.0 | 16.6 (114) | 50.2 (346) | 106.1 (412) | 5.37 | 87.1 (1.5) |
| 95.0/5.0 | 14.1 (97) | 45.8 (316) | 102.2 (39.0) | 5.14 | 74.6 (1.3) |
| 236faE/HFC-254eb | | | | | |
| 5.0/95.0 | 16.9 (117) | 51.0 (352) | 106.0 (41.1) | 5.36 | 88.4 (1.6) |
| 95.0/5.0 | 14.1 (97) | 45.9 (316) | 102.3 (39.1) | 5.13 | 74.7 (1.3) |
| 236faE/HFC-263ca | | | | | |
| 5.0/95.0 | 8.5 (59) | 28.0 (193) | 112.5 (44.7) | 5.49 | 49.9 (0.9) |
| 95.0/5.0 | 13.5 (93) | 43.9 (303) | 102.6 (39.2) | 5.17 | 72.0 (1.3) |
| 236faE/HFC-263fb | | | | | |
| 5.0/95.0 | 27.0 (186) | 76.9 (530) | 106.6 (41.4) | 5.22 | 129.2 (2.3) |
| 95.0/5.0 | 14.8 (102) | 47.6 (328) | 102.3 (39.1) | 5.16 | 77.8 (1.4) |
| 236faE/HFC-272ca | | | | | |
| 5.0/95.0 | 17.2 (119) | 50.1 (345) | 110.8 (43.8) | 5.47 | 89.6 (1.6) |
| 95.0/5.0 | 14.3 (99) | 46.1 (318) | 102.8 (39.3) | 5.14 | 75.3 (1.3) |
| 236faE/HFC-272ea | | | | | |
| 5.0/95.0 | 9.7 (67) | 31.8 (219) | 118.9 (48.3) | 5.52 | 57.4 (1.0) |
| 95.0/5.0 | 13.8 (95) | 44.8 (309) | 103.2 (39.6) | 5.15 | 73.3 (1.3) |
| 236faE/HFC-272fb | | | | | |
| 5.0/95.0 | 12.6 (87) | 39.8 (274) | 116.6 (47.0) | 5.52 | 71.8 (1.3) |
| 95.0/5.0 | 14.1 (97) | 45.5 (314) | 103.0 (39.4) | 5.15 | 74.6 (1.3) |
| 236faE/HFC-281ea | | | | | |
| 5.0/95.0 | 23.9 (165) | 67.6 (466) | 116.3 (48.0) | 5.45 | 120.9 (2.1) |
| 95.0/5.0 | 15.2 (105) | 48.4 (334) | 103.3 (39.6) | 5.19 | 79.9 (1.4) |
| 236faE/HFC-281fa | | | | | |
| 5.0/95.0 | 18.7 (129) | 55.1 (380) | 116.6 (47.0) | 5.50 | 99.4 (1.7) |
| 95.0/5.0 | 14.8 (102) | 47.4 (327) | 103.3 (39.6) | 5.18 | 78.0 (1.4) |
| 245faEβγ/HFC-125 | | | | | |
| 5.0/95.0 | 88.9 (613) | 240.9 (1661) | 128.2 (53.4) | 4.33 | 328.4 (5.8) |
| 95.0/5.0 | 8.9 (61) | 30.1 (208) | 121.1 (49.5) | 6.35 | 60.9 (1.1) |

TABLE 5-continued

| Evaporator temperature | 40.0° F. (4.4° C.) |
| Condenser temperature | 100.0° F. (37.8° C.) |
| Compressor efficiency is 75%. | |
| Return gas temperature | 60.0° F. |

| Refrig.<br>Comp | Evap.<br>Press.<br>Psia (kPa) | Cond.<br>Press.<br>Psia (kPa) | Comp. Dis.<br>Temp. °F. (°C.) | COP | Capacity<br>BTU/min<br>(kw) |
|---|---|---|---|---|---|
| 245faEβγ/HFC-134 | | | | | |
| 5.0/95.0 | 34.6 (239) | 101.7 (701) | 129.6 (542) | 5.32 | 177.2 (3.1) |
| 95.0/5.0 | 6.6 (46) | 23.9 (165) | 111.6 (442) | 5.68 | 43.0 (0.8) |
| 245faEβγ/HFC-134a | | | | | |
| 5.0/95.0 | 43.4 (299) | 127.2 (877) | 122.3 (502) | 5.11 | 209.7 (3.7) |
| 95.0/5.0 | 6.9 (48) | 24.8 (171) | 112.7 (44.8) | 5.75 | 45.2 (0.8) |
| 245faEβγ/HFC-143 | | | | | |
| 5.0/95.0 | 13.9 (96) | 44.3 (305) | 135.4 (57.4) | 5.50 | 80.7 (1.4) |
| 95.0/5.0 | 5.9 (41) | 21.7 (150) | 108.6 (42.6) | 5.51 | 37.9 (0.7) |
| 245faEβγ/HFC-143a | | | | | |
| 5.0/95.0 | 89.2 (615) | 231.5 (1596) | 161.1 (71.7) | 4.66 | 359.0 (6.3) |
| 95.0/5.0 | 9.4 (65) | 31.9 (220) | 124.7 (51.5) | 6.31 | 64.2 (1.1) |
| 245faEβγ/HFC-152a | | | | | |
| 5.0/95.0 | 42.8 (295) | 120.1 (828) | 144.4 (62.4) | 5.33 | 213.0 (3.7) |
| 95.0/5.0 | 7.5 (52) | 26.7 (184) | 116.5 (46.9) | 5.81 | 49.2 (0.9) |
| 245faEβγ/HFC-161 | | | | | |
| 5.0/95.0 | 67.9 (468) | 178.9 (1233) | 143.5 (61.9) | 5.20 | 307.8 (5.4) |
| 95.0/5.0 | 9.6 (66) | 33.1 (228) | 126.0 (52.2) | 6.06 | 64.3 (1.1) |
| 245faEβγ/HFC-227ca | | | | | |
| 5.0/95.0 | 30.5 (210) | 87.6 (604) | 98.9 (37.2) | 4.93 | 136.0 (2.4) |
| 95.0/5.0 | 6.5 (45) | 23.4 (161) | 109.9 (43.3) | 5.76 | 42.7 (0.8) |
| 245faEβγ/HFC-227ea | | | | | |
| 5.0/95.0 | 29.9 (206) | 85.8 (592) | 98.8 (37.1) | 4.95 | 133.9 (2.4) |
| 95.0/5.0 | 6.5 (45) | 233 (161) | 109.8 (432) | 5.74 | 42.5 (0.7) |
| 245faEβγ/HFC-236ca | | | | | |
| 5.0/95.0 | 11.2 (77) | 37.1 (256) | 104.8 (40.4) | 5.29 | 62.9 (1.1) |
| 95.0/5.0 | 5.6 (39) | 20.9 (144) | 106.0 (41.1) | 5.47 | 36.1 (0.6) |
| 245faEβγ/HFC-236cb | | | | | |
| 5.0/95.0 | 15.7 (108) | 48.4 (334) | 100.2 (37.9) | 5.25 | 81.3 (1.4) |
| 95.0/5.0 | 5.8 (40) | 21.5 (148) | 106.7 (41.5) | 5.52 | 37.4 (0.7) |
| 245faEβγ/HFC-236fa | | | | | |
| 5.0/95.0 | 17.3 (119) | 52.6 (363) | 100.3 (37.9) | 5.22 | 87.7 (1.5) |
| 95.0/5.0 | 5.8 (40) | 21.6 (149) | 106.9 (41.6) | 5.52 | 37.6 (0.7) |
| 245faEβγ/HFC-245ca | | | | | |
| 5.0/95.0 | 6.2 (43) | 21.8 (150) | 109.0 (42.8) | 5.51 | 38.4 (0.7) |
| 95.0/5.0 | 5.4 (37) | 20.2 (139) | 105.7 (40.9) | 5.45 | 34.7 (0.6) |
| 245faEβγ/HFC-245cb | | | | | |
| 5.0/95.0 | 29.7 (205) | 84.0 (579) | 100.1 (37.8) | 4.97 | 132.6 (2.3) |
| 95.0/5.0 | 6.3 (43) | 22.8 (157) | 108.5 (42.5) | 5.64 | 40.7 (0.7) |
| 245faEβγ/HFC-245ea | | | | | |
| 5.0/95.0 | 6.1 (42) | 21.9 (151) | 112.9 (44.9) | 5.53 | 38.8 (0.7) |
| 95.0/5.0 | 5.4 (37) | 20.2 (139) | 105.8 (41.0) | 5.45 | 34.7 (0.6) |
| 245faEβγ/HFC-245fa | | | | | |
| 5.0/95.0 | 9.7 (67) | 32.3 (223) | 107.0 (41.7) | 5.38 | 55.9 (1.0) |
| 95.0/5.0 | 5.5 (38) | 20.9 (144) | 106.4 (41.3) | 5.37 | 35.2 (0.6) |
| 245faEβγ/HFC-254ca | | | | | |
| 5.0/95.0 | 6.0 (41) | 21.0 (1450 | 111.3 (44.1) | 5.54 | 37.3 (0.7) |
| 95.0/5.0 | 5.4 (37) | 20.2 (139) | 105.7 (40.9) | 5.46 | 34.7 (0.6) |
| 245faEβγ/HFC-254cb | | | | | |
| 5.0/95.0 | 16.0 (110) | 48.7 (336) | 107.6 (42.0) | 5.37 | 84.6 (1.5) |
| 95.0/5.0 | 5.8 (40) | 21.5 (148) | 107.0 (41.7) | 5.51 | 37.5 (0.7) |

TABLE 5-continued

| Evaporator temperature | 40.0° F. (4.4° C.) |
| --- | --- |
| Condenser temperature | 100.0° F. (37.8° C.) |
| Compressor efficiency is 75%. | |
| Return gas temperature | 60.0° F. |

| Refrig. Comp | Evap. Press. Psia (kPa) | Cond. Press. Psia (kPa) | Comp. Dis. Temp. °F. (°C.) | COP | Capacity BTU/min (kw) |
| --- | --- | --- | --- | --- | --- |
| 245faEβγ/HFC-254eb | | | | | |
| 5.0/95.0 | 16.3 (112) | 49.4 (341) | 107.4 (41.9) | 5.38 | 86.0 (1.5) |
| 95.0/5.0 | 5.8 (40) | 21.6 (149) | 107.1 (41.7) | 5.51 | 37.6 (0.7) |
| 245faEβγ/HFC-263ca | | | | | |
| 5.0/95.0 | 8.3 (57) | 27.2 (188) | 112.5 (44.7) | 5.50 | 48.7 (0.9) |
| 95.0/5.0 | 5.5 (38) | 20.7 (143) | 106.4 (41.3) | 5.41 | 35.2 (0.6) |
| 245faEβγ/HFC-263fb | | | | | |
| 5.0/95.0 | 25.9 (179) | 74.2 (512) | 108.7 (42.6) | 5.26 | 126.0 (2.2) |
| 95.0/5.0 | 6.3 (43) | 22.9 (158) | 109.1 (42.8) | 5.62 | 40.8 (0.7) |
| 245faEβγ/HFC-272ca | | | | | |
| 5.0/95.0 | 16.4 (113) | 49.4 (341) | 113.0 (45.0) | 5.31 | 85.7 (1.5) |
| 95.0/5.0 | 6.0 (41) | 22.0 (152) | 107.9 (42.2) | 5.53 | 38.5 (0.7) |
| 245faEβγ/HFC-272ea | | | | | |
| 5.0/95.0 | 9.4 (65) | 30.9 (213) | 118.9 (48.3) | 5.55 | 56.0 (1.0) |
| 95.0/5.0 | 5.6 (39) | 21.2 (146) | 107.5 (41.9) | 5.40 | 35.7 (0.6) |
| 245faEβγ/HFC-272fb | | | | | |
| 5.0/95.0 | 12.2 (84) | 38.9 (268) | 117.8 (47.7) | 5.46 | 69.4 (12) |
| 95.0/5.0 | 5.8 (40) | 21.5 (148) | 107.3 (41.8) | 5.50 | 37.2 (0.7) |
| 245faEβγ/HFC-281ea | | | | | |
| 5.0/95.0 | 23.1 (159) | 65.9 (454) | 118.1 (47.8) | 5.45 | 117.8 (2.1) |
| 95.0/5.0 | 6.5 (45) | 23.6 (163) | 110.5 (43.6) | 5.60 | 42.0 (0.7) |
| 245faEβγ/HFC-281fa | | | | | |
| 5.0/95.0 | 18.1 (125) | 53.9 (372) | 117.9 (47.7) | 5.48 | 97.0 (1.7) |
| 95.0/5.0 | 6.3 (43) | 22.9 (158) | 109.3 (42.9) | 5.55 | 40.2 (0.7) |

*=Condenser = 130° F., evaporator = 45° F., and return gas = 65° F.

EXAMPLE 5

The following table shows the refrigerant performance of various compositions. The data are based on the following conditions.

TABLE 6

| Evaporator temperature | 10.0° F. (−12.2° C.) |
| --- | --- |
| Condenser temperature | 90.0° F. (32.2° C.) |
| Return gas temperature | 30.0° F. (−1.1° C.) |
| Compressor efficiency is 75%. | |

| Refrig. Comp. | Evap. Press. Psia (kpa) | Cond. Press. Psia (kPa) | Comp. Dis. Temp. °F. (°C.) | COP | Capacity BTU/min (kw) |
| --- | --- | --- | --- | --- | --- |
| HCFC-22 | 47.9 (330) | 183.6 (1266) | 179.1 (81.7) | 3.62 | 217.7 (3.8) |
| 116E/HFC-32 | | | | | |
| 88/12 | 85.4 (589) | 312.7 (2157) | 127.7 (532) | 3.01 | 283.6 (5.0) |
| 75.2/24.8 | 79.4 (547) | 296.6 (2046) | 135.7 (57.6) | 3.24 | 294.9 (5.2) |
| 50/50 | 762 (525) | 289.2 (1995) | 149.0 (65.0) | 3.39 | 308.3 (5.4) |
| 116E/HFC-41* | | | | | |
| 84/16 | 39.6 (273) | 206.2 (1422) | 127.4 (53.0) | 3.05 | 182.9 (3.2) |
| 58.6/41.4 | 52.8 (364) | 219.6 (1515) | 149.6 (65.3) | 3.32 | 237.7 (4.2) |
| 30/70 | 68.9 (475) | 274.0 (1890) | 179.7 (82.1) | 3.15 | 294.4 (5.2) |

*Condenser temp. 50.0° F., Evaporator temp. −30.0° F., and Return gas temp. -10.0° F.

TABLE 6-continued

| | |
|---|---|
| Evaporator temperature | 10.0° F. (−12.2° C.) |
| Condenser temperature | 90.0° F. (32.2° C.) |
| Return gas temperature | 30.0° F. (−1.1° C.) |
| Compressor efficiency is 75%. | |

| Refrig. Comp. | Evap. Press. Psia (kpa) | Cond. Press. Psia (kPa) | Comp. Dis. Temp. °F. (°C.) | COP | Capacity BTU/min (kw) |
|---|---|---|---|---|---|
| 116E/HFC-125 | | | | | |
| 99/1* | 82.2 (567) | 304.0 (2097) | 101.4 (38.6) | 2.87 | 254.9 (4.5) |
| 86.0/14.0 | 96.5 (665) | 338.9 (2338) | 121.4 (49.7) | 2.73 | 273.5 (4.8) |
| 1/99 | 64.8 (447) | 237.2 (750) | 132.5 (55.8) | 3.28 | 240.1 (4.2) |
| 5.0/95.0 | 66.5 (458) | 242.1 (1669) | 131.7 (55.4) | 3.27 | 243.8 (4.3) |
| 95.0/5.0 | 98.5 (679) | 319.1 (2200) | 113.8 (45.4) | 2.21 | 211.7 (3.7) |
| *Condenser temp. 80.0° F., Evaporator temp. 0.0° F., and Return gas temp. 10.0° F. | | | | | |
| 116E/HFC-134 | 103.9 (716) | 319.9 (2206) | 112.1 (44.5) | 3.24 | 314.2 (5.5) |
| 90.2/9.8 | | | | | |
| 116E/HFC-134a | | | | | |
| 99/1* | 82.8 (571) | 306.1 (2112) | 110.2 (43.4) | 2.75 | 247.3 (4.4) |
| 90.0/10.0 | 103.0 (710) | 332.4 (2293) | 115.0 (46.1) | 3.00 | 299.7 (5.3) |
| 53/47 | 63.1 (435) | 265.2 (1829) | 121.2 (49.6) | 2.78 | 215.4 (3.8) |
| 5.0/95.0 | 34.9 (241) | 138.2 (953) | 129.7 (54.3) | 4.04 | 172.6 (3.0) |
| 95.0/5.0 | 101.9 (702) | 356.2 (2456) | 120.7 (49.3) | 2.62 | 274.5 (4.8) |
| 116E/HFC-143 | | | | | |
| 99/1 | 98.2 (677) | 345.7 (2385) | 120.2 (49.0) | 2.66 | 270.3 (4.8) |
| 94.9/5.1 | 43.3 (298) | 2412 (1664) | 139.7 (59.8) | 2.38 | 155.0 (2.7) |
| 60/40 | 27.3 (188) | 112.9 (779) | 131.0 (55.0) | 4.28 | 169.5 (3.0) |
| 116E/HFC-143a | | | | | |
| 99/1* | 822 (567) | 304.1 (2098) | 110.5 (43.6) | 2.76 | 247.5 (4.4) |
| 94.8/5.2* | 81.8 (564) | 301.6 (2081) | 112.8 (44.9) | 2.81 | 250.8 (4.4) |
| 40/60 | 75.9 (523) | 270.0 (1863) | 155.6 (68.7) | 3.29 | 283.4 (5.0) |
| 5.0/95.0 | 62.4 (430) | 226.2 (1559) | 182.0 (83.3) | 3.42 | 255.2 (4.5) |
| 95.0/5.0 | 98.7 (681) | 318.9 (2199) | 115.6 (46.4) | 2.32 | 223.7 (3.9) |
| *Condenser temp. 80.0° F., Evaporator temp. 0.0° F., and Return gas temp. 20.0° F. | | | | | |
| 116E/HFC-152a | | | | | |
| 99/1 | 100.2 (691) | 315.8 (2179) | 111.6 (44.2) | 3.19 | 303.7 (5.3) |
| 92.1/7.9 | 102.9 (710) | 320.1 (2208) | 114.7 (45.9) | 3.23 | 314.4 (5.5) |
| 60/40 | 60.0 (414) | 250.1 (1725) | 148.5 (64.7) | 3.39 | 256.5 (4.5) |
| 5.0/95.0 | 32.4 (224) | 123.9 (854) | 161.5 (71.9) | 4.16 | 167.0 (2.9) |
| 95.0/5.0 | 102.6 (707) | 335.9 (2316) | 117.4 (47.4) | 2.76 | 278.2 (4.9) |
| 116E/HFC-161* | | | | | |
| 99/1 | 57.4 (396) | 243.5 (1680) | 102.4 (39.1) | 2.92 | 206.7 (3.6) |
| 87.3/12.7 | 32.4 (223) | 149.6 (1032) | 91.5 (33.1) | 3.79 | 166.8 (2.9) |
| 60/40 | 22.1 (152) | 126.1 (870) | 151.7 (66.5) | 3.33 | 119.3 (2.1) |
| *= Condenser temp. 70.0° F., Evaporator temp. −10.0° F., and Return gas temp. 10.0° F. | | | | | |
| 116E/HFC-227ca | | | | | |
| 5.0/95.0 | 20.9 (143) | 89.9 (620) | 108.0 (42.2) | 3.69 | 97.7 (3.5) |
| 95.0/5.0 | 92.3 (636) | 331.4 (2285) | 119.9 (48.8) | 2.67 | 259.8 (4.6) |
| 116E/HFC-227ea | | | | | |
| 5.0/95.0 | 16.7 (115) | 78.3 (540) | 104.4 (40.2) | 3.67 | 82.2 (1.4) |
| 95.0/5.0 | 92.3 (636) | 333.0 (2296) | 119.9 (48.8) | 2.66 | 259.2 (4.6) |
| 116E/HFC-236ca | | | | | |
| 5.0/95.0* | 162 (112) | 72.9 (503) | 149.7 (65.4) | 3.93 | 84.2 (1.5) |
| 95.0/5.0 | 70.9 (489) | 301.7 (2080) | 127.3 (52.9) | 2.71 | 233.8 (4.1) |
| 116E/HFC-236cb | | | | | |
| 5.0/95.0 | 11.5 (79) | 53.1 (366) | 110.8 (43.8) | 3.97 | 62.0 (1.1) |
| 95.0/5.0 | 86.0 (593) | 321.4 (2216) | 121.4 (49.7) | 2.66 | 249.2 (4.4) |
| 116E/HFC-236ea | | | | | |
| 5.0/95.0 | 10.4 (72) | 48.7 (335) | 114.0 (45.6) | 4.20 | 60.1 (1.1) |
| 95.0/5.0 | 85.4 (589) | 321.7 (2218) | 122.1 (50.1) | 2.64 | 247.8 (4.4) |
| 116E/HFC-236fa | | | | | |
| 5.0/95.0 | 12.5 (86) | 57.1 (394) | 110.5 (43.6) | 3.92 | 65.8 (1.2) |
| 95.0/5.0 | 87.2 (601) | 322.8 (2226) | 121.0 (49.4) | 2.67 | 251.6 (4.4) |
| 116E/ | | | | | |

TABLE 6-continued

| | |
|---|---|
| Evaporator temperature | 10.0° F. (−12.2° C.) |
| Condenser temperature | 90.0° F. (32.2° C.) |
| Return gas temperature | 30.0° F. (−1.1° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| HFC-245ca* | | | | | |
| 5.0/95.0* | 9.9 (68) | 47.0 (324) | 153.9 (67.7) | 4.30 | 59.1 (1.0) |
| 95.0/5.0 | 54.0 (372) | 279.2 (1925) | 136.3 (57.9) | 2.58 | 195.5 (3.4) |
| *= Condenser temp. of 130° F., evaporator temp. of 45° F., and return gas temp. of 65° F. | | | | | |
| 116E/HFC-245cb | | | | | |
| 5.0/95.0 | 21.3 (146) | 88.3 (609) | 104.3 (40.2) | 3.63 | 96.0 (1.7) |
| 95.0/5.0 | 93.2 (642) | 331.4 (2285) | 119.1 (48.4) | 2.69 | 262.0 (4.6) |
| 116E/HFC-245ea | | | | | |
| 5.0/95.0* | 9.9 (68) | 47.8 (330) | 157.9 (69.9) | 435 | 60.8 (1.1) |
| 95.0/5.0 | 37.3 (257) | 318.6 (2196) | 165.8 (74.3) | 1.61 | 112.2 (2.0) |
| 116E/HFC-245fa | | | | | |
| 5.0/95.0* | 14.1 (97) | 64.1 (442) | 152.5 (66.9) | 4.03 | 762 (1.3) |
| 95.0/5.0 | 65.4 (451) | 292.5 (2017) | 129.6 (542) | 2.70 | 223.6 (3.9) |
| 116E/HFC-254ca | | | | | |
| 5.0/95.0* | 9.4 (65) | 44.7 (308) | 156.9 (69.4) | 4.32 | 56.8 (1.0) |
| 95.0/5.0 | 50.1 (345) | 273.7 (1887) | 139.2 (59.6) | 2.54 | 185.1 (3.3) |
| 116E/HFC-254cb | | | | | |
| 5.0/95.0 | 12.1 (83) | 53.7 (370) | 118.9 (48.3) | 4.14 | 67.0 (1.2) |
| 95.0/5.0 | 86.1 (594) | 318.7 (2197) | 121.2 (49.6) | 2.68 | 250.5 (4.4) |
| 116E/HFC-263ca | | | | | |
| 5.0/95.0 | 9.4 (65) | 44.8 (309) | 114.8 (46.0) | 4.28 | 56.0 (1.0) |
| 95.0/5.0 | 83.1 (573) | 317.9 (2192) | 122.6 (50.3) | 2.62 | 242.9 (4.3) |
| 116E/HFC-263fb | | | | | |
| 5.0/95.0 | 18.1 (125) | 76.3 (526) | 120.3 (49.1) | 3.89 | 90.4 (1.6) |
| 95.0/5.0 | 91.0 (628) | 326.1 (2248) | 120.0 (48.9) | 2.71 | 260.4 (4.6) |
| 116E/HFC-272ca | | | | | |
| 5.0/95.0* | 21.2 (146) | 85.6 (590) | 159.4 (70.8) | 3.85 | 101.7 (1.8) |
| 95.0/5.0 | 68.7 (474) | 284.5 (1962) | 125.8 (52.1) | 2.89 | 237.4 (4.2) |
| 116E/HFC-272ea | | | | | |
| 5.0/95.0* | 13.0 (90) | 58.3 (402) | 167.4 (75.2) | 4.11 | 72.6 (1.3) |
| 95.0/5.0 | 54.7 (377) | 222.1 (1531) | 120.4 (49.1) | 3.46 | 228.0 (4.0) |
| 116E/HFC-272fb | | | | | |
| 5.0/95.0* | 162 (112) | 70.8 (488) | 166.3 (74.6) | 3.99 | 85.8 (1.5) |
| 95.0/5.0+ | 49.8 (343) | 236.8 (1633) | 120.5 (492) | 2.90 | 193.4 (3.4) |
| *= Condenser temp. of 130° F., evaporator temp. of 45° F., and return gas temp. of 65° F. | | | | | |
| += Return gas temp. 20° F. | | | | | |
| 116E/HFC-281ea | | | | | |
| 5.0/95.0 | 16.7 (115) | 68.0 (469) | 132.1 (55.6) | 4.17 | 88.8 (1.6) |
| 95.0/5.0 | 89.7 (618) | 287.7 (1983) | 103.1 (39.5) | 3.08 | 266.6 (4.7) |
| 116E/HFC-281fa | | | | | |
| 5.0/95.0 | 14.0 (96) | 57.7 (398) | 129.9 (54.4) | 4.39 | 78.9 (1.4) |
| 95.0/5.0 | 85.8 (591) | 273.8 (1887) | 110.5 (43.6) | 2.99 | 249.5 (4.4) |

EXAMPLE 6

Refrigerant Performance

The following table shows the refrigerant performance of various compositions. Except where indicated, the data are based on the following conditions.

TABLE 7

| Evaporator temperature | 40.0° F. (4.4° C.) |
|---|---|
| Condenser temperature | 100.0° F. (37.8° C.) |
| Subcool temperature | 0° F. (−17.8° C.) |
| Return gas temperature | 40.0° F. (12.8° C.) |
| Compressor efficiency is 75%. | |

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 236eaEβγ/ HFC-245ca 69.1/30.9 | 6.8 (47) | 25.2 (174) | 101.5 (38.6) | 5.32 | 42.1 (0.7) |
| 236caE/ HFC-245ca 16.1/83.9 | 6.1 (42) | 23.3 (161) | 108.3 (42.3) | 5.41 | 39.6 (0.7) |
| 236eaEβγ/ HFC-356mff* 96.9/3.1 | 6.8 (47) | 25.2 (174) | 113.4 (45.2) | 5.11 | 40.4 (0.7) |
| 245faEβγ/ HFC-356mff* 4.4/95.6 | 6.5 (45) | 23.2 (160) | 108.5 (42.5) | 5.04 | 36.8 (0.6) |

*return gas temp. = 55.0° F. (12.8° C.)

The following compounds have the indicated HGWPs (all HGWP values are relative to CFC-11 =1.0). The HGWPs were estimated relative to the HGWP of CFC-11 as follows:

HGWP=(IR abs (A)/IR abs. (CFC-11))×(t (A)/t (CFC-11)) ×(mass (CFC-11)/mass (A))

where A is the gas being analyzed;

IR abs. is the total infrared absorption cross section in the region of interest, that is, where $H_2O$ and $CO_2$ do not absorb;

t=atmospheric lifetime; and mass=atomic mass.

| COMPOUND | HGWP |
|---|---|
| HFC-125 | 0.84 |
| HFC-134 | =0.28 |
| HFC-134a | 0.28 |
| HFC-143a | 1.1 |
| FC-218 | >10 |
| 134E | =0.1 |
| 143aE | =0.2 |

A composition of a fluoroether and an HFC are prepared, and have the indicated HGWPs.

| COMPOSITION (wt. %/wt/%) | HGWP |
|---|---|
| 134E/HFC-125 (80.0/20.0) | 0.25 |
| 134E/HFC-125 (46.0/54.0) | 0.5 |
| 134E/HFC-134 (80.0/20.0) | 0.14 |
| 134E/HFC-134a (80.0/20.0) | 0.14 |
| 134E/HFC-143a (80.0/20.0) | 0.3 |
| 143aE/HFC-125 (80.0/20.0) | 0.33 |
| 143aE/HFC-143a (80.0/20.0) | 0.38 |
| 143aE/HFC-125 (53.0/47.0) | 0.5 |
| 143aE/HFC-134 (80.0/20.0) | 0.22 |
| 143aE/HFC-134a (80.0/20.0) | 0.22 |

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

Additives such as lubricants, corrosion inhibitors, stabilizers, dyes and other appropriate materials may be added to the novel compositions of the invention for a variety of purposes provided they do not have an adverse influence on the composition for its intended application. Preferred lubricants include esters having a molecular weight of greater than 250.

We claim:

1. An azeotropic or azeotrope-like composition consisting essentially of, by weight, about 1% to about 99% 1-difluoromethoxy-1,2,2,2-tetrafluoroethane and about 99% to about 1% 1,1,2,2,3-pentafluoropropane, wherein said composition has a vapor pressure at 25° C. of about 101 kPa to about 111 kPa, and wherein the vapor pressure changes by less than about 10% after 50% of the composition has been evaporated at 25° C.

2. The azeotropic or azeotrope-like composition of claim 1 consisting essentially of, by weight, about 60% to about 80% 1-difluoromethoxy-1,2,2,2-tetrafluoroethane and about 40% to about 20% 1,1,2,2,3-pentafluoropropane.

3. An azeotropic composition consisting essentially of, by weight, about 69.1% 1-difluoromethoxy-1,2,2,2-tetrafluoroethane and about 30.9% 1,1,2,2,3-pentafluoropropane, wherein said composition has a vapor pressure at 25° C. of about 111 kpa.

4. A process of refrigeration comprising the step of evaporating the composition of claim 1 in the vicinity of an object to be cooled.

5. A process of refrigeration comprising the step of evaporating the composition of claim 2 in the vicinity of an object to be cooled.

6. A process of refrigeration comprising the step of evaporating the composition of claim 3 in the vicinity of an object to be cooled.

7. A process of heating comprising the step of condensing the composition of claim 5 in the vicinity of an object to be heated.

8. A process of heating comprising the step of condensing the composition of claim 2 in the vicinity of an object to be heated.

9. A process of heating comprising the step of condensing the composition of claim 3 in the vicinity of an object to be heated.

* * * * *